(12) United States Patent
Matsumoto et al.

(10) Patent No.: US 7,970,516 B2
(45) Date of Patent: Jun. 28, 2011

(54) VEHICLE CONTROL SYSTEM

(75) Inventors: Toshiki Matsumoto, Kariya (JP); Mamoru Sawada, Yokkaichi (JP)

(73) Assignee: Denso Corporation, Kariya (JP)

( * ) Notice: Subject to any disclaimer, the term of this patent is extended or adjusted under 35 U.S.C. 154(b) by 754 days.

(21) Appl. No.: 12/080,437

(22) Filed: Apr. 2, 2008

(65) Prior Publication Data

US 2008/0249689 A1 Oct. 9, 2008

(30) Foreign Application Priority Data

Apr. 3, 2007 (JP) .................................. 2007-097792

(51) Int. Cl.
*B60R 22/00* (2006.01)
(52) U.S. Cl. ............... 701/48; 701/36; 701/37; 280/5.5; 280/5.507; 280/5.504
(58) Field of Classification Search .................... 701/48, 701/36–37; 280/5.507, 5.5, 5.504
See application file for complete search history.

(56) References Cited

U.S. PATENT DOCUMENTS

| | | | | |
|---|---|---|---|---|
| 5,062,657 A | | 11/1991 | Majeed | |
| 5,097,419 A | * | 3/1992 | Lizell | 701/37 |
| 5,142,475 A | * | 8/1992 | Matsunaga et al. | 701/37 |
| 5,383,124 A | * | 1/1995 | Kunz et al. | 701/37 |
| 5,570,288 A | * | 10/1996 | Badenoch et al. | 701/37 |
| 5,570,289 A | * | 10/1996 | Stacey et al. | 701/37 |
| 5,598,337 A | * | 1/1997 | Butsuen et al. | 701/37 |
| 5,701,245 A | * | 12/1997 | Ogawa et al. | 701/37 |
| 6,000,703 A | * | 12/1999 | Schubert et al. | 280/5.518 |
| 6,293,530 B1 | * | 9/2001 | Delorenzis et al. | 267/64.13 |
| 6,389,341 B1 | * | 5/2002 | Davis | 701/37 |
| 6,679,504 B2 | * | 1/2004 | Delorenzis et al. | 280/5.507 |
| 6,752,716 B1 | * | 6/2004 | Nishimura et al. | 463/6 |
| 2005/0049761 A1 | | 3/2005 | Kataoka et al. | |
| 2005/0200088 A1 | | 9/2005 | Sawada et al. | |

(Continued)

FOREIGN PATENT DOCUMENTS

CN 101279578 A * 10/2008

(Continued)

OTHER PUBLICATIONS

Research on random vibration control of vehicle based on semi-active suspension system; Jia Xu et al.; Vehicle Power and Propulsion Conference, 2008. VPPC '08. IEEE; Digital Object Identifier: 10.1109/VPPC.2008.4677761; Publication Year: 2008 , pp. 1-3.*

(Continued)

*Primary Examiner* — Cuong H Nguyen
(74) *Attorney, Agent, or Firm* — Harness, Dickey & Pierce, PLC

(57) ABSTRACT

A vehicle control system estimates the vibration states of tires by using a vehicle vibration model that is separated into a vehicle body vibration model, a chassis vibration model, and a tire vibration model with high precision. The tire vibration model in the vehicle vibration model is formed of a rear wheel tire vibration model, a front wheel tire vibration model, and a virtual coupling element vibration model that virtually couples the rear wheel tire vibration model and the front wheel tire vibration model. Influence of the vibration state that is conducted between the front wheel tires and the rear wheel tires is considered while the tire vibration model and the chassis vibration model are separated from each other, thereby making it possible to estimate the vibrations that occur in the front wheel tires and the rear wheel tires.

14 Claims, 27 Drawing Sheets

U.S. PATENT DOCUMENTS

2008/0249689 A1 * 10/2008 Matsumoto et al. ............ 701/48

FOREIGN PATENT DOCUMENTS

| EP | 1978279 A2 * | 10/2008 |
|---|---|---|
| GB | 2 356 685 | 5/2001 |
| JP | A-H3-217312 | 9/1991 |
| JP | A-H7-267131 | 10/1995 |
| JP | 11139289 | 5/1999 |
| JP | A-2002-337520 | 11/2002 |
| JP | 2004-168148 | 6/2004 |
| JP | 2006-302186 | 11/2006 |

OTHER PUBLICATIONS

Adjusting stiffness of air spring and damping of oil damper using fuzzy controller for vehicle seat vibration isolation Huseinbegovic, S. et al.; Control and Communications, 2009. SIBCON 2009. International Siberian Conference on; Digital Object Identifier: 10.1109/SIBCON.2009.5044834; Publication Year: 2009 , pp. 83-92.*

Hybrid fuzzy-neural network structure for vehicle seat vibration isolation; Tanovic, O.; Huseinbegovic, S.; Control and Automation, 2009. ICCA 2009. IEEE International Conference on; Digital Object Identifier: 10.1109/ICCA.2009.5410379 Publication Year: 2009 , pp. 2354-2359.*

Modeling and Numerical Simulation for Tire Irregular Wear Caused by Tread Vibration; Haibo Huang et al.; Computer Modeling and Simulation, 2010. ICCMS '10. Second International Conference on; vol. 3; Digital Object Identifier: 10.1109/ICCMS.2010.383; Publication Year: 2010 , pp. 32-36.*

Chaotic vibration of a nonlinear quarter-vehicle mode; Jiang Lixia; Li Wanxiang; Vehicle Power and Propulsion Conference, 2008. VPPC '08. IEEE; Digital Object Identifier: 10.1109/VPPC.2008.4677697; Publication Year: 2008 , pp. 1-4.*

Research on Suspension System Based on Genetic Algorithm and Neural Network Control; Chuan yin Tang et al.; Intelligent Computation Technology and Automation, 2009. ICICTA '09. Second International Conference on; vol. 1 Digital Object Identifier: 10.1109/ICICTA.2009.120; Publication Year: 2009 , pp. 468-471.*

Simulation & experiment research on human riding comfort for vehicle vibration in dynamic environment; Ji Zhihong et al.; Computer-Aided Industrial Design & Conceptual Design, 2008. CAID/CD 2008. 9th International Conf. on; Digital Object Identifier: 10.1109/CAIDCD.2008.4730546; Publication Year: 2008, pp. 175-181.*

Non-stationary Random Vibration Analysis of Vehicle with Fractional Damping; Li He et al.; Intelligent Computation Technology and Automation (ICICTA), 2008 International Conference on; vol. 2; Digital Object Identifier: 10.1109/ICICTA.2008.348 Publication Year: 2008 , pp. 150-157.*

Search Report dated Jul. 17, 2009 in corresponding European Application No. 08006687.1.

U.S. Appl. No. 12/080,438, filed Apr. 2, 2008, Toshiki Matsumoto et al.

Office action dated Feb. 17, 2009 in Japanese Application No. 2007-097792.

* cited by examiner

FIG. 14

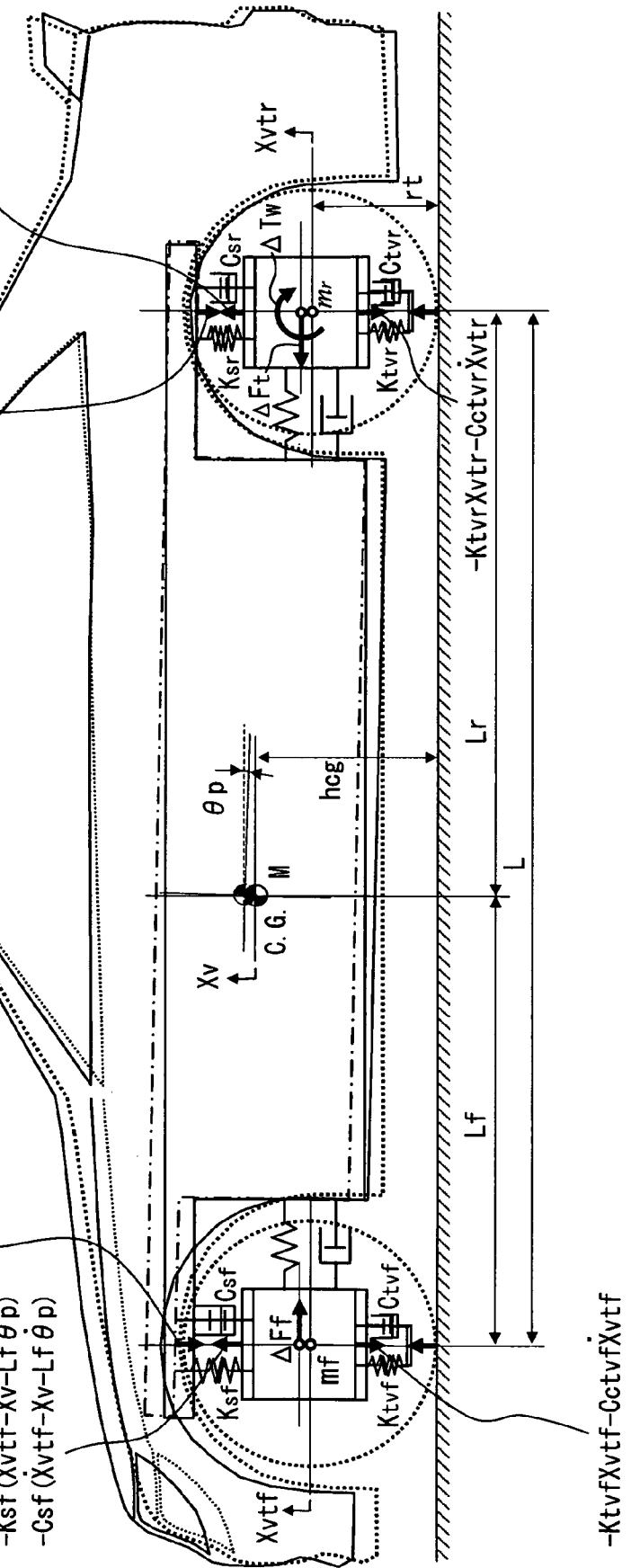

SUSPENSION REACTION
LEFT: $-K_{sf}\{X_{v}+L_{f}\theta_{p}+(w_{f}/2)\theta_{r}-X_{vtf}\}-C_{sf}\{\dot{X}_{v}+L_{f}\dot{\theta}_{p}+(w_{f}/2)\dot{\theta}_{r}-\dot{X}_{vtf}\}$
RIGHT: $-K_{sf}\{X_{v}+L_{f}\theta_{p}-(w_{f}/2)\theta_{r}-X_{vtf}\}-C_{sf}\{\dot{X}_{v}+L_{f}\dot{\theta}_{p}-(w_{f}/2)\dot{\theta}_{r}-\dot{X}_{vtf}\}$ SUSPENSION REACTION
LEFT: $-K_{sr}\{X_{v}-L_{r}\theta_{p}+(w_{r}/2)\theta_{r}-X_{vtr}\}-C_{sr}\{\dot{X}_{v}-L_{r}\dot{\theta}_{p}+(w_{r}/2)\dot{\theta}_{r}-\dot{X}_{vtr}\}$
RIGHT: $-K_{sr}\{X_{v}-L_{r}\theta_{p}-(w_{r}/2)\theta_{r}-X_{vtr}\}-C_{sr}\{\dot{X}_{v}-L_{r}\dot{\theta}_{p}-(w_{r}/2)\dot{\theta}_{r}-\dot{X}_{vtr}\}$

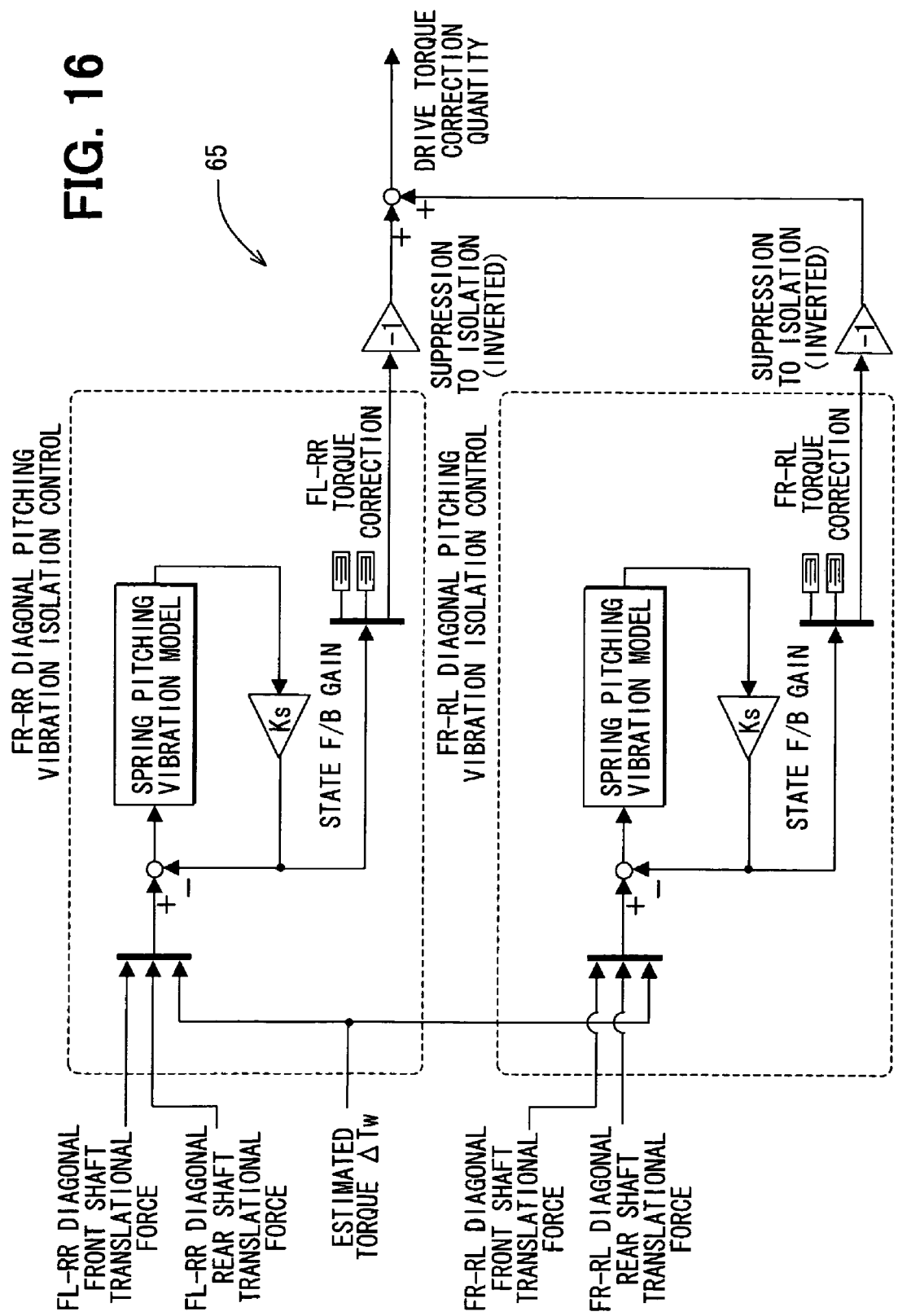

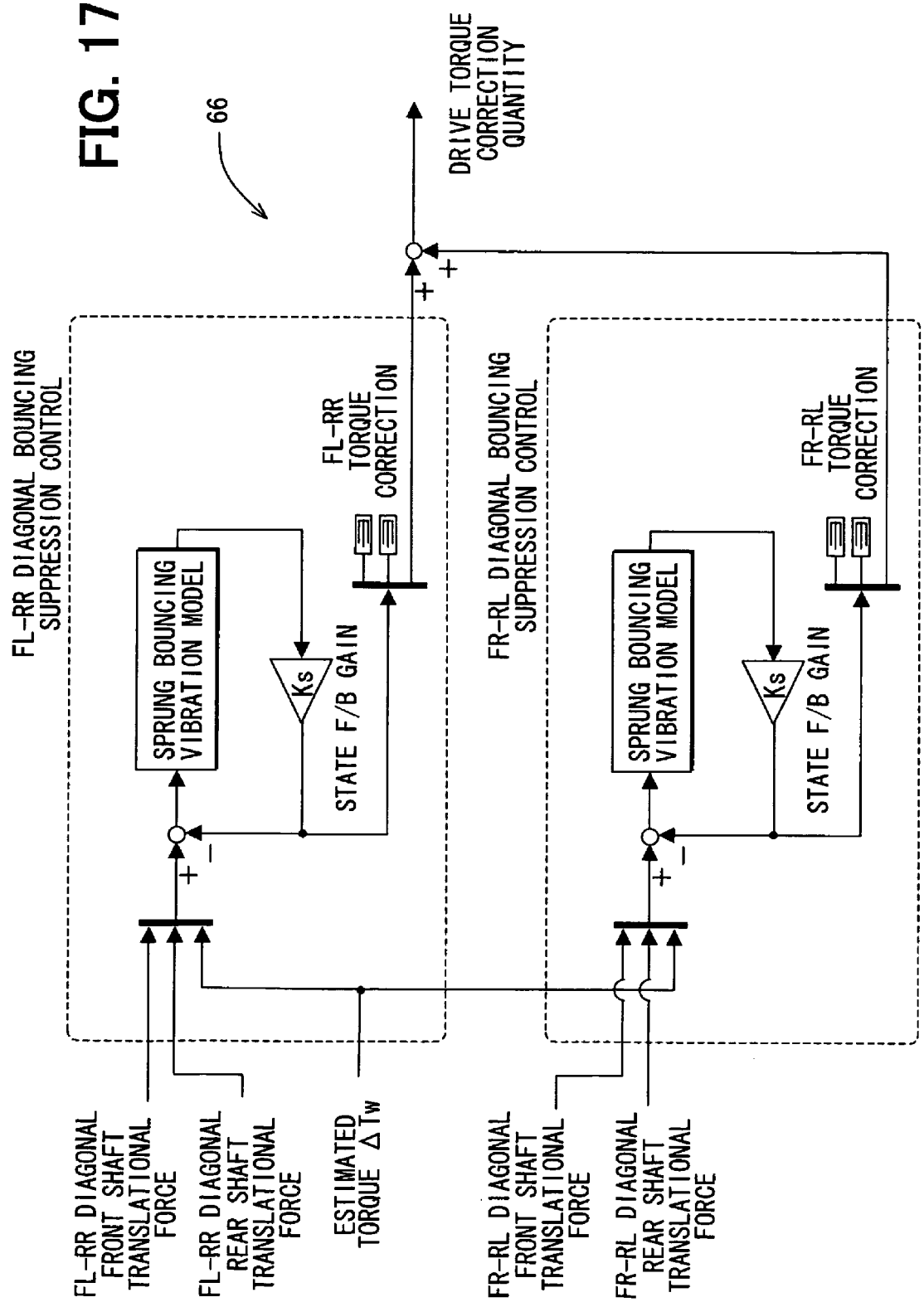

FIG. 20B

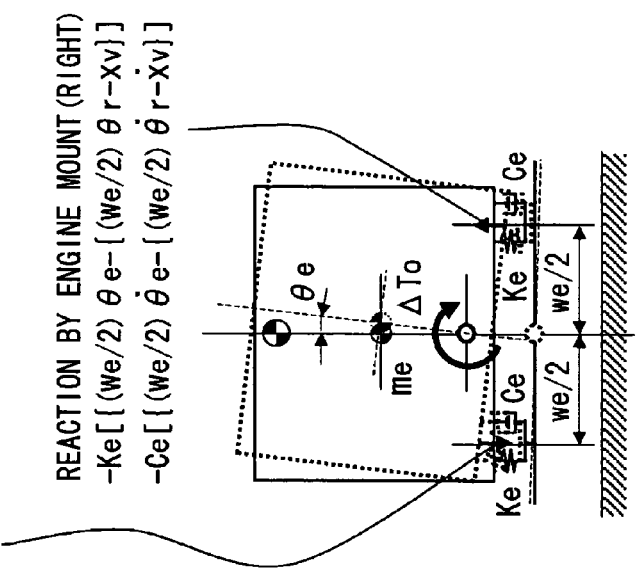

REACTION BY ENGINE MOUNT (LEFT)
−Ke[{(we/2) θe−[(we/2) θr+xv]}]
−Ce[{(we/2) θ̇e−[(we/2) θ̇r+ẋv]}]

REACTION BY ENGINE MOUNT (RIGHT)
−Ke[{(we/2) θe−[(we/2) θr−xv]}]
−Ce[{(we/2) θ̇e−[(we/2) θ̇r−ẋv]}]

FIG. 20A

VEHICLE ROLL MOMENT DUE TO SLANT ROTATION OF ENGINE AND TRANSMISSION, AND VEHICLE BODY GRAVITY CENTER DISPLACEMENT we{Ke(θe−θr)+Ce(θ̇e−θ̇r)}+Mg(hcg−hr) θr

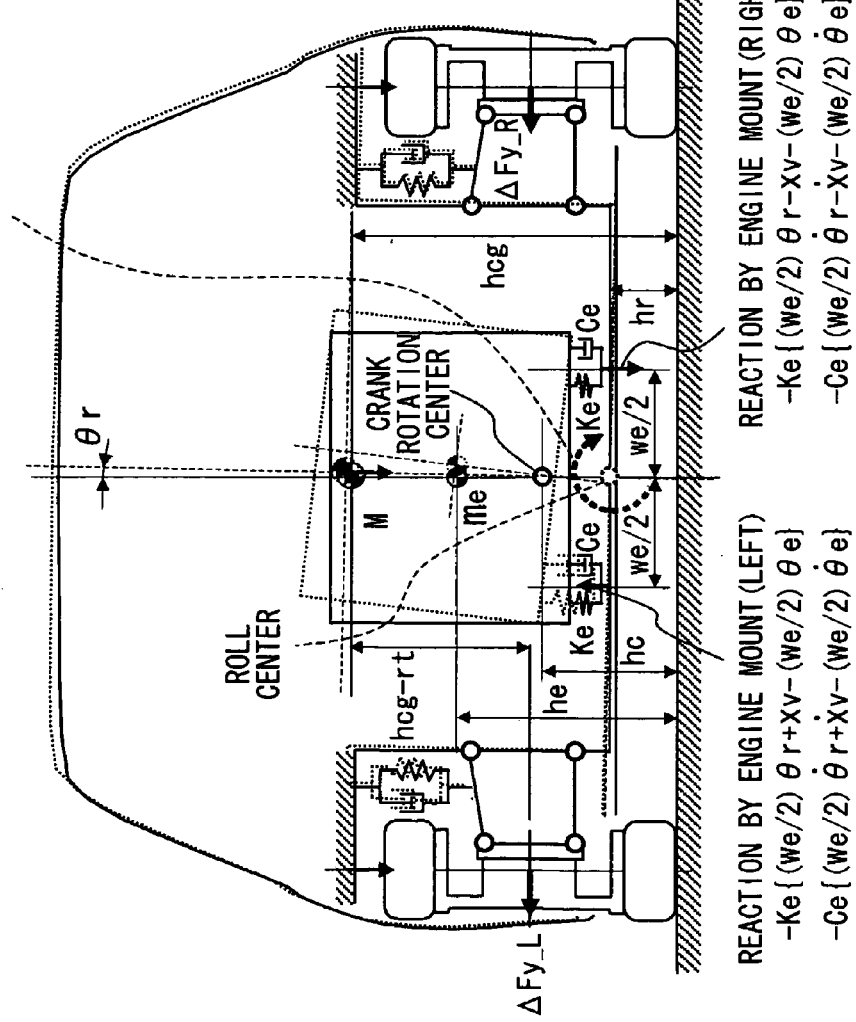

REACTION BY ENGINE MOUNT (RIGHT)
−Ke{(we/2) θr−xv−(we/2) θe}
−Ce{(we/2) θ̇r−ẋv−(we/2) θ̇e}

REACTION BY ENGINE MOUNT (LEFT)
−Ke{(we/2) θr+xv−(we/2) θe}
−Ce{(we/2) θ̇r+ẋv−(we/2) θ̇e}

VEHICLE CONTROL SYSTEM

CROSS REFERENCE TO RELATED APPLICATION

This application is based on and incorporates herein by reference Japanese Patent Application No. 2007-97792 filed on Apr. 3, 2007.

FIELD OF THE INVENTION

The present invention relates to a vehicle control system that suppresses vibrations which occur at various portions of a vehicle.

BACKGROUND OF THE INVENTION

US 2005/0049761 (JP 2004168148A) discloses a vehicle control system that is capable of suppressing the vibrations of a vehicle body. The vehicle control system corrects an input instruction so as to suppress the vibrations of the vehicle by a motion model. The motion model is formed by a dynamic model of the vibrations of tires of the vehicle, the vehicle body unsprung vibrations in suspensions, and the vehicle body sprung vibration which are received by the vehicle body per se, which occurs according to an input instruction corresponding to at least one of accelerator operation, steering operation, and brake operation which are conducted by an occupant.

The above vehicle control system uses vehicle vibration models including a vehicle body sprung vibration model, a suspension vibration model and a tire vibration model. The vehicle vibration model is separated and hierarchized into the vehicle body sprung vibration model, the suspension vibration model, and the tire vibration model, thereby making it possible to express the respective vibration models as lower-order linear models. Here, hierarchization means formation of hierarchical structure in up-down or front-rear transfer of vibration caused by a tire. For this reason, the capacity of storing the vehicle vibration model can be reduced, and the calculation load can be reduced in execution of the estimated calculation of the vibrations that are generated in the respective portions of the vehicle using the vehicle vibration model.

However, when the suspension vibration model and the tire vibration model are separated from each other, the vibration state in the longitudinal (front-back) direction of the tire cannot be estimated with a high precision. This phenomenon will be described below.

When a driving wheel receives a drive torque to rotate, a force (translational force) that propagates in the longitudinal direction of the vehicle occurs in a driving wheel rotating shaft. In fact, the translational forces of the driving wheels are internally propagated to a driven wheel (rolling wheel) side through a chassis to generate the translational force at the driven wheel rotating shaft. In this way, the translational force that is exerted on the driving wheel rotating shaft from the driving wheel affects the motion state of the driven wheels. However, when the tire vibration model and the suspension vibration model (chassis vibration model) are separated from each other, it is impossible to deal with the force that is internally propagated to the driven wheel side from the driving wheel side.

SUMMARY OF THE INVENTION

The present invention has therefore an object to provide a vehicle control system which is capable of suppressing vibrations that occur at various portions of a vehicle by a vehicle vibration model that enables the vibration state of tires to be estimated with a high precision with a vehicle vibration model being separated into a vehicle body vibration model (sprung vibration model), a chassis vibration model (unsprung vibration model), and a tire vibration model.

A vehicle control system comprises a control unit that stores a vehicle vibration model, and an operation device that is controllable by the control unit and operative to change a motion state of the vehicle. The vehicle vibration model is separated into a vehicle body vibration model, a chassis vibration model, and a tire vibration model to estimate vibration states at respective portions of a vehicle. The control unit receives an input parameter to be input to the vehicle vibration model, calculates estimated vibration states of the respective portions of the vehicle, and calculates control quantities according to the vibration states to control the operation device. The tire vibration model in the vehicle vibration model includes vibration models of front wheel tires, rear wheel tires and a virtual coupling element that virtually couples the front wheel tires and the rear wheel tires with each other.

BRIEF DESCRIPTION OF THE DRAWINGS

The above and other objects, features and advantages of the present invention will become more apparent from the following detailed description made with reference to the accompanying drawings. In the drawings:

FIG. 14 is an explanatory diagram showing a vehicle body vibration model;

FIG. 16 is a block diagram showing a detailed functional structure of a pitching vibration isolation control unit;

FIG. 17 is a block diagram showing a detailed functional structure of a bouncing vibration isolation control unit;

FIGS. 20A and 20B are explanatory diagrams showing a vehicle body vibration model formed for expressing the rolling vibration of the vehicle body and the rolling vibration of the engine, respectively;

DETAILED DESCRIPTION OF THE PREFERRED EMBODIMENTS

Figure 1:
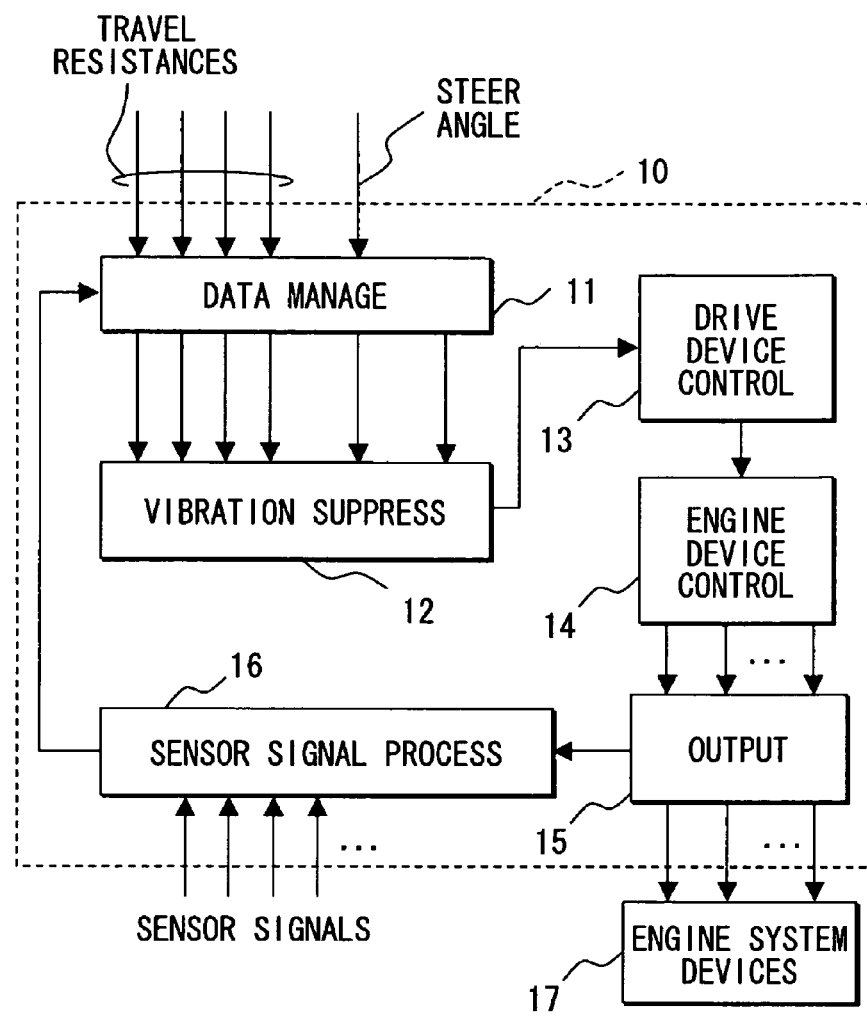
FIG. 1 is a block diagram showing a vehicle control system according to an embodiment of the present invention.

Referring to FIG. 1, a vehicle control system is mainly made up of a control device (engine/drive system ECU) 10 of an engine and drive system (engine/drive system). The engine/drive system ECU 10 communicates with another ECU such as a brake system ECU and a power steering ECU (not shown) on an in-vehicle LAN (not shown), which is a communication network disposed within a vehicle.

The engine/drive system ECU 10 includes a data management unit 11. The data management unit 11 includes a communication interface function that manages a transmit/receive of data using the above in-vehicle LAN. The data management unit 11 also includes a calculation function that calculates an estimated drive torque which is an input parameter necessary for simulating the vibrations that occur in an actual vehicle in a vehicle vibration model that will be described later, based on various sensor signals that are loaded through a sensor input signal processing unit 16.

More specifically, the data management unit 11 calculates an estimated net drive torque of driving wheels in transmitting the drive torque generated by the engine to the driving wheels through a power transmission system including a transmission based on the wheel velocities of the respective wheels, the rotational speed of the engine, the rotational speed of a driving shaft, and the rotational speed ratio of an input shaft and an output shaft in the transmission.

The estimated drive torque that is calculated by the data management unit 11 is input to a vibration suppression control function unit 12 that stores a vehicle vibration model therein. Also, the data management unit 11 receives travel resistance data of the respective wheels (four wheels) that is a parameter to be input to the vehicle vibration model from, for example, the brake system ECU, and then outputs the received travel resistance data to the vibration suppression control function unit 12. The data management unit 11 detects a signal for calculating the travel resistance of the respective wheels, or receives the signal from another ECU, and calculates the travel resistances of the respective wheels in the data management unit 11.

Further, the data management unit 11 receives steering angle data from, for example, the power steering ECU, and calculates a reaction force in a lateral (right-left) direction which is exerted on the front wheels from a road surface when the vehicle turns, based on the steering angle to output the calculated reaction force to the vibration suppression control function unit 12. The calculation function of the reaction force in the lateral direction can be provided in, for example, the power steering ECU, so that the data management unit 11 receives the calculated reaction force in the lateral direction.

The travel resistance data of the respective vehicles represents the travel resistances in the vehicle longitudinal direction which are exerted on the respective wheels from the road surface as reaction forces. The travel resistance data is calculated based on the wheel velocities of the respective vehicles which are detected by vehicle velocity sensors that are disposed in the respective wheels. When the travel resistances of the wheels change, the vibrations are likely to occur in the tires. The travel resistance not only changes due to the state of the road surface per se (irregularity, slope, friction coefficient, etc.), but also changes due to the braking force or a cornering drag. In any factor, when the travel resistance changes, the rotating velocity of the wheels slightly changes according to the changed travel resistance. Accordingly, it is possible to calculate the travel resistance in the wheel longitudinal direction based on the change ratio of the respective wheel velocities with time (angular velocity).

Figure 2:
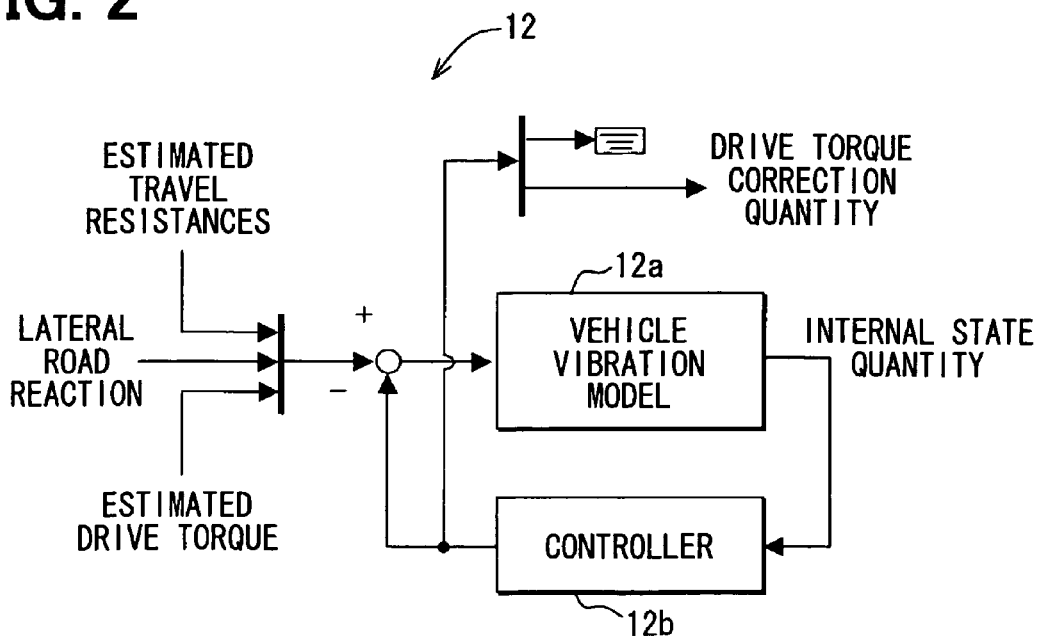
FIG. 2 is a structural diagram showing a vibration suppression control function unit of an engine/driving system ECU in the embodiment.

The vibration suppression control function unit 12 estimates the motion states of the respective portions in the vehicle, and also calculates a correction control quantity (drive torque correction quantity) for suppressing the vibrations that occur at the respective portions of the vehicle based on the estimated results to output the correction control quantity to the drive system device control unit 13. The conceptual structural diagram of the vibration suppression control function unit 12 is shown in FIG. 2. The estimated drive torque, the estimated four wheel travel resistances, and the lateral road surface reaction force are input to a vehicle vibration model 12a. The vehicle vibration model 12a calculates the motion states of the respective portions in the vehicle (vibrations that occur at the respective portions) as the internal state based on those inputs. The internal state quantity is output to a controller 12b, and the controller 12b multiplies the internal state quantity by a given feedback gain Ks to calculate the drive torque correction quantity for suppressing the vibrations of the respective portions.

The drive system device control unit 13 calculates the drive torque to be generated in the drive shaft mainly according to an accelerator operation of a driver based on the accelerator operation of the driver (pedal depression quantity, pedal depression velocity), the travel velocity of the vehicle, and a gear ratio of the transmission in the vehicle. However, when the vehicle is equipped with a traction control system (TRC), a vehicle stability control system (VSC) or an adaptive cruise control system (ACC), and the output torque of the engine is controlled by those control systems, the basic drive torque is determined according to the control quantity caused by those control systems.

Then, the drive system device control unit 13 corrects the basic drive torque according to the above drive torque correction quantity to calculate a final target drive torque to be generated in the drive shaft. The drive system device control unit 13 calculates a target generation torque of the engine so as to generate the calculated target drive torque.

In this situation, when a transmission such as an automatic transmission or a CVT which can automatically change the gear ratio is applied, the drive system device control unit 13 calculates the appropriate combination of the target gear ratio in the transmission with the target generation torque in the engine for generating the target drive torque. The target gear ratio is output to a transmission control device (not shown), and the target generation torque is output to the engine system operation device control unit 14.

The engine system operation device control unit 14 calculates the control quantities and the control timings of the respective operation devices (throttle valve, fuel injection device, ignition coil, etc.) which are required to generate the target generation torque by the engine. More specifically, the engine system operation device control unit 14 calculates the air quantity to be supplied in the engine, required fuel quantity to be supplied, and ignition timing. A combustion mode that depends on the various operating states and the limit condition such as the target air-fuel ratio are met by controlling the air, the fuel, and the ignition. Then, the air system device operation quantity, the fuel system device operation quantity, and the ignition system device operation timing are calculated according to the respective required values of the air, the fuel, and the ignition system to output the calculated values to the drive instruction output unit 15 shown in FIG. 1. The drive instruction output unit 15 outputs the drive signal to the corresponding operation device 17 according to the input operation quantity and the operation timing.

As described above, the target generation torque that is determined taking the drive torque correction quantity for suppressing the vibrations of the vehicle body into consideration, is given to the engine system operation device control unit 14. The engine system operation device control unit 14 is entrusted with the operation quantity of the respective operation devices for generating the target generation torque. As a result, the deterioration of a mileage in the engine and an increase in the emission can be suppressed as much as possible while the vibration of the vehicle is suppressed. The engine system operation device control unit 14 can use not only an operation device that directly adjusts the operating state of the engine but also an operation device that is driven by the engine to indirectly control the operation of the engine. For example, a power generation load in an alternator that is driven by the engine can be actively operated to control the generated torque of the engine. As a result, even when the throttle valve, the injection quantity, and the ignition timing are limited by the operating state of the engine, it is possible to control the generation torque of the engine.

Figure 3:
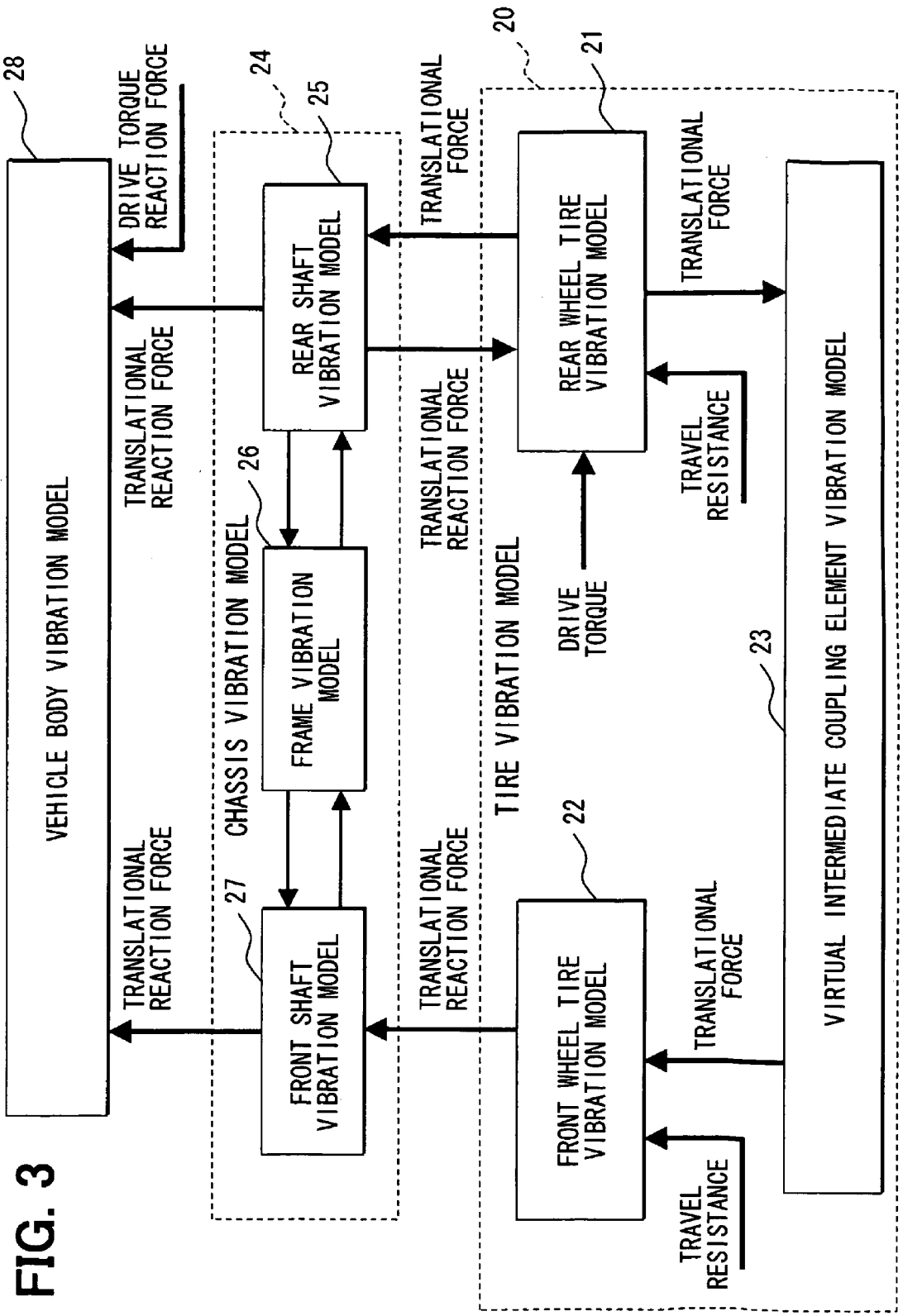
FIG. 3 is an explanatory diagram showing a vehicle vibration model of a rear-wheel drive vehicle.

Subsequently, a vehicle vibration model used in this embodiment and a vibration suppression control using the vehicle vibration model is described in more detail with reference to FIGS. 3 to 6. FIG. 3 shows the outline of the vehicle vibration model of a rear wheel drive vehicle, and also shows representative forces that are exerted on the respective portions of the vehicle vibration model. The respective portions of the vehicle vibration model receive those forces to conduct diverse motions including vibrations.

As shown in FIG. 3, the vehicle vibration model is divided and hierarchized (formed in a hierarchical structure) into a tire vibration model 20, a chassis vibration model (unsprung vibration model) 24, and a vehicle body vibration model (sprung vibration model) 28. Then, the respective divided and hierarchized models 20, 24 and 28 obtain the forces that are exerted on the respective models by the above input parameter or the internal state quantity that is calculated by another model, and input the forces thus obtained to the respective models to calculate the estimated motion state (vibration state). The details of the respective models will be described later.

The tire vibration model 20 is so designed as to estimate the vibrations that occur in the longitudinal direction of the vehicle in the respective tires, and is made up of a rear wheel tire vibration model 21, a front wheel tire vibration model 22, and a virtual intermediate coupling element vibration model 23. The engine torque that is generated by the engine of the vehicle is transmitted to the rear wheel shaft that is the drive shaft through the power transmission system such as a transmission. Thus, the drive torque is transmitted to the rear wheel shaft to exert a force caused by the drive torque on the rear wheel tires. When the rear wheel tires rotate, the rear wheel tires receive the travel resistance at the ground points of the road surface. Since the drive torque and the road surface travel resistance are exerted on the rear wheel tires in the vehicle longitudinal direction (tire rotating direction), the rear wheel tires are twisted by those forces in the tire rotating direction to vibrate.

Also, when the rear wheel tires are rotationally driven by the drive torque, a force (translational force) that propels the chassis frame in the vehicle longitudinal direction is exerted on the chassis frame from the rear wheel shaft. The translational force from the rear wheel shaft is internally propagated to the front wheel side (driven wheel side) through the chassis frame in fact to generate the translational force in the front wheel shaft. As described above, the translational force that is exerted on the driven shaft from the drive shaft affects the motion state of the driven wheels.

However, if the vehicle vibration model is simply separated into the tire vibration model, the chassis vibration mode and the vehicle body vibration model in order to express the respective models by the lower-order linear model, it is impossible to deal with the force that is internally propagated to the driven wheel side from the driving wheel side in the tire vibration model as described above.

For this reason, in this embodiment, as shown in FIG. 3, the virtual intermediate coupling element vibration model 23 that is imaginary is set between the real wheel tire vibration model 21 and the front wheel tire vibration model 22. As a result, since the force that is propagated from the driving wheel side to the driven wheel side can be considered in the tire vibration model while the tire vibration model 20 and the chassis vibration model 24 are separated from each other, the estimated vibrations that occur in the respective tires can be calculated with high precision.

That is, the translational force that is exerted on the rear wheel shaft and the travel resistance that is exerted on the road surface contact point of the front wheel tire are input to the front wheel tire vibration model 22 through the virtual intermediate coupling element vibration model 23 to calculate the estimated motion state of the front wheel tires.

The chassis vibration model 24 estimates the vibrations that occur in the vehicle longitudinal direction in the chassis, and is formed of a rear wheel shaft vibration model 25, a chassis frame vibration model 26, and a front wheel shaft vibration model 27. The translational force that is exerted on the real wheel shaft which is calculated in the rear wheel tire vibration model 21 is input to the rear wheel shaft vibration model 25. The translational reaction force that is exerted on the rear wheel shaft which is calculated in the chassis vibration model is input to the rear wheel tire vibration model 21. When the translational force is exerted on the chassis frame from the rear wheel shaft, the reaction force is always exerted on the rear wheel shaft from the chassis frame as its reaction. When the translational reaction force is exerted on the rear wheel shaft, the translational reaction force is transmitted to the rear wheel tire through the rear wheel shaft.

The tire vibration model 20 is formed to transmit the translational force that is exerted on the front wheel shaft from the rear wheel shaft by the virtual intermediate coupling element vibration model 23. In fact, the front wheel shaft receives the translational force through the chassis, and the front wheel tires roll by the translational force. For this reason, in the vehicle vibration model shown in FIG. 3, the front wheel tire vibration model 22 is so configured as to supply the translational reaction force as the reaction against the translational force to the front wheel shaft vibration model 27 in the chassis vibration model 24.

The vehicle body vibration model 28 is input with the translational reaction forces that are exerted on the front wheel shaft and the rear wheel shaft which are calculated in the chassis vibration model 24 as well as the drive torque reaction force that is exerted directly on the vehicle body through a differential gear.

Figure 4:
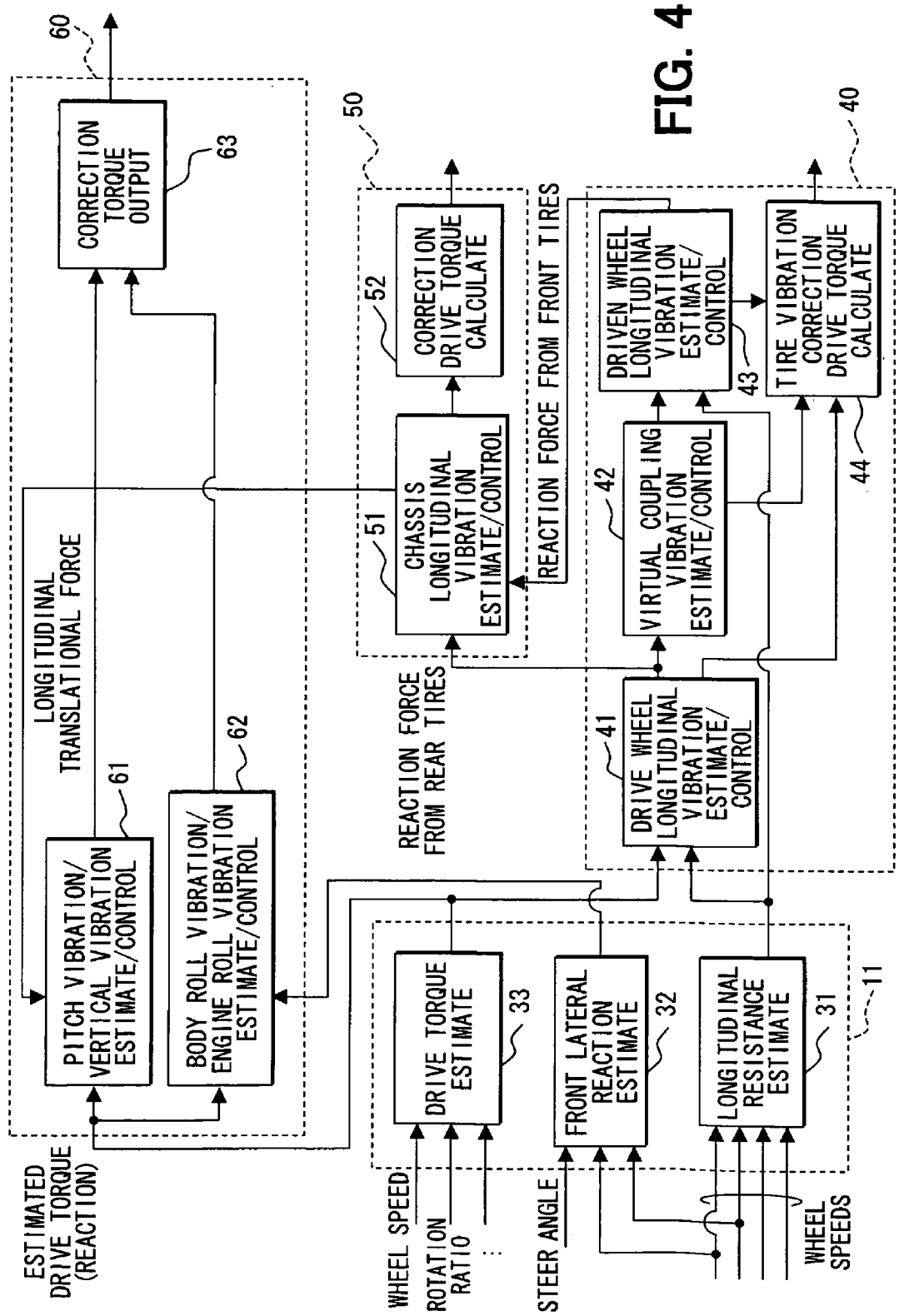
FIG. 4 is a block diagram showing a vehicle vibration model and a controller in the vibration suppression control function unit.

The vehicle vibration model 12a and the controller 12b in the vibration suppression control function unit 12 shown in FIG. 3 is constructed as shown in FIG. 4. The control system that is made up of the vehicle vibration model and the controller is separated into a tire control system 40, a chassis control system 50, and a vehicle body control system 60, correspondingly, with the vehicle vibration model being separated into the tire vibration model 20, the chassis vibration model 24, and the vehicle body vibration model 28.

In FIG. 4, the data management unit 11 includes a four wheel longitudinal direction travel resistance estimate unit 31 that calculates estimated travel resistances of the respective four wheels in the longitudinal direction, a front wheel lateral road surface reaction force estimate unit 32 that calculates the estimated lateral reaction force that is exerted on the front wheels from the road surface when the vehicle turns, and a drive torque estimate unit 33 that calculates the estimated drive torque that is transmitted to the drive shaft. However, FIG. 4 shows which input parameter is supplied to the respective control systems 40 to 60 for descriptive purposes, and the data management unit 11 does not always include the four wheel longitudinal direction travel resistance estimate unit 31, the front wheel lateral road surface reaction force estimate unit 32, and the drive torque estimate unit 33.

The tire control system 40 has a rear wheel tire longitudinal vibration estimate and (/) control unit 41 having a rear wheel tire vibration model that expresses the motion state of the driving wheels (rear wheels) in the longitudinal direction (rotating direction), which changes according to the drive torque that is supplied to the drive shaft from the drive system of the vehicle or the travel resistance that is exerted on the driving wheel. The rear wheel tire longitudinal vibration estimate/control unit 41 calculates the drive torque correction quantity for suppressing the longitudinal vibrations that are generated in the rear wheel tires. The tire control system 40 has a front wheel tire longitudinal vibration estimate/control unit 43 having a front wheel tire vibration model that expresses the motion state of the front wheel tires in the longitudinal direction, which changes according to the travel resistance that is exerted on the driven wheels (front wheels). The front wheel tire longitudinal vibration estimate/control unit 43 calculates the drive torque correction quantity for suppressing the longitudinal vibrations that are generated in the front wheel tires. Further, the tire control system 40 includes a virtual intermediate coupling element longitudinal vibration estimate/control unit 42 having a virtual intermediate coupling element vibration model that is virtually set as means for coupling the rear wheel tire vibration model and the front wheel tire vibration model. The virtual intermediate coupling element longitudinal vibration estimate/control unit 42 calculates the drive torque correction quantity for suppressing the vibrations of the rear wheels and the front wheels by using the virtual intermediate coupling element vibration model.

The virtual intermediate coupling element vibration model 23 is defined as a simple element formed of a spring Kc and a damper Cc. This is because plural elastic deformation members such as a suspension bushing or a chassis frame are interposed between the rear wheel shaft and the front wheel shaft. However, when those plural elastic deformation members are integrated together, the plural elastic deformation members can be regarded as a simple element made up of the spring Kc and the damper Cc as described above.

Figure 5:
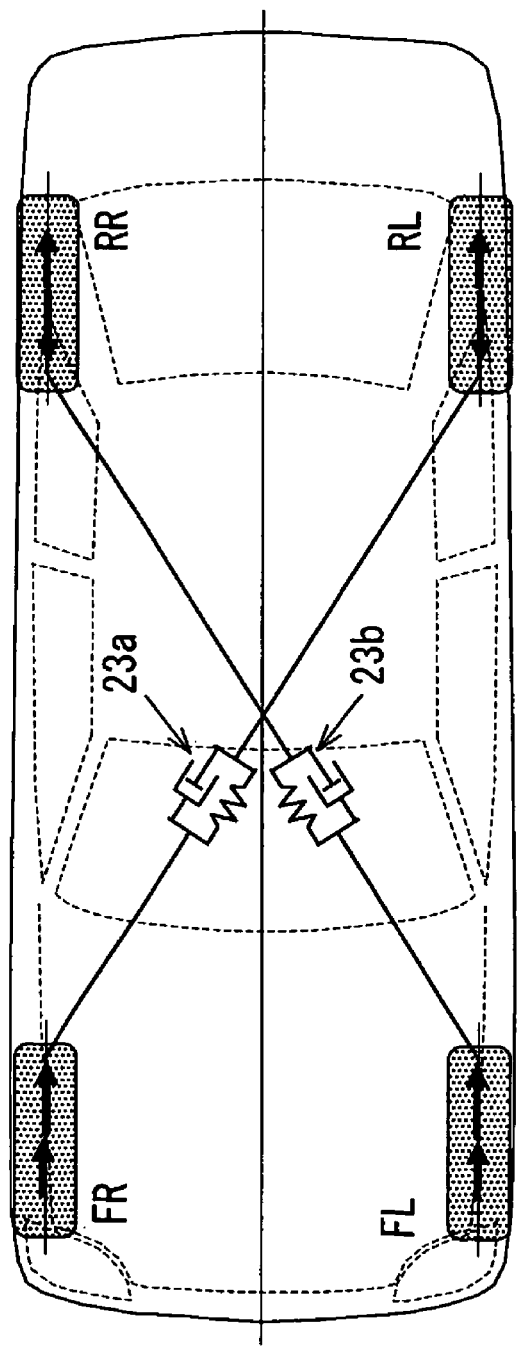
FIG. 5 is an explanatory diagram showing a coupling relationship of front and rear wheels due to a virtual intermediate coupling element in a tire vibration model.

When the vehicle is turning, the ground load of the rotating inner wheels is decreased, and the ground load of the rotating outer wheels is increased. Therefore, the behaviors of the right and left wheels are largely different between the rotating inner wheel and the rotating outer wheel. Accordingly, in the case of firming a model that couples the front wheels (driven wheels) and the rear wheels (driving wheels), as shown in FIG. 5, it is preferable that the front right wheel (FR wheel) and the rear left wheel (RL wheel) are coupled by a virtual intermediate coupling element vibration model 23a, and the front left wheel (FL wheel) and the rear right wheel (RR wheel) are coupled by a virtual intermediate coupling element vibration model 23b. The respective systems that couple the front and rear wheels can also appropriately simulate the vibration state when the vehicle turns, and can prevent the correction quantity that impedes the travel stability and the turning property of the vehicle from being calculated. This is similarly applied to the chassis vibration model or the vehicle body vibration model which will be described later. Even when a model that the front wheel and the rear wheel at the right side are coupled with each other, and a model that the front wheel and the rear wheel at the left side are coupled with each other, it is possible to suppress the tire vibrations.

Figure 6:
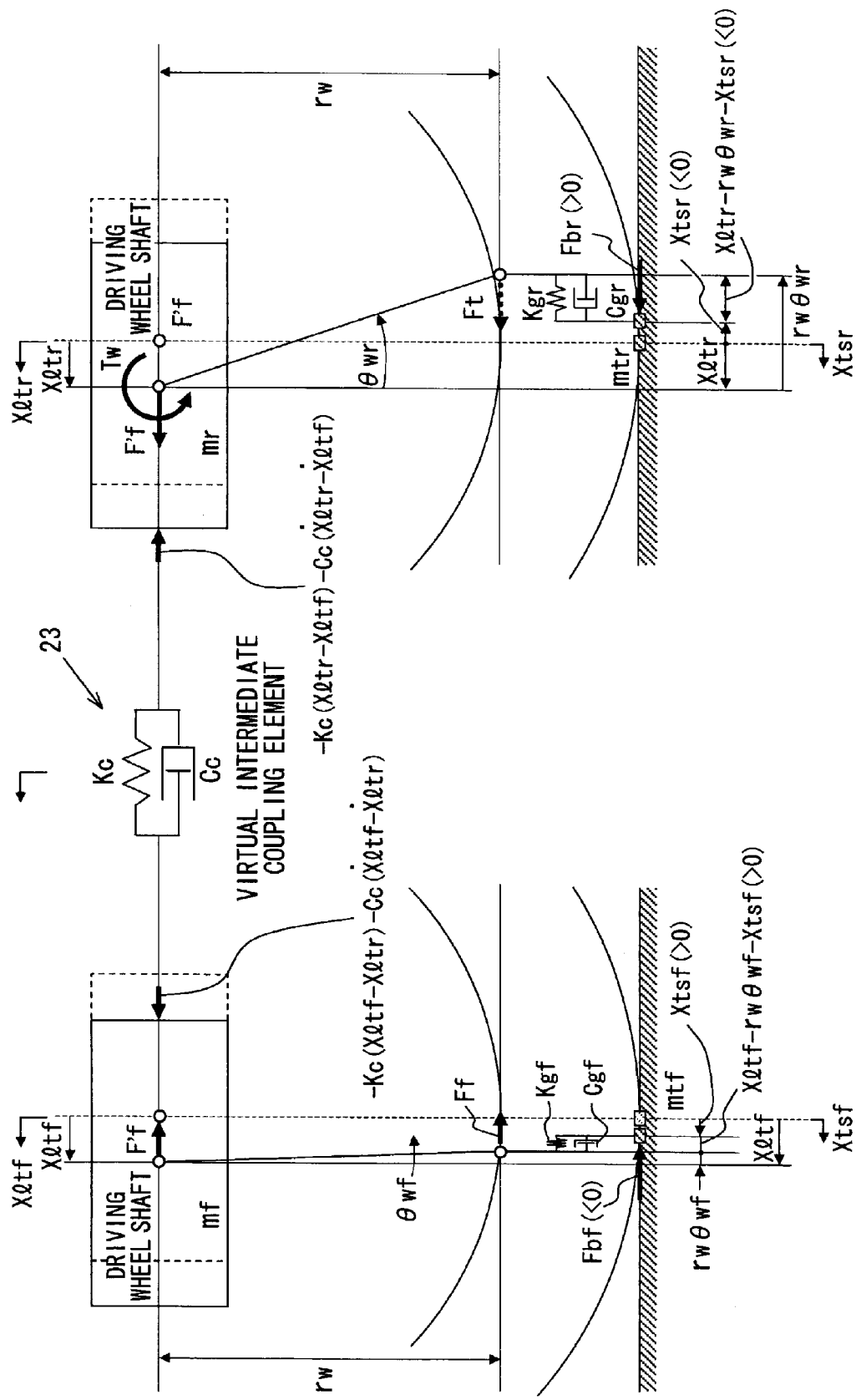
FIG. 6 is an explanatory diagram showing the tire vibration model.

Specific motion equations related to the rear wheel tire vibration model 21, the front wheel tire vibration model 22, and the virtual intermediate coupling element vibration model 23 will be described with reference to FIG. 6.

First, the vibration generation mechanism in the longitudinal direction (rotating direction) of the tires will be described below. In the case of the rear wheels that are the driving wheels, even if the wheels rotate due to the drive torque which is transmitted through the rear wheel shaft, because the tires receive the resistance by a frictional force of the road surface, the tires are twisted in the rotating direction and elastically deformed. In the case of the front wheels that are the driven wheels, because the vehicle body is going to move in the longitudinal direction by the translational force generated by the rotations of the rear wheels, the front wheel tires are going to rotate by the frictional force of the road surface. However, because the axle of the front wheels is going to keep the state by an inertia force, the tires are similarly twisted and elastically deformed. When the front and rear wheel tires are elastically deformed in the above manner, a restoring force are generated in the tires, and the tires are twisted back. The above phenomenon is repeated, thereby generating the vibrations in the longitudinal direction (rotating direction) of the tires.

In the rear wheel tire vibration model 21, basic equations that are bases for calculating the motion equations for expressing the above vibrations taking the virtual intermediate coupling element vibration model 23 into consideration are represented by Expression 1 to Expression 4.

$$F_t = F'_t = K_{gr}(x_{ltr} - r_w\theta_{wr} - x_{tsr}) - C_{gr}(\dot{x}_{ltr} - r_w\dot{\theta}_{wr} - \dot{x}_{tsr})(>0) \quad (\text{Ex. 1})$$

$$I_w\ddot{\theta}_{wr} = -r_wK_c(x_{ltr} - x_{ltf}) - r_wC_c(\dot{x}_{ltr} - \dot{x}_{ltf}) - r_wF_t + T_w \quad (\text{Ex. 2})$$

$$m_r\ddot{x}_{ltr} = -K_c(x_{ltr} - x_{ltf}) - C_c(\dot{x}_{ltr}, \dot{x}_{ltf}) + F'_t \quad (\text{Ex. 3})$$

$$m_{tr}\ddot{x}_{tsr} = -K_{gr}\{x_{tsr} - (x_{ltr} - r_w\theta_{wr})\} - C_{gr}\{\dot{x}_{tsr} - (\dot{x}_{ltr} - r_w\dot{\theta}_{wr})\} + F_{br} \quad (\text{Ex. 4})$$

In the above Expressions:

$F_t$ is a translational force that pushes the driving shaft forwardly of the vehicle body by the road surface reaction force that is received by the rear wheel tires;

$F'_t$ is a counteracting force (=$F_t$) by which the rear wheel shaft is pushed back in the rear of the vehicle body;

$K_{gr}$ is a twist rigidity of the rear wheel tires in the rotating direction;

$x_{ltr}$ is the amount of displacement of the rear wheel shaft on the ground fixed coordinate base;

$r_w$ is a wheel radius;

$\theta_{wr}$ is a relative twist angle in the rotating direction of the rear wheels and tires;

$x_{tsr}$ is the amount of displacement in the vehicle body longitudinal direction at a rear wheel tire road surface ground point (the amount of slip between the tire and road surface);

$C_{gr}$ is a twist attenuation coefficient in the rotating direction of the rear wheel tire;

$I_w$ is a rotary inertia moment of the wheels;

$K_c$ is a spring rigidity of the virtual intermediate coupling element;

$x_{ltf}$ is the amount of displacement of the driven wheel (front wheel) rotating shaft on the ground fixed coordinate base;

$C_c$ is an attenuation coefficient of the virtual intermediate coupling element;

$T_w$ is a drive torque that is exerted on the rear wheel rotating shaft;

$m_r$ is a rear wheel under-spring mass; $m_{tr}$ is a mass of the virtual microscopic element at a ground point between the rear wheel tire and the road surface; and $F_{br}$ is a travel resistance that affects the rear wheel tire ground point.

In the front wheel tire vibration model 22, basic equations that are bases for calculating the motion equations for expressing the above vibrations taking the virtual intermediate coupling element vibration model 23 into consideration are represented by Expression 5 to Expression 8.

$$F_f = K_{gf}(x_{ltf} - r_w\theta_{wf} - x_{tsf}) - C_{gf}(\dot{x}_{ltf} - r_w\dot{\theta}_{wf} - \dot{x}_{tsf})(<0) \quad (\text{Ex. 5})$$

$$I_w\dot{\theta}_{wf} = r_wK_c(x_{ltf} - x_{ltr}) - r_wC_c(\dot{x}_{ltf} - \dot{x}_{ltr}) - r_wF_f \quad (\text{Ex. 6})$$

$$m_f\ddot{x}_{ltf} = -K_c(x_{ltf} - x_{ltr}) - C_c(\dot{x}_{ltf} - \dot{x}_{ltr}) + F'_f \quad (\text{Ex. 7})$$

$$m_{tf}\ddot{x}_{tsf} = -K_{gf}\{x_{tsf} - (x_{ltf} - r_w\theta_{wf})\} - C_{gf}\{\dot{x}_{tsf} - (\dot{x}_{ltf} - r_w\dot{\theta}_{wf})\} + F_{bf} \quad (\text{Ex. 8})$$

In the above Expressions:

$F_f$ is a translational force backward in a wheel end tangent direction due to the travel resistance that is received by the front wheel tires;

$F'_f$ is a translational force (=$F_f$) by which the front wheel rotating shaft pushes back the vehicle body backward by $F_f$;

$K_{gf}$ is a twist rigidity of the front wheel tires in the rotating direction;

$\theta_{wf}$ is a relative twist angle in the rotating direction of the front wheels and tires;

$x_{tsf}$ is the amount of displacement in the vehicle body longitudinal direction at a front wheel tire road surface ground point (the amount of slip between the tire and road surface);

$C_{gf}$ is a twist attenuation coefficient in the rotating direction of the front wheel tire;

$m_f$ is a front wheel under-spring mass;

$m_{tf}$ is a mass of the virtual microscopic element at a ground point between the front wheel tire and the road surface; and $F_{bf}$ is a travel resistance that affects the front wheel tire ground point.

If the amount of displacement of the virtual intermediate coupling element is defined as $x_l$, the amount of displacement $x_l$ corresponds to a difference between the amount of displacement $x_{ltf}$ of the front wheel rotating shaft and the amount of displacement $x_{ltr}$ of the rear wheel rotating shaft. As a result, a motion equation represented by the following Expression 9 is obtained by the above basic equation.

$$\ddot{x}_l = -(K_c/m_f + K_c/m_r)x_l - (C_c/m_f + C_c/m_r)\dot{x}_l - K_{gf}/m_f x_{wf} - C_{gf}/m_f \dot{x}_{wf} + K_{gr}/m_r x_{wr} + C_{gr}/m_r \dot{x}_{wr} \quad (\text{Ex. 9})$$

If the amount of relative displacement in the vehicle body longitudinal direction between the front wheel rotating shaft and the driven wheel tire road surface ground point is defined as $x_{wf}$, because the amount of relative displacement $x_{wf} = x_{ltf} - r_w\theta_{wf} - x_{tsf}$ is satisfied, a motion equation of the following Expression 10 is obtained by the above basic equation.

$$\ddot{x}_{wf} = -(K_c/m_f - r_w^2 K_c/I_w)x_l - (C_c/m_f - r_w^2 C_c/I_w)\dot{x}_l$$

$$-(K_{gf}/m_f + r_w^2 K_{gf}/I_w + K_{gf}/m_{tf})x_{wf} - (C_{gf}/m_f + r_w^2 C_{gf}/I_w + C_{gf}/m_{tf})\dot{x}_{wf} - (1/m_{tf})F_{bf} \quad (\text{Ex. 10})$$

Further, the amount of relative displacement in the vehicle body longitudinal direction between the rear wheel rotating shaft and the rear wheel tire road surface ground point is defined as $x_{wr}$, because the amount of relative displacement $x_{wr} = x_{ltr} - r_w\theta_{wr} - x_{tsr}$ is satisfied, a motion equation of the following Expression 11 is obtained by the above basic equation.

$$\ddot{x}_{wr} = (K_c/m_r - r_w^2 K_c/I_w)x_l + (C_c/m_r - r_w^2 C_c/I_w)\dot{x}_l - (K_{gr}/m_r + r_w^2 K_{gr}/I_w + K_{gr}/m_{tr})x_{wr}$$

$$-(C_{gr}/m_r + r_w^2 C_{gr}/I_w + C_{gr}/m_{tr})\dot{x}_{wr} - (1/m_{tr})F_{br} - (r_w/I_w)T_w \quad (\text{Ex. 11})$$

where the state variables $x_1$ to $x_6$ and $u_1$ to $u_3$ are defined by the following Expression 12.

$$x_1 = x_l, x_2 = \dot{x}_l, x_3 = x_{wf}, x_4 = \dot{x}_{wf}, x_5 = x_{wr}, x_6 = \dot{x}_{wr}$$

$$u_1 = F_{bf}, u_2 = F_{br}, u_3 = T_w \quad (\text{Ex. 12})$$

Then, the respective first-order differentials of the state variables $x_1$ to $x_6$ can be expressed by Expressions 13 to 18.

$$\dot{x}_1 = \dot{x}_l = x_2 \quad (\text{Ex. 13})$$

$$\dot{x}_2 = \ddot{x}_l = -(K_c/m_f + K_c/m_r)x_l - (C_c/m_f + C_c/m_r)\dot{x}_l - K_{gf}/m_f x_{wf}$$

$$-C_{gf}/m_f \dot{x}_{wf} + K_{gr}/m_r x_{wr} + C_{gr}/m_r \dot{x}_{wr}$$

$$= c_1 x_1 + c_2 x_2 + c_3 x_3 + c_4 x_4 + c_5 x_5 + c_6 x_6 \quad (\text{Ex. 14})$$

$\dot{x}_3 = \dot{x}_{wf} = x_4$ (Ex. 15)

$\dot{x}_4 = \ddot{x}_{wf} = -(K_c/m_f - r_w^2 K_c/I_w)x_l - (C_c/m_f - r_w^2 C_c/I_w)\dot{x}_l -$
$\quad (K_{gf}/m_f + r_w^2 K_{gf}/I_w + K_{gf}/m_{tf})x_{wf}$ $\quad -(C_{gf}/m_f + r_w^2 C_{gf}/I_w + C_{gf}/m_{tf})\dot{x}_{wf} - (1/m_f)F_{bf}$ $= d_1 x_1 + d_2 x_2 + d_3 x_3 + d_4 x_4 + q_1 u_1$ (Ex. 16)

$\dot{x}_5 = \dot{x}_{wr} = x_6$ (Ex. 17)

$\dot{x}_6 = \ddot{x}wr = -(K_c/m_r - r_w^2 K_c/I_w)x_l - (C_c/m_r - r_w^2 C_c/I_w)\dot{x}_l -$
$\quad (K_{gr}/m_r + r_w^2 K_{gr}/I_w K_{gr}/m_{tr})x_{wr}$ $\quad -(C_{gr}/m_r + r_w^2 C_{gr}/I_w + C_{gr}/m_{tr})\dot{x}_{wr} - (1/m_{tr})F_{br} - (r_w/I_w)T_w$ $= e_1 x_1 + e_2 x_2 + e_5 x_5 + e_6 x_6 + q_2 u_2 + q_3 u_3$ (Ex. 18)

The above Expressions 13 to 18 are put together to obtain a state equation represented by the following Expression 19, which corresponds to the rear wheel tire vibration model 21, the front wheel tire vibration model 22, and the virtual intermediate coupling model 23.

$$\begin{bmatrix} \frac{dx_1}{dt} \\ \frac{dx_2}{dt} \\ \frac{dx_3}{dt} \\ \frac{dx_4}{dt} \\ \frac{dx_5}{dt} \\ \frac{dx_6}{dt} \end{bmatrix} = \begin{bmatrix} 0 & 1 & 0 & 0 & 0 & 0 \\ c_1 & c_2 & c_3 & c_4 & c_5 & c_6 \\ 0 & 0 & 0 & 1 & 0 & 0 \\ d_1 & d_2 & d_3 & d_4 & 0 & 0 \\ 0 & 0 & 0 & 0 & 0 & 1 \\ e_1 & e_2 & 0 & 0 & e_5 & e_6 \end{bmatrix} \begin{bmatrix} x_1 \\ x_2 \\ x_3 \\ x_4 \\ x_5 \\ x_6 \end{bmatrix} + \begin{bmatrix} 0 & 0 & 0 \\ 0 & 0 & 0 \\ 0 & 0 & 0 \\ q_1 & 0 & 0 \\ 0 & 0 & 0 \\ 0 & q_2 & q_3 \end{bmatrix} \begin{bmatrix} u_1 \\ u_2 \\ u_3 \end{bmatrix}$$ (Ex. 19)

$c_1 = -(K_c/m_f + K_c/m_r)$
$c_2 = -(C_c/m_f + C_c/m_r)$
$c_3 = -K_{gf}/m_f$
$c_4 = -C_{gf}/m_f$
$c_5 = K_{gr}/m_r$
$c_6 = C_{gr}/m_r$
$d_1 = -(K_c/m_f - r_w^2 K_c/I_w)$
$d_2 = -(C_c/m_f - r_w^2 C_c/I_w)$
$d_3 = -(K_{gf}/m_f - r_w^2 K_{gf}/I_w + K_{gf}/m_{tf})$
$d_4 = -(C_{gf}/m_f - r_w^2 C_{gf}/I_w + C_{gf}/m_{tf})$
$e_1 = (K_c/m_r - r_w^2 K_c/I_w)$
$e_2 = (C_c/m_r - r_w^2 C_c/I_w)$
$e_5 = (K_{gr}/m_r + r_w^2 K_{gr}/I_w + K_{gr}/m_{tr})$
$e_6 = (C_{gr}/m_r + r_w^2 C_{gr}/I_w + C_{gr}/m_{tr})$
$q_1 = -1/m_{tf}$
$q_2 = -1/m_{tr}$
$q_3 = -r_w/I_w$

A relative displacement velocity $dx_{wf}/dt$ that is the first-order differential of the amount of relative displacement $x_{wf}$ in the vehicle body longitudinal direction between the front wheel rotating shaft and the front wheel tire road surface ground point can be applied as the internal state quantity that expresses the longitudinal vibrations of the front wheel tires. The relative displacement velocity is expressed by the following Expression 20 based on the state equation of Expression 19.

$$y_1 = \frac{dx_{wf}}{dt} = x_4 = [0 \quad 0 \quad 0 \quad 1 \quad 0 \quad 0] \begin{bmatrix} x_1 \\ x_2 \\ x_3 \\ x_4 \\ x_5 \\ x_6 \end{bmatrix}$$ (Ex. 20)

Also, a relative displacement velocity $dx_{wr}/dt$ that is the first-order differential of the amount of relative displacement $x_{wr}$ in the vehicle body longitudinal direction between the rear wheel rotating shaft and the rear wheel tire road surface ground point can be applied as the internal state quantity that expresses the longitudinal vibrations of the rear wheel tires. The relative displacement velocity is expressed by the following Expression 21 based on the state equation of Expression 19.

$$y_2 = \frac{dx_{wr}}{dt} = x_6 = [0 \quad 0 \quad 0 \quad 0 \quad 0 \quad 1] \begin{bmatrix} x_1 \\ x_2 \\ x_3 \\ x_4 \\ x_5 \\ x_6 \end{bmatrix}$$ (Ex. 21)

Further, a displacement velocity $dx_l/dt$ that is the first-order differential of the amount of displacement $x_l$ of the virtual intermediate coupling element can be applied as the internal state quantity that expresses the longitudinal vibrations of the virtual intermediate coupling element. The relative displacement velocity is expressed by the following Expression 22 based on the state equation of Expression 19.

$$y_3 = \frac{dx_l}{dt} = x_2 = [0 \quad 1 \quad 0 \quad 0 \quad 0 \quad 0] \begin{bmatrix} x_1 \\ x_2 \\ x_3 \\ x_4 \\ x_5 \\ x_6 \end{bmatrix}$$ (Ex. 22)

Figure 7:
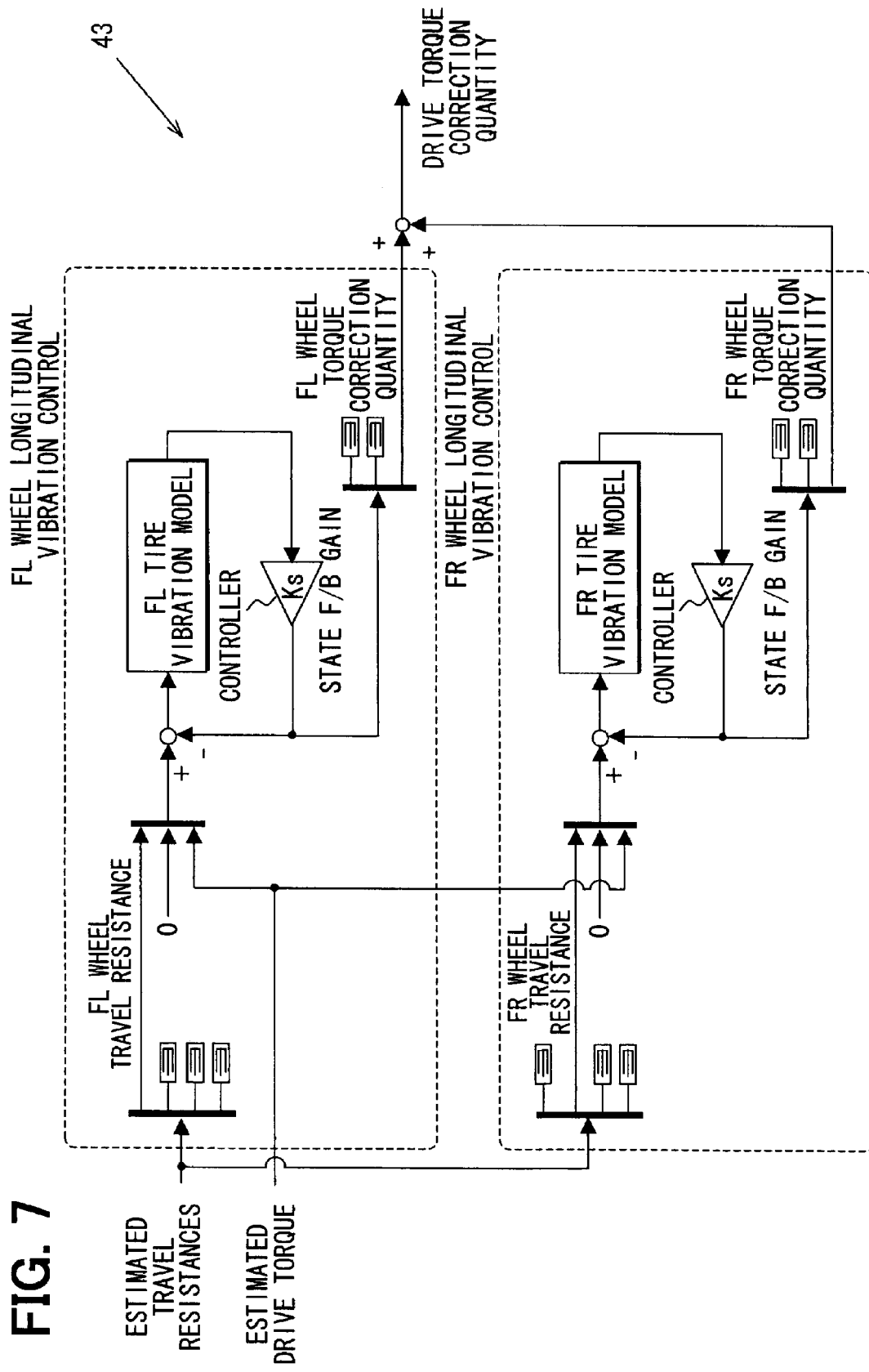
FIG. 7 is a block diagram showing a detailed functional structure in a front wheel tire longitudinal vibration estimate/control unit of a tire control system.

The front wheel tire longitudinal vibration estimate/control unit 43 in the tire control system 40 of FIG. 4 outputs the relative displacement velocity $y_1$ that is calculated according to the above Expression 20 as the internal state quantity to the controller with respect to the front right and left wheels as shown in FIG. 7. The controller multiplies a given state feedback gain Ks by the relative displacement velocity $y_1$ to calculate the drive torque correction quantity. In this situation, the state feedback gain Ks is set so that the relative displacement velocity $y_1$ can rapidly approach zero. The drive torque correction quantity is input to the tire vibration model by feedback, and also output to a tire vibration correction drive torque calculation unit 44 as the drive torque correction quantity of the respective front right and left wheels.

Figure 8:
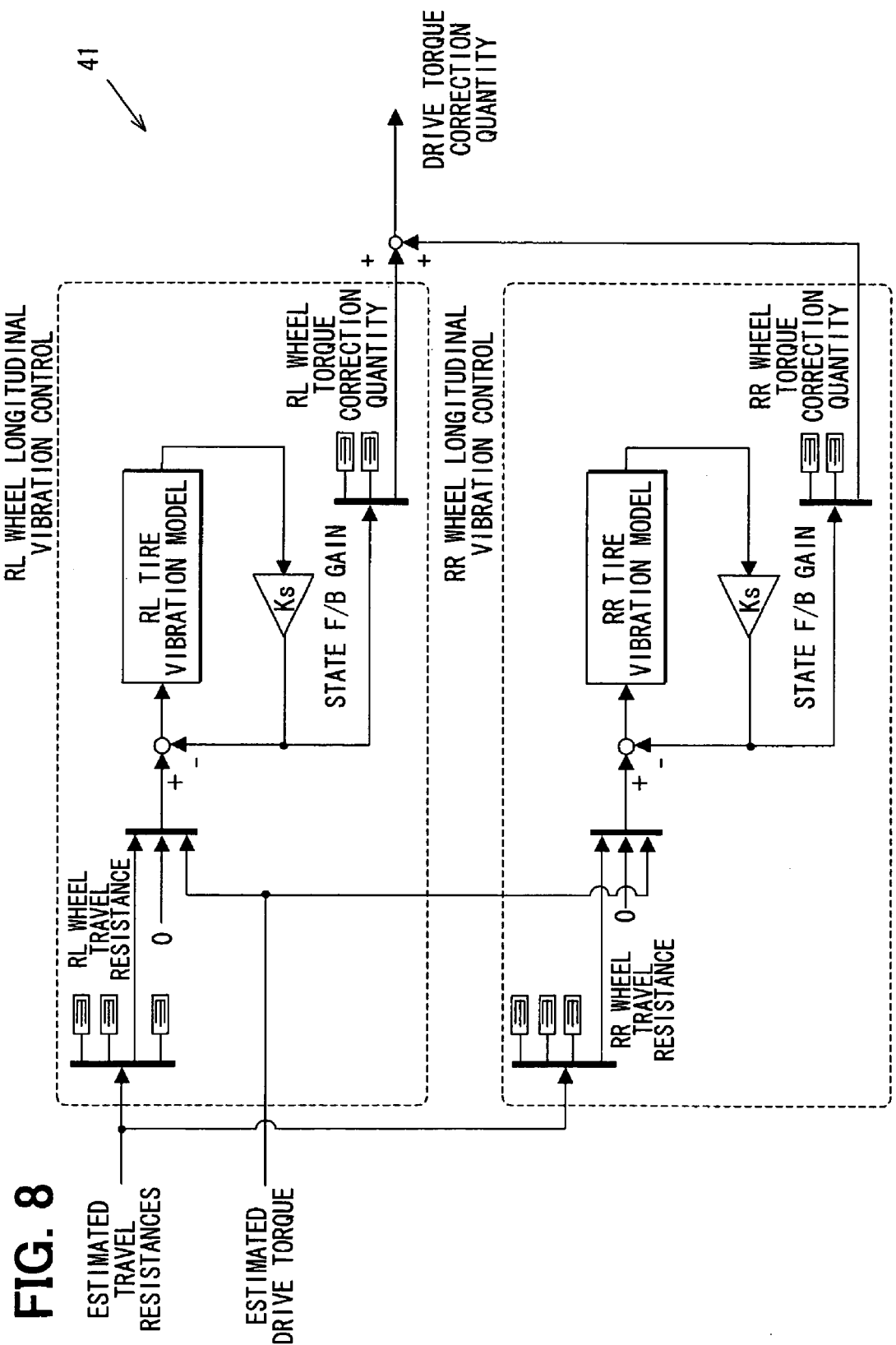
FIG. 8 is a block diagram showing a detailed functional structure in a rear wheel tire longitudinal vibration estimate/control unit of the tire control system.

Also, the rear wheel tire longitudinal vibration estimate/control unit 41 in the tire control system 40 outputs the relative displacement velocity $y_2$ that is calculated according to the above Expression 21 as the internal state quantity to the controller with respect to the rear right and left wheels as shown in FIG. 8. The controller multiplies the given state feedback gain Ks by the relative displacement velocity $y_2$ to calculate the drive torque correction quantity. The drive torque correction quantity is input to the tire vibration model by feedback, and also output to the tire vibration correction drive torque calculation unit 44 as the drive torque correction quantity of the respective rear right and left wheels.

Figure 9:
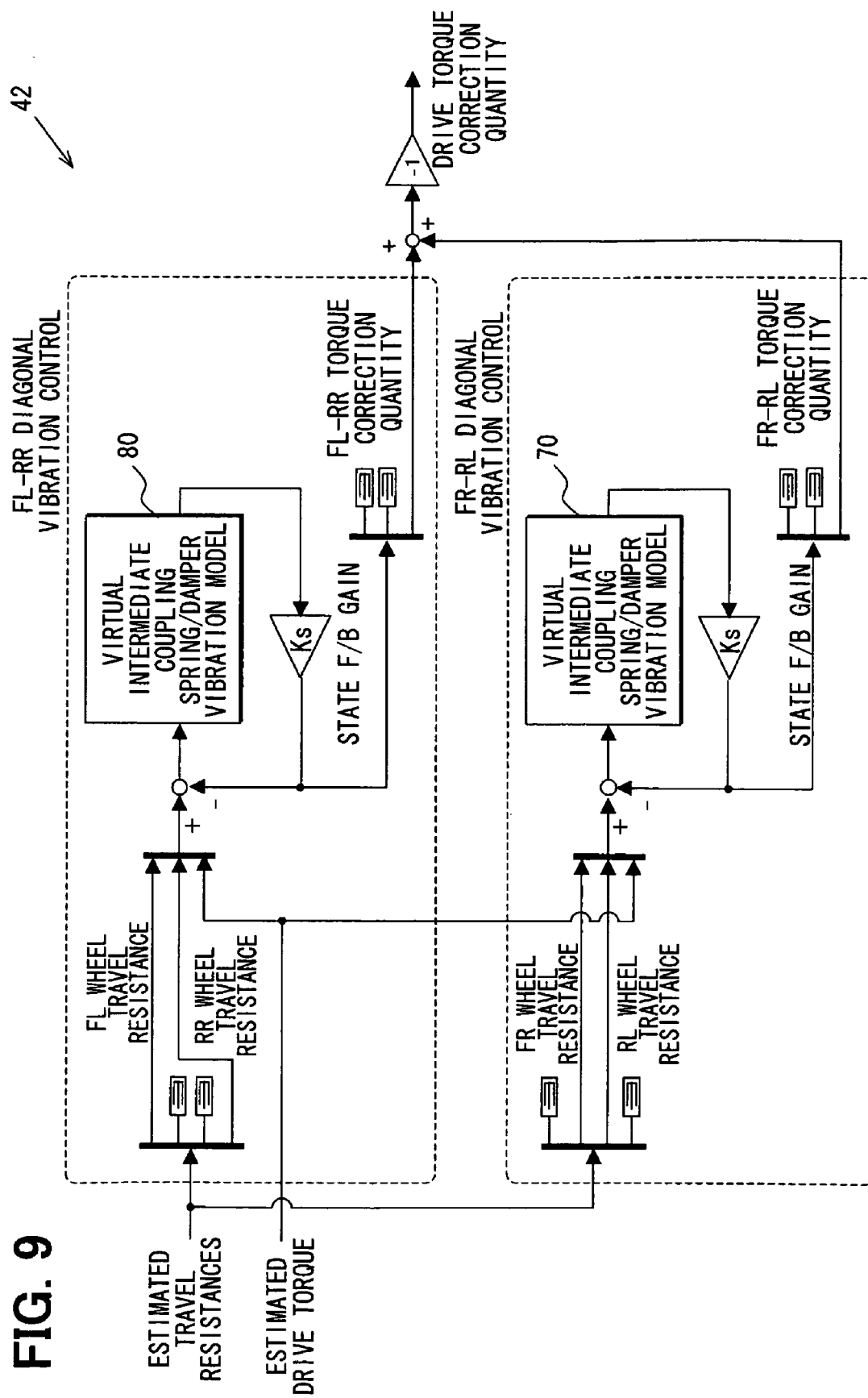
FIG. 9 is a block diagram showing a detailed functional structure in a virtual intermediate coupling element longitudinal vibration estimate/control unit of the tire control system.

Further, the virtual intermediate coupling element longitudinal vibration estimate/control unit 42 in the tire control system 40 outputs the displacement velocity $y_3$ that is calculated according to the above Expression 22 as the internal state quantity to the controller with respect to a pair of FL wheel and RR wheel, and a pair of RF wheel and RL wheel as shown in FIG. 9, respectively. The controller multiplies the given state feedback gain Ks by the relative displacement velocity $y_3$ to calculate the drive torque correction quantity. In this case, the respective state feedback gains Ks are set so that the relative displacement velocity $y_3$ can rapidly approach zero. The drive torque correction quantity is input to the virtual intermediate coupling element vibration model by feedback in each of the pairs, and the drive torque correction quantities are calculated with respect to the FL wheel and the RR wheel, and the FR wheel and the RL wheel, and then output to the tire vibration correction braking force calculation unit 44.

The drive torque correction quantity that is calculated by the virtual intermediate coupling element longitudinal vibration estimate/control unit 42 inverts its sign and is then outputted to the tire vibration correction braking force calculation unit 44, as shown in FIG. 9. When the sign of the braking force correction quantity is inverted, the vibrations of the virtual intermediate coupling elements 80 and 90 are not suppressed, but conversely, the drive torque is connected so that the vibrations are excited.

However, as described above, the virtual intermediate coupling elements are imaginary and merely virtual. Accordingly, even if the drive torque is so corrected as to vibrate the virtual intermediate coupling elements, the vibrations do not become actually larger. Rather, when the drive torque is so corrected as to vibrate the virtual intermediate coupling elements 80 and 90, thereby making it possible to shift the natural frequencies in the transmission system formed of the FL wheel and the RR wheel and the transmission system made up of the FR wheel and the RL wheel to the lower frequency side. As a result, it is confirmed that the vibrations in the transmission systems can be isolated.

In the above example, the sign of the internal state quantity (displacement velocity $y_3$) indicative of the vibration state of the virtual intermediate coupling element vibration model is inverted to calculate the drive torque correction quantity for vibration isolation. However, the present invention is not limited to this example. For example, it is possible that the signs of the drive torque correction quantities obtained from the internal state quantities indicative of the vibration state of the front wheel tires and the vibration state of the rear wheel tires are inverted to calculate the drive torque correction quantities that vibrate those vibration states, and the drive torque correction quantity obtained from the internal state quantity indicative of the vibration state of the virtual intermediate coupling element is calculated as the drive torque correction quantity which makes the vibration state approach zero without inverting its sign. Even with the combination of the above calculations, it is confirmed that the tire vibrations are suppressed as a whole. Further, the drive torque correction quantities can be calculated so that all of the vibration states approach zero with respect to the vibration state of the front wheel tire, the vibration state of the rear wheel tire, and the vibration state of the virtual intermediate coupling element, or the drive torque correction quantities can be calculated so as to vibrate all of those vibration states as the occasion demands. That is, it is possible to arbitrarily combine a first manner (calculation of the correction quantity for vibration suppression) and a second manner (calculation of the correction quantity for vibration) which calculate the drive torque correction quantity with respect to the respective vibrations of the vibration state of the front wheel tires, the vibration state of the rear wheel tires, and the vibration state of the virtual intermediate coupling element.

The tire vibration correction drive torque calculation unit 44 sums up (adds) the drive torque correction quantities that are calculated in the rear wheel tire longitudinal vibration estimate/control unit 41, the virtual intermediate coupling element longitudinal vibration estimate/control unit 42, and the front wheel tire longitudinal vibration estimate/control unit 43, respectively to calculate the final drive torque correction quantity in the tire control system 40.

Figure 10A:
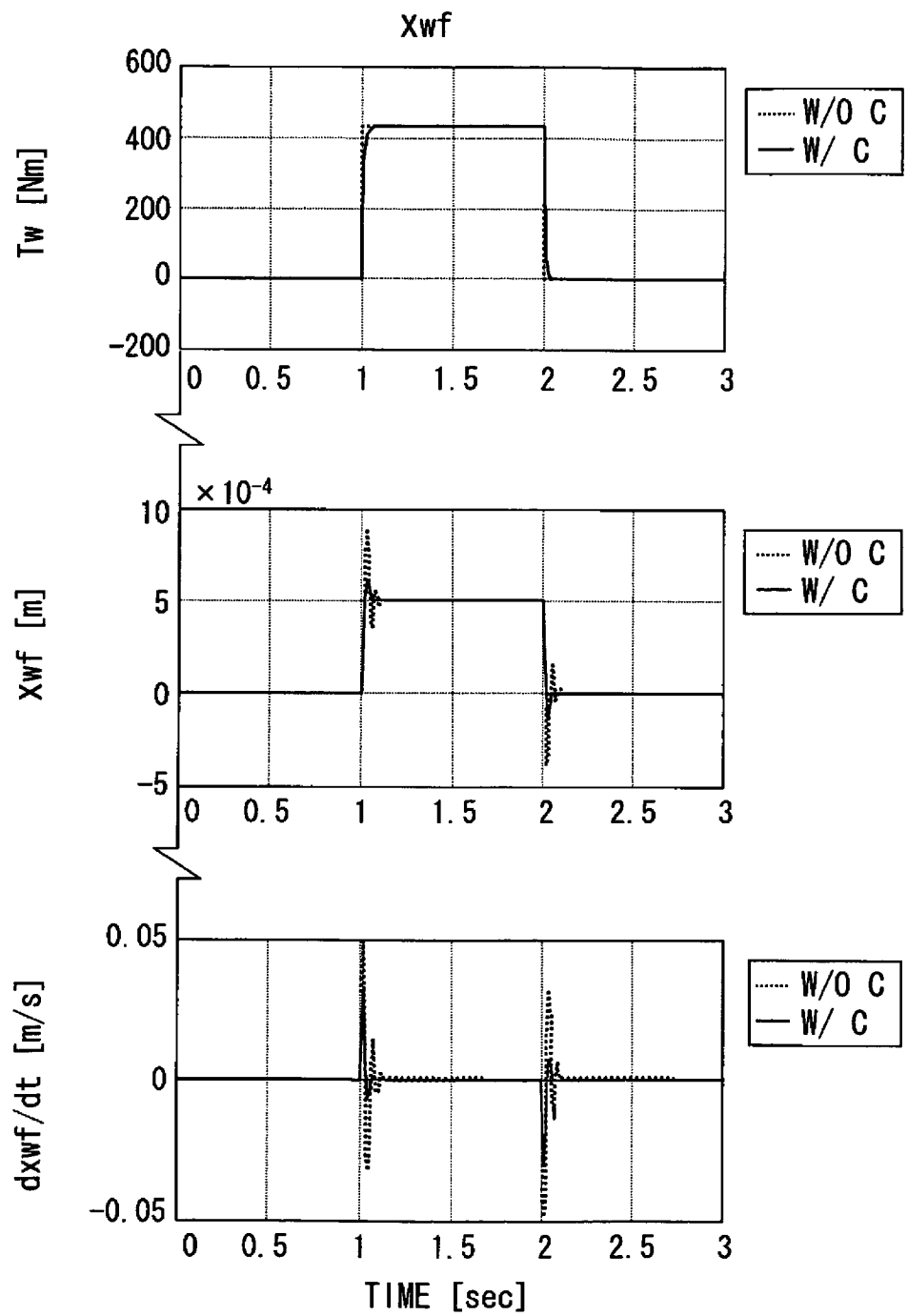
FIGS. 10A, 10B and 10C are graphs showing the simulation results indicative of a difference in the longitudinal vibrations that occur in the respective tires between a case in which a control is conducted using a drive torque correction quantity calculated by the tire control system and a case in which the control is not conducted, respectively.
Figure 10B:
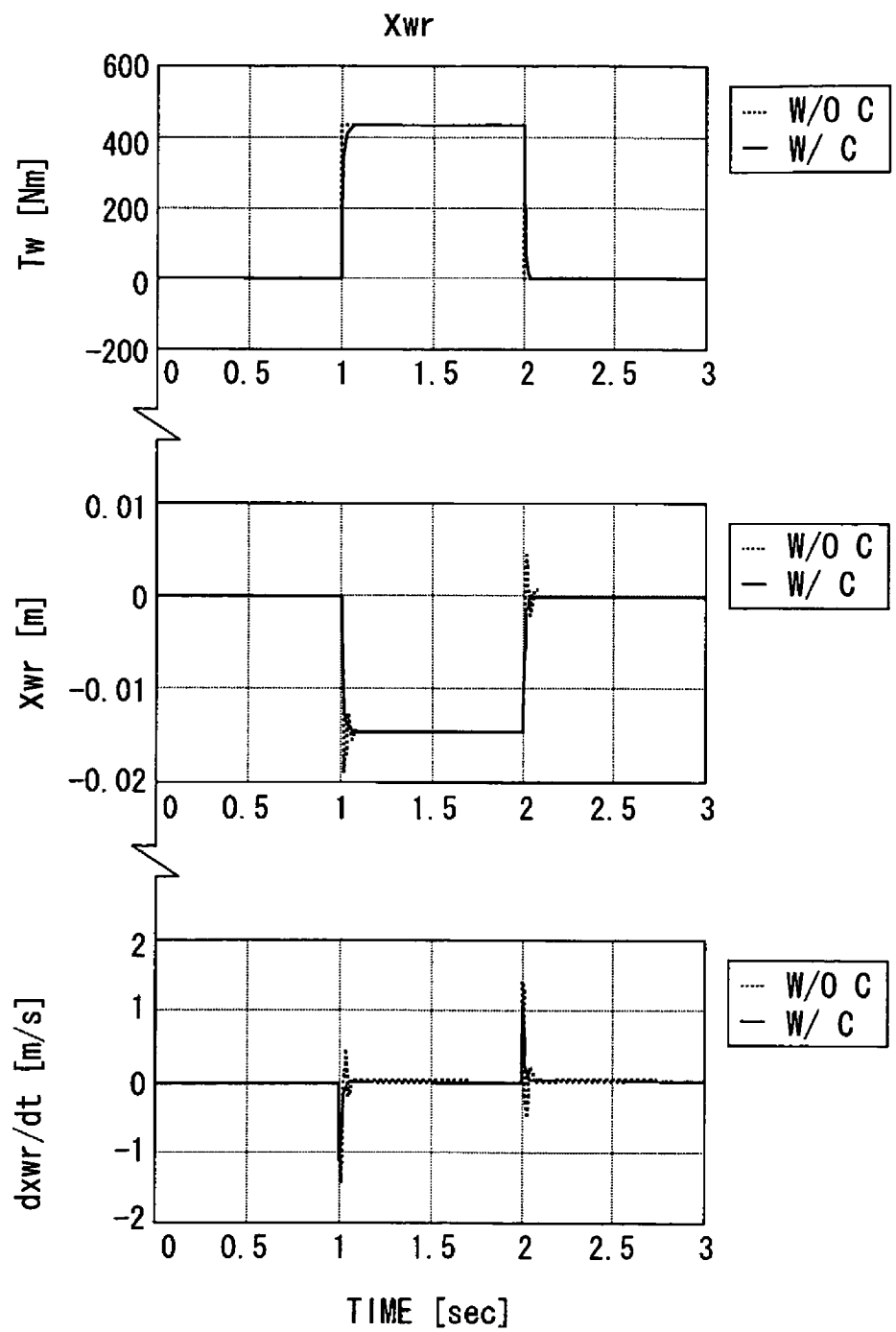
Figure 10C:
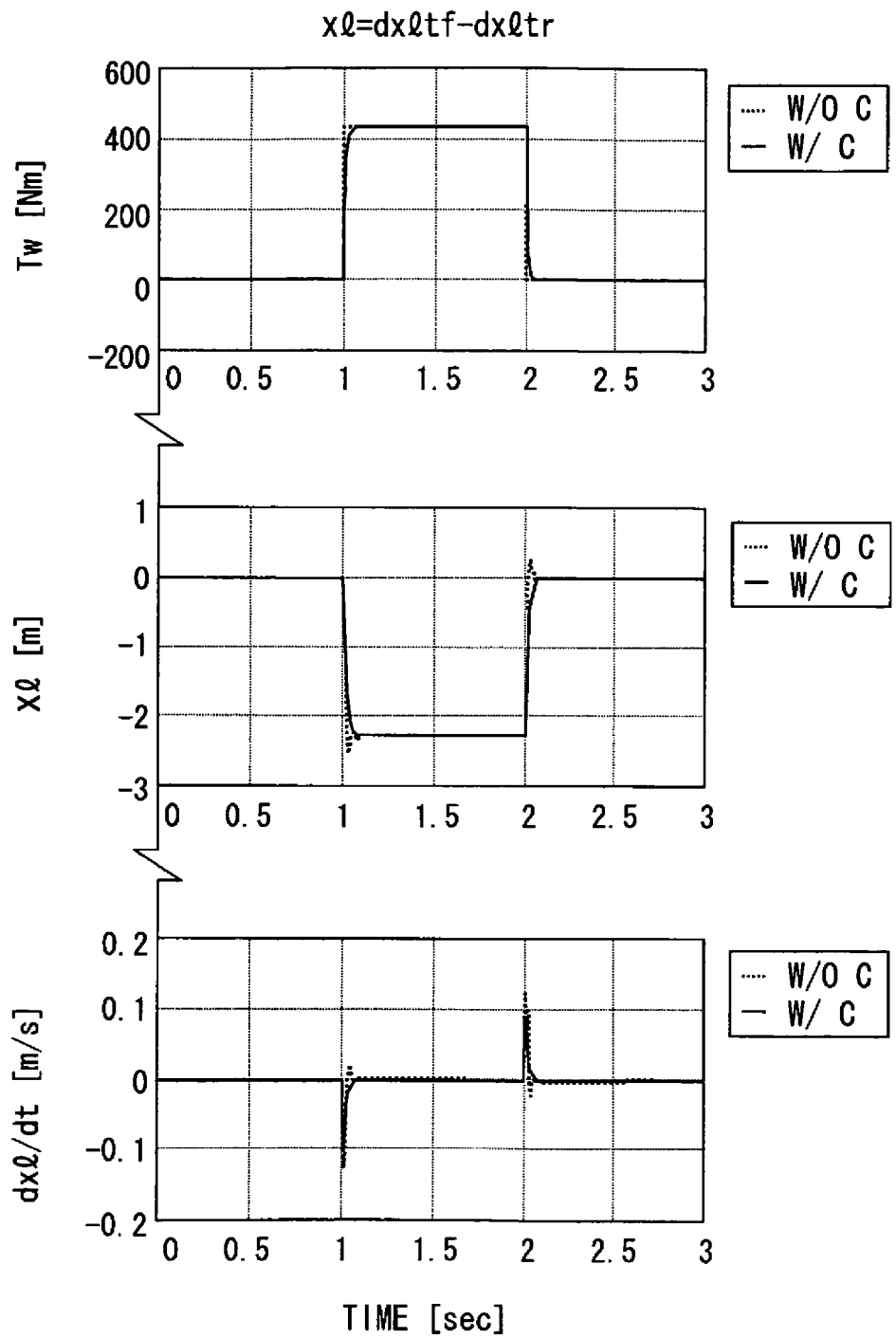

FIGS. 10A, 10B and 10C are the simulation results showing a difference in the longitudinal vibrations that are generated in the respective tires between a case of conducting a control (with control shown by a solid line) by the drive torque correction quantity that is calculated by the above tire control system 40 and a case of not conducting the control (without control shown by a dotted line), respectively.

FIG. 10A shows a change in the drive torque $T_w$, a change in the relative displacement amount $X_{wf}$ between the front wheel rotating shaft and the front wheel tire road surface ground point in the vehicle body longitudinal direction, and a change in the relative displacement velocity $dx_{wf}/dt$. FIG. 10B shows a change in the drive torque $T_w$, a change in the relative displacement amount $x_{wr}$ between the rear wheel rotating shaft and the rear wheel tire road surface ground point in the vehicle body longitudinal direction, and a change in the relative displacement velocity $dx_{wr}/dt$. FIG. 10C shows a change in the drive torque $T_w$, a change in the displacement amount $x_I$ of the virtual intermediate coupling element, and a change in the displacement velocity $dx_I/dt$.

In all cases of FIGS. 10A to 10C, the basic drive torque changes so as to rapidly rise up and fall down. When the basic drive torque is not corrected by the drive torque correction quantity (in the case of no control), a change in the respective displacement amounts and the respective displacement velocities are large to cause hunting. On the contrary, when the basic drive torque is corrected by the drive torque correction quantity, since the change in the drive torque $T_w$ is reduced to reduce the change in the displacement amount and the displacement velocity. Further, in the virtual intermediate coupling element, although the drive torque correction quantity is so calculated as to vibrate the virtual intermediate coupling element, the change in the displacement amounts $x_I$ and $dx_I/dt$ of the virtual intermediate coupling element becomes small and smooth.

As represented by the above simulation results, the basic drive torque is corrected by the drive torque correction quantity that is calculated by the tire vibration correction drive torque calculation unit 44, thereby making it possible to suppress the tire vibrations. Further, the tire vibrations are suppressed, thereby enabling such an advantage that the rigidity feeling of the tires is improved to be obtained.

As shown in FIGS. 3 and 4, the chassis control system 50 includes a chassis longitudinal vibration estimate/control unit 51 having a chassis vibration model 24 that inputs the translational reaction force and a translational force which are received by the front wheel shaft and the rear wheel shaft, and expresses the motion state in the longitudinal direction of the chassis. The chassis longitudinal vibration estimate/control unit 51 calculates the drive torque correction quantity for suppressing the vibrations of the chassis in the longitudinal direction.

A specific motion equation related to the chassis vibration model 24 will be described with reference to FIG. 11. The chassis has the longitudinal flexible rigidity of the suspension arm, and the rigidity of the frame and the bushing as the inner vibration element. For this reason, the inner vibration elements (elastic elements) at the respective portions of the chassis is approximated by simple spring and damper elements as a whole, and those elements are disposed between the front wheel shaft, the rear wheel shaft and chassis frame.

Figure 11:
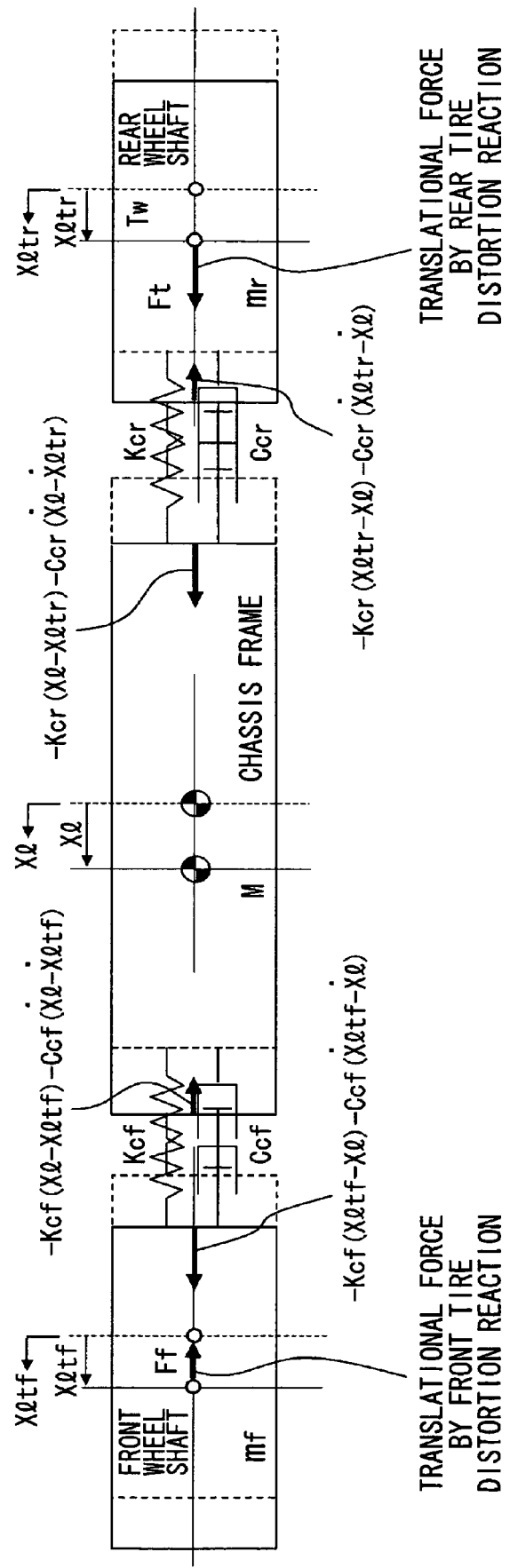
FIG. 11 is an explanatory diagram showing a chassis vibration model.

FIG. 11 shows a model diagram showing the chassis vibration model that is made up of the above concept. Basic equations that are bases for calculating the motion equations for expressing the longitudinal vibrations in the chassis vibration model are represented by Expression 23 to Expression 25. Expression 23 is an equation related to the chassis frame, Expression 24 is an equation related to the front wheel shaft, and Expression 25 is an equation related to the rear wheel shaft.

$$M\ddot{x}_l = -K_{cf}(x_l - x_{ltf}) - C_{cf}(\dot{x}_l - \dot{x}_{ltf}) - K_{cr}(x_l - x_{ltr}) - C_{cr}(\dot{x}_l - \dot{x}_{ltr}) \quad \text{(Ex. 23)}$$

$$m_f \ddot{x}_{ltf} = -K_{cf}(x_{ltf} - x_l) - C_{cf}(\dot{x}_{ltf} - \dot{x}_l) + F_f \quad \text{(Ex. 24)}$$

$$m_r \ddot{x}_{ltr} = -K_{cr}(x_{ltr} - x_l) - C_{cr}(\dot{x}_{ltr} - \dot{x}_l) + F_t \quad \text{(Ex. 25)}$$

In the above Expressions:
M is a mass of the chassis frame;
$x_l$ is the amount of displacement of the chassis frame on the ground fixed coordinate base;
$K_{cf}$ is a spring rigidity in the longitudinal direction between the front wheel shaft and the chassis frame;
$x_{ltf}$ is the amount of displacement of the front wheel shaft on the ground fixed coordinate base;
$C_{cf}$ is an attenuation coefficient in the longitudinal direction between the front wheel shaft and the chassis frame;
$K_{cr}$ is a spring rigidity in the longitudinal direction between the rear wheel shaft and the chassis frame;
$x_{ltr}$ is the amount of displacement of the rear wheel on the ground fixed coordinate base;
$C_{cr}$ is an attenuation coefficient in the longitudinal direction between the rear wheel and the chassis frame;
$m_f$ is a front wheel under-spring mass;
$F_f$ is a translational force that is propagated to the front wheel shaft from the front wheel tires;
$m_r$ is a rear wheel under-spring mass; and
$F_t$ is a translational force that is propagated to the rear wheel shaft from the rear wheel tires.

In the above Expressions, when the amount of relative displacement between the front wheel shaft and the chassis frame is defined as $x_{lf}$, the amount of relative displacement $x_{lf}$ corresponds to a difference between the amount of displacement $x_l$ of the chassis frame and the amount of displacement $x_{ltf}$ of the front wheel shaft. As a result, a motion equation represented by the following Expression 26 is obtained by the above basic Expression.

$$\ddot{x}_{lf} = \ddot{x}_l - \ddot{x}_{ltf} = -K_{cf}(1/M + 1/m_f)x_{lf} - C_{cf}(1/M + 1/m_f)\dot{x}_{lf} - K_{cr}/M x_{lr} - C_{cr}/M \dot{x}_{lr} - (1/m_f)F_f \quad \text{(Ex. 26)}$$

Also, when the amount of relative displacement between the rear wheel shaft and the chassis frame is defined as $x_{lr}$, the amount of relative displacement $x_{lr}$ corresponds to a difference between the amount of displacement $x_l$ of the chassis frame and the amount of displacement $x_{ltr}$ of the rear wheel shaft. As a result, a motion equation represented by the following Expression 27 is obtained by the above basic Expression.

$$\ddot{x}_{lr} = \ddot{x}_l - \ddot{x}_{ltr} = -K_{cf}/M x_{lf} - C_{cf}/M \dot{x}_{lf} - K_{cr}(1/M + 1/m_r)x_{lr} - C_{cr}(1/M + 1/m_r)\dot{x}_{lr} - (1/m_r)F_t \quad \text{(Ex. 27)}$$

In the Expression, the state variables $x_1$ to $x_4$ and $u_1$ to $u_2$ are defined as the following Expression 28.

$$x_1 = x_{lf}, x_2 = \dot{x}_{lf}, x_3 = x_{lr}, x_4 = \dot{x}_{lr}, u_1 = F_f, u_2 = F_t \quad \text{(Ex. 28)}$$

Then, the respective first-order differentials of the state variables $x_1$ to $x_4$ can be expressed by Expressions 29 to 32.

$$\dot{x}_1 = \dot{x}_{lf} = x_2 \quad \text{(Ex. 29)}$$

$$\dot{x}_2 = \ddot{x}_{lf} = -K_{cf}(1/M + 1/m_f)x_{lf} - C_{cf}(1/M + 1/m_f)\dot{x}_{lf} - K_{cr}/M x_{lr} - C_{cr}/M \dot{x}_{lr} - (1/m_f)F_f$$

$$= a_1 x_1 + a_2 x_2 + a_3 x_3 + a_4 x_4 + p_1 u_1 \quad \text{(Ex. 30)}$$

$$\dot{x}_3 = \dot{x}_{lr} = x_4 \quad \text{(Ex. 31)}$$

$$\dot{x}_4 = \ddot{x}_{lr} = -K_{cf}/M x_{lf} - C_{cf}/M \dot{x}_{lf} - K_{cr}(1/M + 1/m_r)x_{lr} - C_{cr}(1/M + 1/m_r)\dot{x}_{lr} - (1/m_r)F_t$$

$$= b_1 x_1 + b_2 x_2 + b_3 x_3 + b_4 x_4 + p_2 u_2 \quad \text{(Ex. 32)}$$

The above Expressions 28 to 32 are put together to obtain a state equation represented by the following Expression 33.

$$\begin{bmatrix} \frac{dx_1}{dt} \\ \frac{dx_2}{dt} \\ \frac{dx_3}{dt} \\ \frac{dx_4}{dt} \end{bmatrix} = \begin{bmatrix} 0 & 1 & 0 & 0 \\ a_1 & a_2 & a_3 & a_4 \\ 0 & 0 & 0 & 1 \\ b_1 & b_2 & b_3 & b_4 \end{bmatrix} \begin{bmatrix} x_1 \\ x_2 \\ x_3 \\ x_4 \end{bmatrix} + \begin{bmatrix} 0 & 0 \\ p_1 & 0 \\ 0 & 0 \\ 0 & p_2 \end{bmatrix} \begin{bmatrix} u_1 \\ u_2 \end{bmatrix} \quad \text{(Ex. 33)}$$

$$a_1 = -K_{cf}(1/M + 1/m_f)$$

$$a_2 = -C_{cf}(1/M + 1/m_f)$$

$$a_3 = -K_{cr}/M$$

$$a_4 = -C_{cr}/M$$

$$b_1 = -K_{cf}/M$$

$$b_2 = -C_{cf}/M$$

$$b_3 = -K_{cr}(1/M + 1/m_r)$$

$$b_4 = -C_{cr}(1/M + 1/m_r)$$

$$p_1 = -1/m_f$$

$$p_2 = -1/m_r$$

A relative displacement velocity y that is the first-order differential of the relative displacement $(x_{ltf} - x_{ltr})$ which is a difference between the amount of displacement $x_{ltf}$ of the front wheel shaft and the amount of displacement $x_{ltr}$ of the rear wheel shaft can be applied as the internal state quantity that expresses the longitudinal vibrations in the chassis vibration model. The relative displacement velocity y is expressed by the following Expression 34 based on the state equation of Expression 33.

$$y = \frac{dx_{ltf}}{dt} - \frac{dx_{ltr}}{dt} \quad \text{(Ex. 34)}$$

$$= \left(\frac{dx_l}{dt} - \frac{d_{ltr}}{dt}\right) - \left(\frac{dx_l}{dt} - \frac{d_{ltf}}{dt}\right)$$

$$= \frac{dx_{lr}}{dt} - \frac{dx_{lf}}{dt}$$

$$= x4 - x2$$

-continued $$= [0 \quad -1 \quad 0 \quad 1] \begin{bmatrix} x_1 \\ x_2 \\ x_3 \\ x_4 \end{bmatrix}$$

Figure 12:
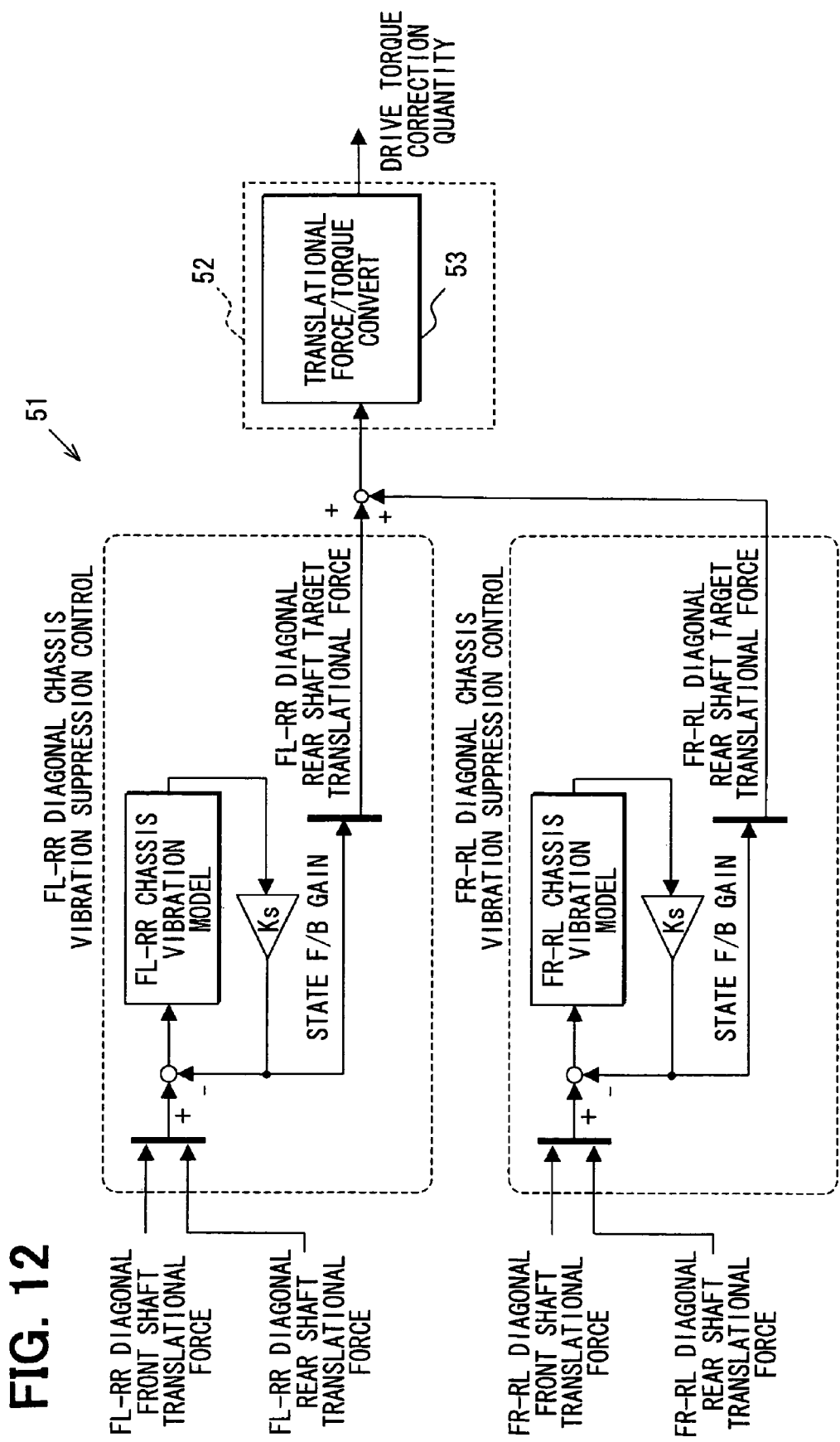
FIG. 12 is a block diagram showing a detailed functional structure in a chassis longitudinal vibration estimate/control unit of a chassis control system.

The chassis longitudinal vibration estimate/control unit 51 in the chassis control system 50 of FIG. 4 is divided into one system formed of FL wheel to RR wheel diagonal elements and another system formed of FR wheel to RL wheel diagonal elements, as shown in FIG. 12. In the respective systems, the relative displacement velocity y that is calculated by the above Expression 34 is output to the controller as the internal state quantity. The controller multiplies the given state feedback gain Ks by the relative displacement velocity y to calculate the rear wheel shaft target translational force for making the relative displacement velocity y rapidly approach zero in the respective systems.

The rear wheel shaft target translational forces calculated with respect to the FL wheel to RR wheel diagonal element and the FR wheel to RL wheel diagonal element, respectively, are added together, and thereafter output to a drive shaft translational force/torque conversion unit 53 in a chassis vibration correction drive torque calculation unit 52.

The rear wheel shaft translational force/torque conversion unit 53 converts the input rear wheel shaft target translational forces into the drive torque correction quantities. In the conversion, the rear wheel shaft translational force/torque conversion unit 53 calculates the drive torques that enable the forces corresponding to the respective input target translational forces to be exerted on the axle as the drive torque correction quantities.

The frequency band (10 to 20 Hz) of the chassis vibrations and the frequency band (20 to 40 Hz) of the tire vibrations are different from each other. Accordingly, the drive torque correction quantity from the tire control system 40 and the drive torque correction quantity from the chassis control system 50 are also different in the frequency band from each other. For this reason, even if the respective drive torque correction quantities are added together, the respective correction components remain, thereby making it possible to suppress both of the chassis vibrations and the tire vibrations. Also, in the frequency band (1 to 2 Hz) of the vehicle body vibration which will be described later, the chassis vibrations and the tire vibrations are different from each other in the frequency band. For this reason, the drive torque correction quantities for suppressing the respective vibrations are calculated and added together, thereby making it possible to obtain the drive torque correction quantity that enable the vibrations of the respective portions of the vehicle to be suppressed.

Figure 13:
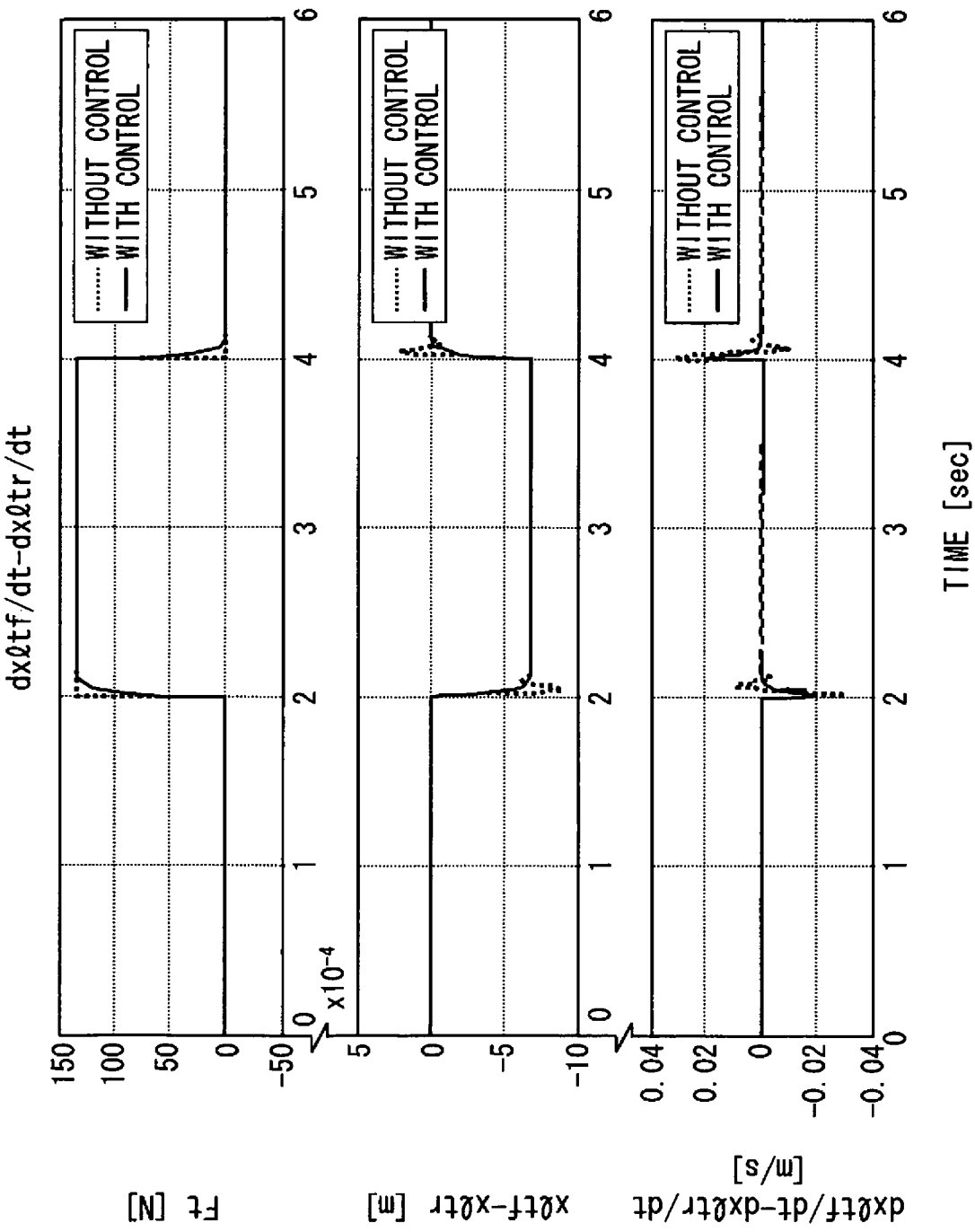
FIG. 13 is a graph showing the simulation results indicative of a difference in the longitudinal vibrations that occur in a chassis between a case of conducting a control using a drive torque correction quantity calculated by the a chassis control system and a case of not conducting the control.

FIG. 13 is the simulation results showing a difference in the longitudinal vibrations that are generated in the chassis between a case of conducting a control (with control shown by a solid line) by the drive torque correction quantity that is calculated by the above chassis control system 50 and a case of not conducting the control (without control shown by a dotted line).

FIG. 13 shows a change in the translational force $F_t$ that is propagated from the rear wheel tires to the rear wheel shaft, a change in the relative displacement ($x_{ltf}$–$x_{ltr}$) that is a difference between the displacement amount $x_{ltf}$ of the front wheel shaft and the displacement amount $x_{ltr}$ of the rear wheel shaft, and a change in the relative displacement velocity ($dx_{ltf}/dt$–$dx_{ltr}/dt$). As shown in FIG. 13, the drive torque is changed so that the translational force $F_t$ that is propagated to the rear wheel shaft rapidly rises up and falls down.

When the basic drive torque is not corrected by the drive torque correction quantity that is calculated by the chassis control system 50 (in the case of no control), as shown in FIG. 13, the change in the relative displacement ($x_{ltf}$–$x_{ltr}$) and the change in the relative displacement velocity ($dx_{ltf}/dt$–$dx_{ltr}/dt$) are large to cause hunting. On the contrary, when the basic drive torque is corrected by the drive torque correction quantity that is calculated by the chassis control system 50, the change in the translational force $F_t$ that is transmitted to the rear wheel shaft is reduced so as to reduce the change in the relative displacement ($x_{ltf}$–$x_{ltr}$) and the relative displacement velocity ($dx_{ltf}/dt$–$dx_{ltr}/dt$).

As represented by the above simulation results, the basic drive torque is corrected by the drive torque correction quantity that is calculated by the chassis vibration correction drive torque calculation unit 52, thereby making it possible to suppress the chassis longitudinal vibrations.

As shown in FIGS. 3 and 4, the vehicle control system 60 includes a vehicle body pitch vibration and (/) vertical vibration estimate/control unit 61 having a vehicle body vibration model. The vehicle body vibration model expresses the pitching vibrations and the vertical vibrations (bouncing vibrations) of the vehicle body. The vehicle body pitch vibration/vertical vibration estimate/control unit 61 inputs the translational forces that are received from the front wheel shaft and the rear wheel shaft which are calculated in the chassis control system 50, and a drive torque reaction force that is applied directly to the vehicle body by the drive torque which is exerted on the rear wheel shaft which is the drive shaft to calculate the drive torque correction quantity for suppressing the pitching vibrations and the vertical vibrations. Further, the vehicle body control system 60 includes a vehicle body rolling vibration and (/) engine rolling vibration estimate/control unit 62 having the vehicle body vibration model. The vehicle body vibration model expresses the rolling vibrations of the vehicle body and the rolling vibrations of the engine. The vehicle body rolling vibration/engine rolling vibration estimate/control unit 62 inputs the road surface reaction force that is exerted on the front wheels in the lateral direction and the drive torque reaction force to calculate the drive torque correction quantity for suppressing the vehicle body rolling vibrations and the engine rolling vibrations.

The engine is mounted on the chassis frame through a mount. The engine is heavy in the weight and greatly affects the rolling vibrations of the vehicle body, and therefore modeled as a part of the vehicle body.

First, a description will be given of a specific motion equation related to the vehicle body vibration model which expresses the pitching vibrations and the vertical vibrations (bouncing vibrations) of the vehicle body with reference to FIG. 14. In constructing the vehicle body vibration model, the spring and damper elements in the vertical direction (up-down direction) due to the front wheel side and rear wheel side suspensions and the spring and damper elements in the vertical direction due to the elasticity of the front and rear wheel tires are considered. The spring and damper elements in the vertical direction of the suspension includes not only the coil spring and damper unit, but also the rigidity in the vertical direction as a whole, including the flexible rigidity of the suspension arm and the rigidity of the diverse bushings.

FIG. 14 is an explanatory diagram for explaining the vehicle body vibration model formed to express the pitching vibrations and the bouncing vibrations. In the vehicle body vibration model, basic equations that are bases for calculating the motion equations for expressing the pitching vibrations and the bouncing vibrations are represented by Expression 35 to Expression 38. Expression 35 is an equation related to the vertical motion of the chassis frame, Expression 36 is an equation related to the vertical motion of the front wheel rotation center, Expression 37 is an equation related to the vertical motion of the rear wheel rotation center, and Expression 38 is an equation related to the pitching motion of the vehicle body.

$$M\ddot{x} = -K_f(x_v - x_{tf} + L_f\theta_p) - C_f(\dot{x}_v - \dot{x}_{tf} + L_f\dot{\theta}_p) - K_r(x_v - x_{tr} + L_r\theta_p) - C_r(\dot{x}_v - \dot{x}_{tr} + L_r\dot{\theta}_p)$$ (Ex. 35)

$$m_f\ddot{x}_{tf} = -K_f\{x_{tf} - (x_v + L_f\theta_p)\} - C_f\{\dot{x}_{tf} - (\dot{x}_v + L_f\dot{\theta}_p)\} - K_{tf}x_{tf} - C_{tf}\dot{x}_{tf}$$ (Ex. 36)

$$m_r\ddot{x}_{tr} = -K_r\{x_{tr} - (x_v + L_r\theta_p)\} - C_r\{\dot{x}_{tr} - (\dot{x}_v + L_r\dot{\theta}_p)\} - K_{tr}x_{tr} - C_{tr}\dot{x}_{tr}$$ (Ex. 37)

$$I_p\ddot{\theta}_p = -L_f\{K_f(x_v - x_{tf} + L_f\theta_p)\} + C_f\{\dot{x}_v - \dot{x}_{tf} + L_f\dot{\theta}_p)\} + L_r\{K_r(x_v - x_{tr} - L_r\theta_p) + C_r(\dot{x}_v - \dot{x}_{tr} - L_r\dot{\theta}_p)\}$$

$$- (h_{cg} - r_t)\Delta F_f + (h_{cg} - r_t)\Delta F_r + (\frac{1}{2})\Delta T_w$$ (Ex. 38)

In the above Expressions:
M is a mass of the sprung;
$x_v$ is the amount of displacement of the vehicle body in the vertical direction;
$K_f$ is a front wheel suspension sprung rigidity;
$x_{tf}$ is the amount of displacement of the front wheel shaft in the vertical direction;
$L_f$ is a distance between the center of gravity of the vehicle and the front wheel shaft;
$\theta_p$ is a sprung pitch angle (pitch rotation center point=the center of gravity of the vehicle);
$C_f$ is a front wheel suspension damper attenuation coefficient;
$K_r$ is a rear wheel suspension sprung rigidity;
$x_{tr}$ is the amount of displacement of the rear wheel shaft in the vertical direction;
$L_r$ is a distance between the center of gravity of the vehicle and the rear wheel shaft;
$C_r$ is a rear wheel suspension damper attenuation coefficient;
$m_f$ is a front wheel under-spring mass;
$K_{tf}$ is a spring rigidity of the front wheel tire in the vertical direction;
$C_{tf}$ is an attenuation coefficient of the front wheel tire in the vertical direction;
$m_r$ is a rear wheel under-spring mass;
$K_{tr}$ is a spring rigidity of the rear wheel tire in the vertical direction;
$C_{tr}$ is an attenuation coefficient of the rear wheel tire in the vertical direction;
$I_p$ is a sprung pitching inertia moment;
$h_{cg}$ is a height of the vehicle gravity center point (road surface base);
$r_t$ is a tire radius;
$F_f$ is a translational force exerted on the front wheel shaft defined by the internal state quantity of the tire vibration model;
$F_r$ is a translational force exerted on the rear wheel shaft defined by the internal state quantity of the tire vibration model; and
$T_w$ is a drive torque that is exerted on the driving wheel shaft.

Similarly, in the vehicle body vibration model, the front and rear wheels in the diagonal direction (FR wheel and RL wheel, and FL wheel and RR wheel) are combined together to add the drive torque correction quantities due to both of the diagonal elements. For this reason, all of the spring constant, the attenuation rate, and the mass in the respective equations are described as values per one wheel.

The above Expression 35 to Expression 38 can be modified into the following Expression 39 to Expression 42, respectively.

$$\ddot{x}_v = -(K_f + K_r)/M x_v - (C_f + C_r)/M \dot{x}_v + K_f/M x_{tf} + C_f/M \dot{x}_{tf} + K_r/M x_{tr} + C_r/M \dot{x}_{tr}$$

$$- (K_f L_f - K_r L_r)/M \theta_p - (C_f L_f - C_r L_r)/M \dot{\theta}_p$$ (Ex. 39)

$$\ddot{x}_{tf} = K_f/m_f x_v + C_f/m_f \dot{x}_v - (K_f + K_{tf})/m_f x_{tf} - (C_f + C_{tf})/m_f \dot{x}_{tf} + K_f L_f/m_f \theta_p + C_f L_f/m_f \dot{\theta}_p$$ (Ex. 40)

$$\ddot{x}_{tr} = K_r/m_r x_v + C_r/m_r \dot{x}_v - (K_r + K_{tr})/m_r x_{tr} - (C_r + C_{tr})/m_r \dot{x}_{tr} + K_r L_r/m_r \theta_p - C_r L_r/m_r \dot{\theta}_p$$ (Ex. 41)

$$\ddot{\theta}_p = -(K_f L_f - K_r L_r)/I_p x_v - (C_f L_f - C_r L_r)/I_p \dot{x}_v + K_f L_f/I_p x_{tf} + C_f L_f/I_p \dot{x}_{tf}$$

$$- K_r L_r/I_p x_{tr} - C_r L_r/I_p \dot{x}_{tr} - (K_f L_f^2 + K_r L_r^2)/I_p \theta_p - (C_f L_f^2 + C_r L_r^2)/I_p \dot{\theta}_p$$

$$- (h_{cg} - r_t)/I_p \Delta F_f + (h_{cg} - r_t)/I_p \Delta F_r + (\frac{1}{2} I_p)\Delta T_w$$ (Ex. 42)

where the state variables $x_1$ to $x_8$, and $u_1$ to $u_3$ are defined by the following Expression 43.

$$x_1 = x_v, x_2 = \dot{x}_v, x_3 = x_{tf}, x_4 = \dot{x}_{tf}, x_5 = x_{tr}, x_6 = \dot{x}_{tr}, x_7 = \theta_p, x_8 = \dot{\theta}_p$$

$$u_1 = \Delta F_{bf}, u_2 = \Delta F_{br}, u_3 = \Delta T_w$$ (Ex. 43)

Then, the respective first-order differentials of the state variables $x_1$ to $x_8$ can be expressed by Expressions 44 to 51.

$$\dot{x}_1 = \dot{x}_v = x_2$$ (Ex. 44)

$$\dot{x}_2 = \ddot{x}_v = -(K_f + K_r)/M x_v - (C_f + C_r)/M \dot{x}_v + K_f/M x_{tf} + C_f/M \dot{x}_{tf} + K_r/M x_{tr} + C_r/M \dot{x}_{tr}$$

$$- (K_f L_f - K_r L_r)/M \theta_p - (C_f L_f - C_r L_r)/M \dot{\theta}_p$$

$$= a_1 x_1 + a_2 x_2 + a_3 x_3 + a_4 x_4 + a_5 x_5 + a_6 x_6 + a_7 x_7 + a_8 x_8$$ (Ex. 45)

$$\dot{x}_3 = \dot{x}_{tf} = x_4$$ (Ex. 46)

$$\dot{x}_4 = \ddot{x}_{tf} = K_f/m_f x_v + C_f/m_f \dot{x}_v - (K_f + K_{tf})/m_f x_{tf}$$

$$- (C_f + C_{tf})/m_f \dot{x}_{tf} + K_f L_f/m_f \theta_p + C_f L_f/m_f \dot{\theta}_p$$

$$= b_1 x_1 + b_2 x_2 + b_3 x_3 + b_4 x_4 + b_7 x_7 + b_8 x_8$$ (Ex. 47)

$$\dot{x}_5 = \dot{x}_{tr} = x_6$$ (Ex. 48)

$$\dot{x}_6 = \ddot{x}_{tr} = K_r/m_r x_v + C_r/m_r \dot{x}_v - (K_r + K_{tr})/m_r x_{tr} - (C_r + C_{tr})/m_r \dot{x}_{tr} - K_r L_r/m_r \theta_p - C_r L_r/m_r \dot{\theta}_p$$

$$= c_1 x_1 + c_2 x_2 + c_5 x_5 + c_6 x_6 + c_7 x_7 + c_8 x_8$$ (Ex. 49)

$$\dot{x}_7 = \dot{\theta}_p = x_8$$ (Ex. 50)

$$\dot{x}_8 = \ddot{\theta}_p = -(K_f L_f - K_r L_r)/I_p x_v - (C_f L_f - C_r L_r)/I_p \dot{x}_v + K_f L_f/I_p x_{tf} + C_f L_f/I_p \dot{x}_{tf}$$

$$- K_r L_r/I_p x_{tr} - C_r L_r/I_p \dot{x}_{tr} - (K_f L_f^2 + K_r L_r^2)/I_p \theta_p - (C_f L_f^2 + C_r L_r^2)/I_p \dot{\theta}_p$$

$$- (h_{cg} - r_t)/I_p \Delta F_f + (h_{cg} - r_t)/I_p \Delta F_r + (\frac{1}{2} I_p)\Delta T_w$$

$$= d_1 x_1 + d_2 x_2 + d_3 x_3 + d_4 x_4 + d_5 x_5 + d_6 x_6 + d_7 x_7 + d_8 x_8 + z_1 u_1 + z_2 u_2 + z_3 u_3$$ (Ex. 51)

The above Expressions 44 to 51 are put together to obtain a state equation represented by the following Expression 52.

$$\begin{bmatrix} \frac{dx_1}{dt} \\ \frac{dx_2}{dt} \\ \frac{dx_3}{dt} \\ \frac{dx_4}{dt} \\ \frac{dx_5}{dt} \\ \frac{dx_6}{dt} \\ \frac{dx_7}{dt} \\ \frac{dx_8}{dt} \end{bmatrix} = \begin{bmatrix} 0 & 1 & 0 & 0 & 0 & 0 & 0 & 0 \\ a_1 & a_2 & a_3 & a_4 & a_5 & a_6 & a_7 & a_8 \\ 0 & 0 & 0 & 1 & 0 & 0 & 0 & 0 \\ b_1 & b_2 & b_3 & b_4 & 0 & 0 & b_7 & b_8 \\ 0 & 0 & 0 & 0 & 0 & 1 & 0 & 0 \\ c_1 & c_2 & 0 & 0 & c_5 & c_6 & c_7 & c_8 \\ 0 & 0 & 0 & 0 & 0 & 0 & 0 & 1 \\ d_1 & d_2 & d_3 & d_4 & d_5 & d_6 & d_7 & d_8 \end{bmatrix} \begin{bmatrix} x_1 \\ x_2 \\ x_3 \\ x_4 \\ x_5 \\ x_6 \\ x_7 \\ x_8 \end{bmatrix} +$$

$$\begin{bmatrix} 0 & 0 & 0 \\ 0 & 0 & 0 \\ 0 & 0 & 0 \\ 0 & 0 & 0 \\ 0 & 0 & 0 \\ 0 & 0 & 0 \\ 0 & 0 & 0 \\ z_1 & z_2 & z_3 \end{bmatrix} \begin{bmatrix} u_1 \\ u_2 \\ u_3 \end{bmatrix}$$

(Ex. 52)

$a_1 = -(K_f + K_r)/M$
$a_2 = -(C_f + C_r)/M$
$a_3 = K_f/M$
$a_4 = C_f/M$
$a_5 = K_r/M$
$a_6 = C_r/M$
$a_7 = -(K_f L_f - K_r L_r)/M$
$a_8 = -(C_f L_f - C_r L_r)/M$
$b_1 = K_f/m_f$
$b_2 = C_f/m_f$
$b_3 = -(K_f + K_{tf})/m_f$
$b_4 = -(C_f + C_{tf})/m_f$
$b_7 = K_f L_f/m_f$
$b_8 = C_f L_f/m_f$
$c_1 = K_r/m_r$
$c_2 = C_r/m_r$
$c_5 = -(K_r + K_{tr})/m_r$
$c_6 = -(C_r + C_{tr})/m_r$
$c_7 = -K_r L_r/m_r$
$c_8 = -C_r L_r/m_r$
$d_1 = -(K_f L_f - K_r L_r)/I_p$
$d_2 = -(C_f L_f - C_r L_r)/I_p$
$d_3 = K_f L_f/I_p$
$d_4 = C_f L_f/I_p$
$d_5 = -K_r L_r/I_p$
$d_6 = -C_r L_r/I_p$
$d_7 = -(K_f L_f^2 + K_r L_r^2)/I_p$
$d_8 = -(C_f L_f^2 + C_r L_r^2)/I_p$
$z_1 = -(h_{cg} - r_t)/I_p$
$z_2 = (h_{cg} - r_t)/I_p$
$z_3 = 1/2 I_p$

A sprung pitching velocity $y_1$ that is the first-order differential of the sprung pitch angle $\theta_p$ can be applied as the internal state quantity that expresses the pitching vibrations in the vehicle body vibration model. The sprung pitching velocity $y_1$ is expressed by the following Expression 53 based on the state equation of Expression 52.

$$y_1 = \frac{d\theta_p}{dt} = x_8 = [0\ 0\ 0\ 0\ 0\ 0\ 0\ 1] \begin{bmatrix} x_1 \\ x_2 \\ x_3 \\ x_4 \\ x_5 \\ x_6 \\ x_7 \\ x_8 \end{bmatrix}$$

(Ex. 53)

Also, a vehicle vertical velocity $y_2$ that is the first-order differential of the amount of displacement $x_v$ of the vehicle body in the vertical direction can be applied as the internal state quantity that expresses the vertical vibrations (bouncing vibrations) in the vehicle body vibration model. The displacement velocity $y_2$ is expressed by the following Expression 54 based on the state equation of Expression 52.

$$y_2 = \frac{dx_v}{dt} = x_2 = [0\ 1\ 0\ 0\ 0\ 0\ 0\ 0] \begin{bmatrix} x_1 \\ x_2 \\ x_3 \\ x_4 \\ x_5 \\ x_6 \\ x_7 \\ x_8 \end{bmatrix}$$

(Ex. 54)

Figure 15:
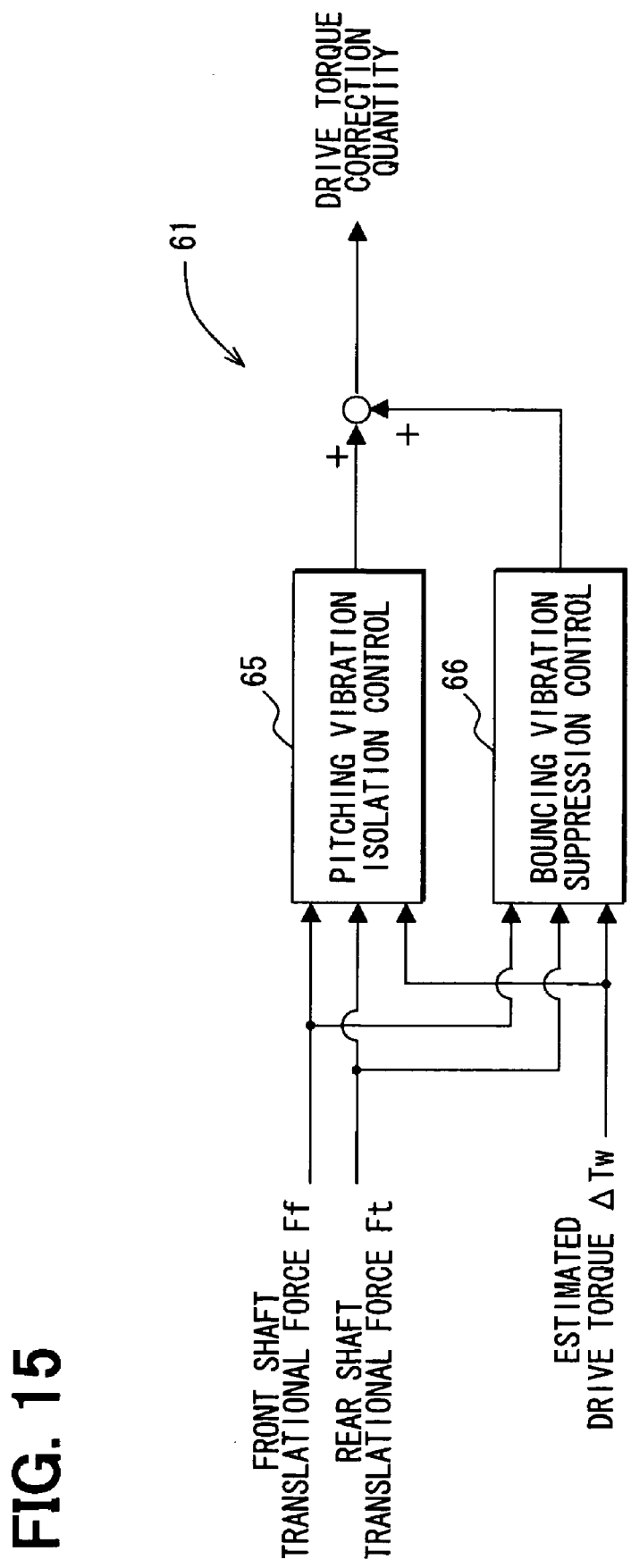
FIG. 15 is a block diagram showing a functional structure of a vehicle body pitch vibration and vertical vibration estimate/control unit of the vehicle body control system.

The vehicle body pitch vibration/vertical vibration estimate/control unit 61 in the vehicle body control system 60 of FIG. 4 includes a pitching vibration isolation control unit 65 and a bouncing vibration suppression control unit 66 as shown in FIG. 15. The pitching vibration isolation control unit 65 and the bouncing vibration suppression control unit 66 calculate the drive torque correction quantities for suppressing the pitching vibrations and the bouncing vibrations, respectively. The vehicle body pitch vibration/vertical vibration estimate/control unit 61 adds those drive torque correction quantities to put those quantities together, and outputs one drive torque correction quantity.

FIG. 16 is a block diagram showing the detailed functional structure of the pitching vibration isolation control unit 65. As shown in FIG. 16, the sprung pitching vibration model of the FL wheel to RR wheel diagonal element and the sprung pitching vibration model of the FR wheel to RL wheel diagonal element are formed in the FL wheel to RR wheel diagonal pitching vibration isolation control unit and the FR wheel to RL wheel diagonal pitching vibration isolation control unit. The respective sprung pitching vibration models output the sprung pitching velocity $y_1$ that is calculated according to the above Expression 53 as the internal state quantity indicative of the pitching vibrations. The controller multiplies the sprung pitching velocity $y_1$ by the given state feedback gain Ks to calculate the torque correction quantity for suppressing the vibrations.

When the drive torque correction quantities that are output by the FL wheel to RR wheel diagonal pitching vibration isolation control unit and the FR wheel to RL wheel diagonal pitching vibration isolation control unit, respectively, are put together, in order to conduct the vibration isolation, the drive torque correction quantity that is calculated by the FL wheel to RR wheel diagonal pitching vibration isolation control unit and the drive torque correction quantity that is calculated by the FR wheel to RL wheel diagonal pitching vibration isolation control unit are inverted in sign, and thereafter the respective drive torque correction quantities having the inverted signs are added together to calculate the drive torque correction quantity for suppressing the pitching vibrations.

FIG. 17 is a block diagram showing the detailed functional structure of the bouncing vibration isolation control unit 66 in FIG. 15. As shown in FIG. 17, like the pitching vibration isolation control unit 65, the sprung bouncing vibration model of the FL wheel to RR wheel diagonal element and the sprung bouncing vibration model of the FR wheel to RL wheel diagonal element are formed in the FL wheel to RR wheel diagonal bouncing vibration suppression control unit and the FR wheel to RL wheel diagonal bouncing vibration suppression control unit. The respective sprung bouncing vibration models output the displacement velocity $y_2$ of the vehicle body in the vertical direction which is calculated according to the above Expression 54 as the internal state quantity indicative of the bouncing vibrations. The controller multiplies the displacement velocity $y_2$ of the vehicle body in the vertical direction by the given state feedback gain Ks to calculate the torque correction quantity for suppressing the bouncing vibrations.

The drive torque correction quantities that are output by the FL wheel to RR wheel diagonal bouncing vibration suppression control unit and the FR wheel to RL wheel diagonal bouncing vibration suppression control unit, respectively, are added together to obtain the drive torque correction quantity for suppressing the bouncing vibrations.

In the above example, the sprung pitching velocity $y_1$ is applied as the internal state quantity indicative of the pitching vibrations, and the displacement velocity $y_2$ of the vehicle body in the vertical direction is applied as the internal state quantity indicative of the bouncing vibrations. Alternatively, it is possible to suppress the pitching vibrations and the bouncing vibrations by other parameters.

For example, when the pitching vibrations occur, the front wheel ground load and the rear wheel ground load change in opposite phase. On the other hand, when the bouncing vibrations occur, the front wheel ground load and the rear wheel ground load change in the same phase. In this way, the front wheel ground load and the rear wheel ground load are parameters associated with the vibration state of the sprung (vehicle body). For this reason, the front wheel load variation velocity indicative of a change in the front wheel ground load and the rear wheel load variation velocity indicative of a change in the rear wheel ground load can be applied as the internal state quantities indicative of the pitching vibrations and the bouncing vibrations.

The front wheel load variation velocity is expressed by the following Expression 55, and the rear wheel load variation velocity is expressed by the following Expression 56. The front wheel load variation velocity and the rear wheel load variation velocity can be multiplied by the state feedback gain, respectively, thereby making it possible to calculate the drive torque correction quantity for suppressing the pitching vibrations and the bouncing vibrations.

$$y = \frac{C_{tf} dx_{tf}}{dt} = C_{tf} x_4 = [0\ 0\ 0\ C_{tf}\ 0\ 0\ 0\ 0] \begin{bmatrix} x_1 \\ x_2 \\ x_3 \\ x_4 \\ x_5 \\ x_6 \\ x_7 \\ x_8 \end{bmatrix}$$ (Ex. 55)

$$y = \frac{C_{tr} dx_{tr}}{dt} = C_{tr} x_6 = [0\ 0\ 0\ 0\ 0\ C_{tr}\ 0\ 0] \begin{bmatrix} x_1 \\ x_2 \\ x_3 \\ x_4 \\ x_5 \\ x_6 \\ x_7 \\ x_8 \end{bmatrix}$$ (Ex. 56)

Also, when the front wheel ground load and the rear wheel ground load change due to the pitching vibrations and the bouncing vibrations, because the cornering powers that are generated in the respective tires change, a stability factor that is used as an index indicative of the steering stability of the vehicle also changes. For this reason, the variation velocity of the stability factor can be applied as the internal state quantity indicative of the pitching vibrations and the bouncing vibrations.

The variation velocity of the stability factor is indicated by the following Expression 57. The variation velocity of the stability factor is multiplied by a state feedback gain that is set so that the variation velocity approaches zero, thereby making it possible to calculate the drive torque correction quantity.

$$y = \frac{d(S.F.)}{dt} = -C_w L_f C_{tf} x_4 + C_w L_r C_{tr} x_6$$ (Ex. 57)

$$= [0\ 0\ 0\ p_1\ 0\ p_2\ 0\ 0] \begin{bmatrix} x_1 \\ x_2 \\ x_3 \\ x_4 \\ x_5 \\ x_6 \\ x_7 \\ x_8 \end{bmatrix}$$

$$(p_1 = -C_w L_f C_{tf},\ p_2 = C_w L_r C_{tr})$$

FIGS. 18A, 18B and 18C and FIGS. 19A, 19B are the simulation results showing a difference in the pitching vibrations and the bouncing vibrations which are generated in the vehicle body between a case of conducting a control (with control shown by a solid line) by the vehicle body pitch vibrations of the above vehicle body control system 60 and the drive torque correction quantity that is calculated by the vertical vibration estimate control unit 61, and a case of not conducting the control (without control shown by a dotted line), respectively.

Figure 18A:
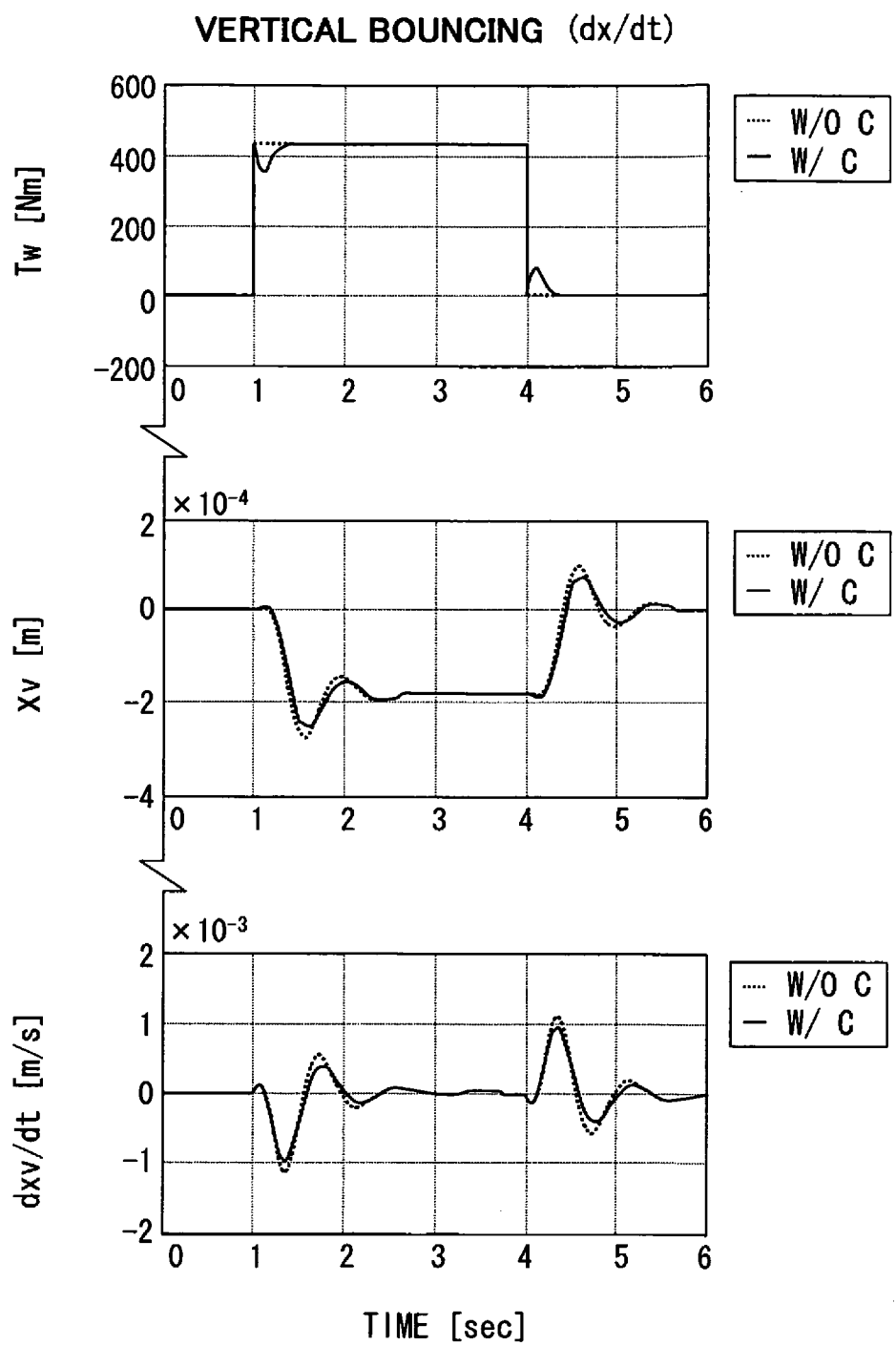
FIGS. 18A, 18B and 18C are graphs showing the simulation results indicative of a difference in the pitching vibrations and the bouncing vibrations which occur in the vehicle body between a case in which a control is conducted using a vehicle body pitching vibration/vertical vibration estimate control unit of a vehicle control system, and a case in which the control is not conducted, respectively.
Figure 18B:
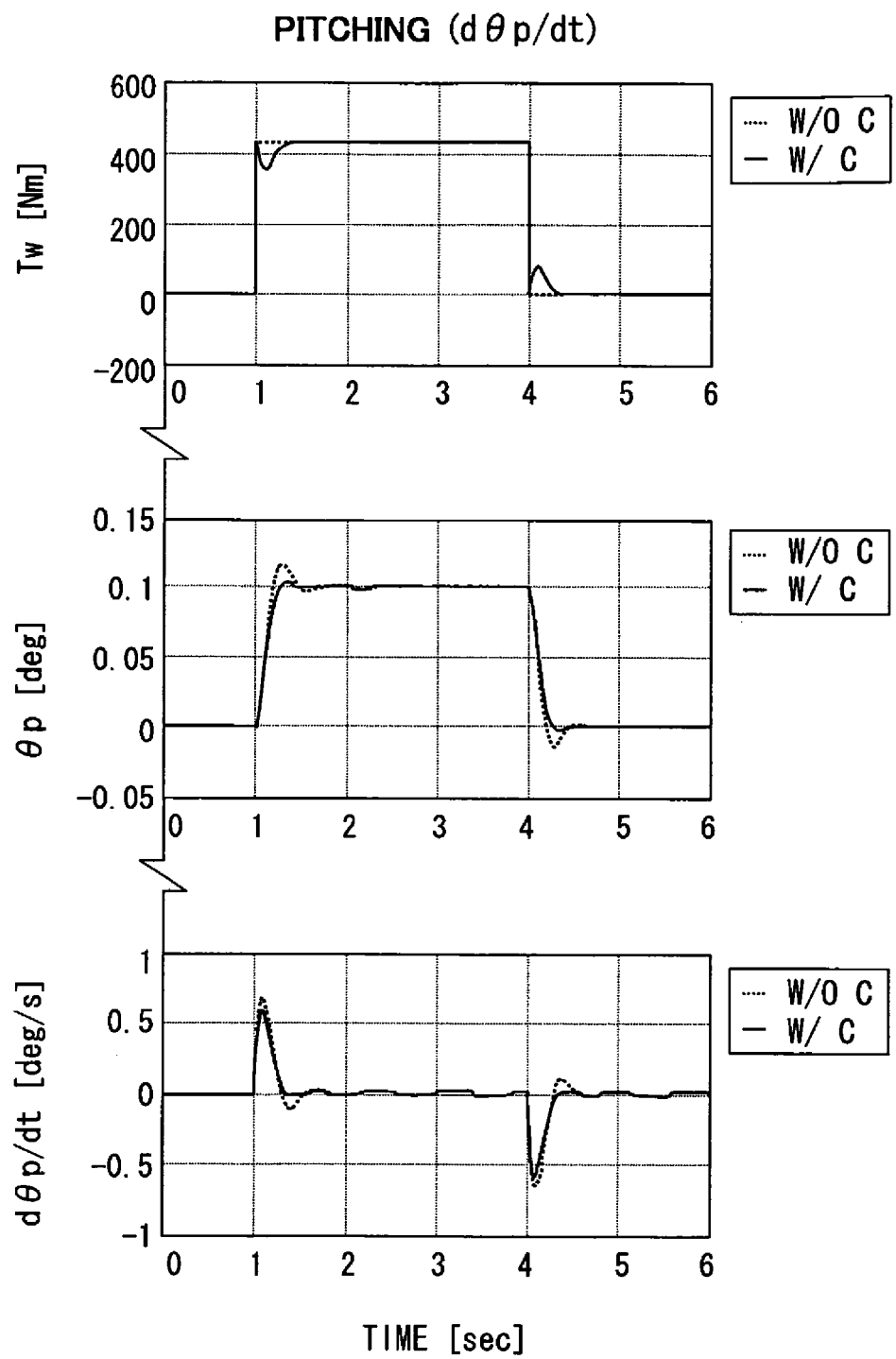
Figure 18C:
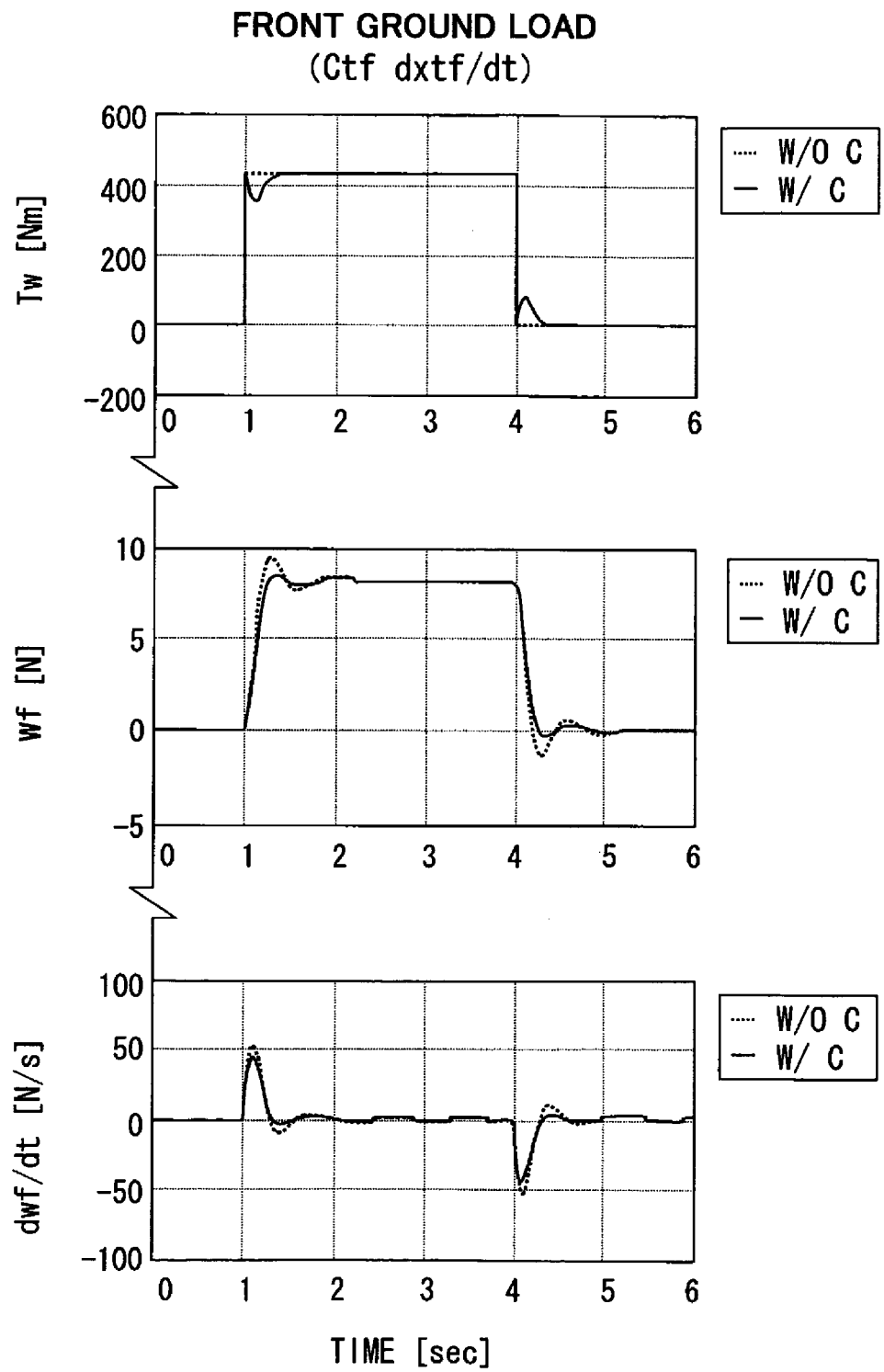
Figure 19A:
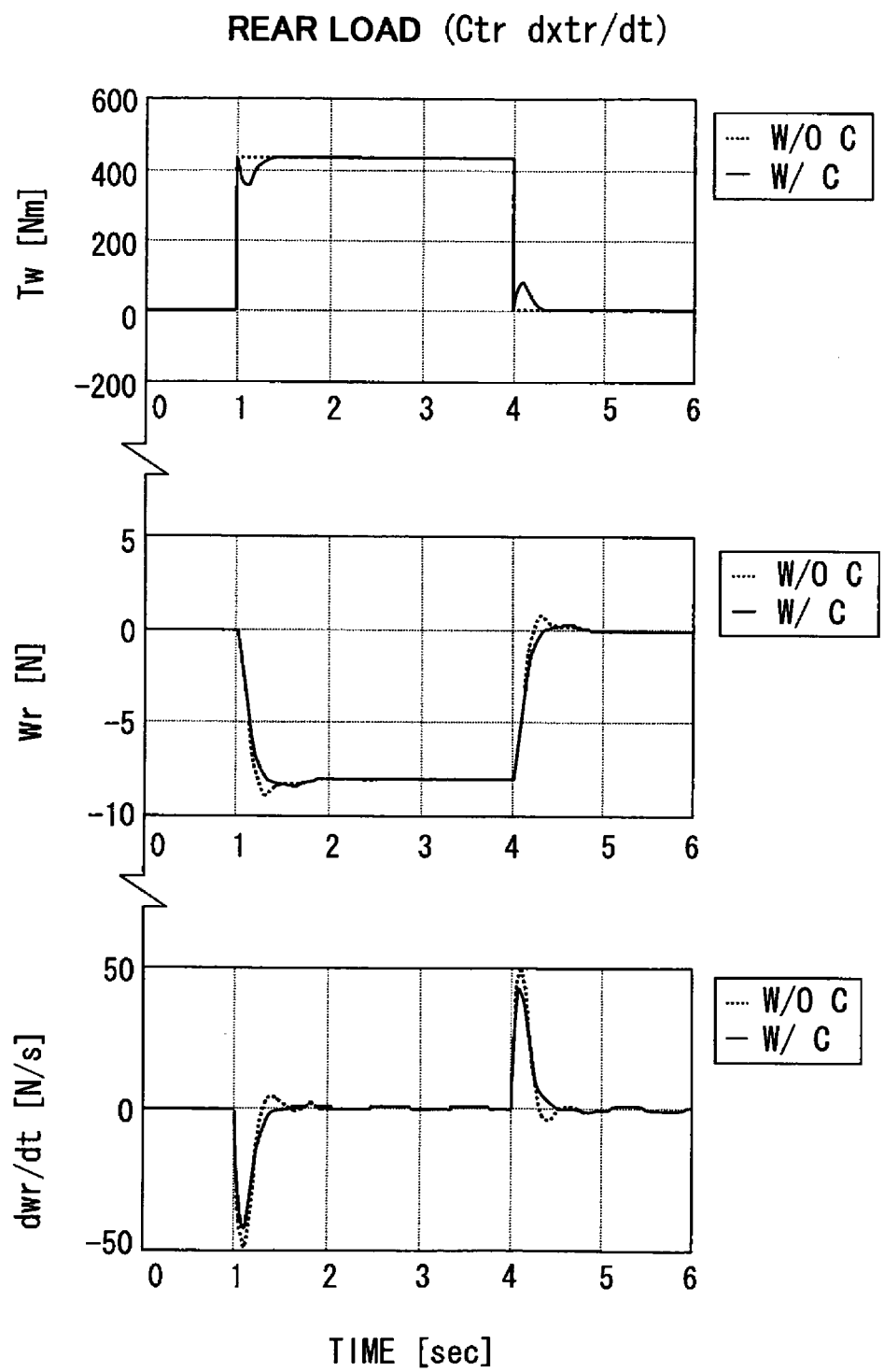
FIGS. 19A and 19B are graphs showing the simulation results indicative of a difference in the pitching vibrations and the bouncing vibrations which occur in the vehicle body between a case in which a control is conducted using a vehicle body pitching vibration/vertical vibration estimate/control unit of the vehicle control system, and a case in which the control is not conducted, respectively.
Figure 19B:
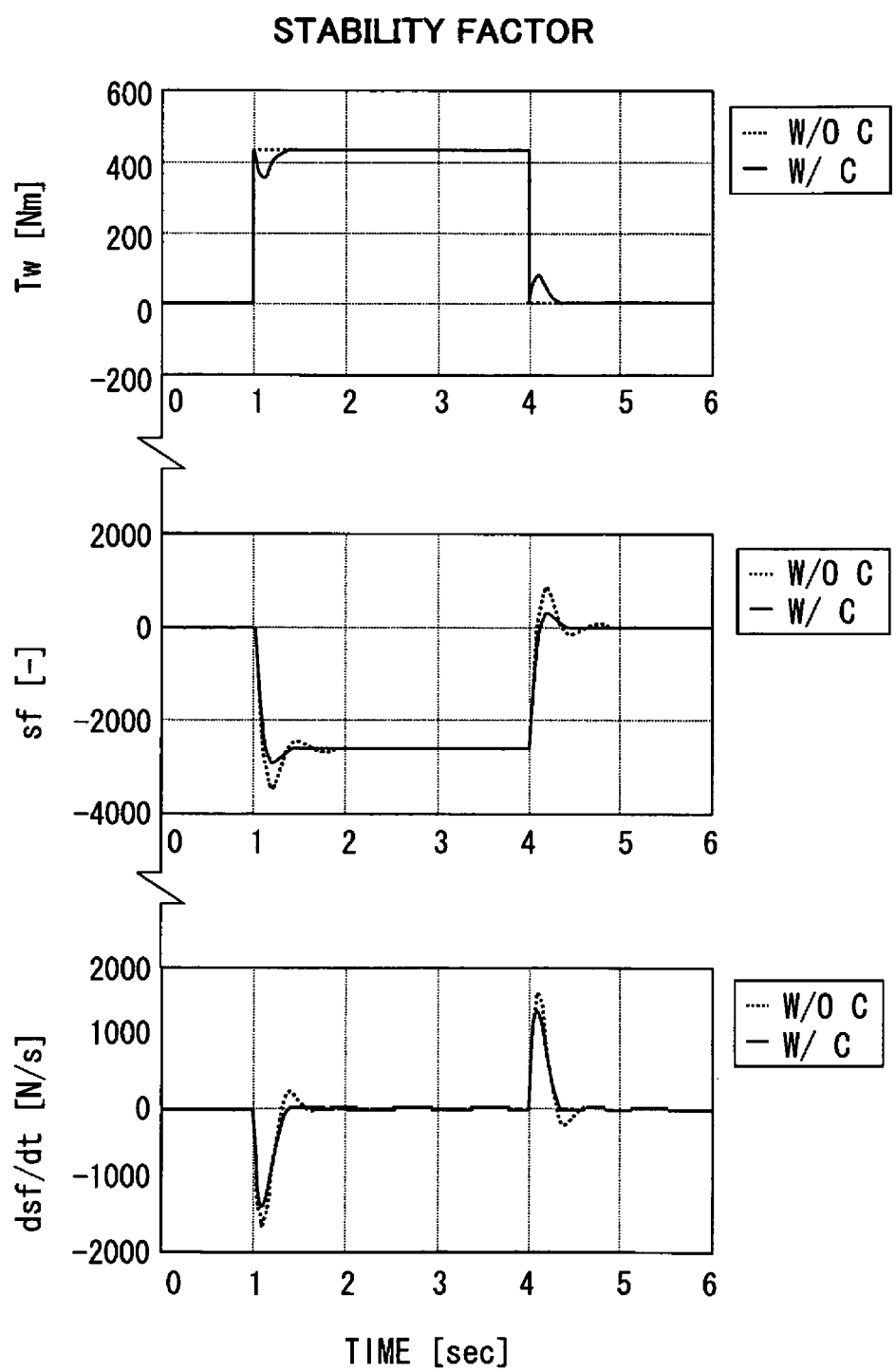

FIG. 18A shows a change in the drive torque $T_w$, a change in the vehicle body vertical displacement amount $x_v$, and a change in the vehicle body vertical velocity $dx_v/dt$. FIG. 18B shows a change in the drive torque $T_w$, a change in the sprung pitch angle $\theta_p$, and a change in the sprung pitching velocity $d\theta_p/dt$. FIG. 18C shows a change in the drive torque $T_w$, a change in the front wheel ground load wf, and a change in the varying velocity of the front wheel ground load dwf/dt. FIG. 19A shows a change in the drive torque $T_w$, a change in the rear wheel ground load wr, and a change in the varying velocity dwr/dt of the rear wheel ground load. Also, FIG. 19B shows a change in the drive torque $T_w$, a change in the stability factor sf, and a change in the varying velocity dsf/dt of the stability factor.

In all cases of FIGS. 18A to 18C and FIGS. 19A, 19B, the basic drive torque changes so as to rapidly rise up and fall down. When the basic drive torque is not corrected by the drive torque correction quantity (in the case of no control), in all cases of FIGS. 18A to 18C and FIGS. 19A, 19B, it is found that a change in the respective displacement amounts and the respective varying velocities are large. On the contrary, when the basic drive torque is corrected by the drive torque correction quantity, since the change in the drive torque $T_w$ is reduced to reduce the change in the (varying) velocity corresponding to the pitching vibrations and the bouncing vibrations of the velocity body. Accordingly, it is found that the basic drive torque is corrected by the vehicle body pitch vibrations from the simulation results and the drive torque correction quantity that is calculated by the vertical vibration estimate control unit 61, thereby enabling the pitching vibrations and the bouncing vibrations of the vehicle body to be suppressed.

Subsequently, a description will be given of a specific motion equation related to a vehicle body vibration model that expresses the rolling vibrations of the vehicle body and the rolling vibrations of the engine with reference to FIGS. 20A and 20B. The vehicle body vibration model inputs the lateral reaction force that is exerted on the front wheel shaft which is calculated by the front-wheel lateral road surface reaction force estimate unit 32 and a reaction force from the engine (and the transmission) which are mounted on the chassis frame through the engine mount to calculate the estimated rolling vibrations about the vehicle body rolling center and the rolling vibrations about the engine rolling center.

In forming the vehicle body vibration model, the spring and damper elements in the vertical direction due to the front wheel side suspension and the rear wheel side suspension and the spring and damper elements of the engine mount are considered.

FIGS. 20A and 20B are diagrams for explaining a vehicle body vibration model formed for expressing the rolling vibration of the vehicle body and the rolling vibration of the engine. In the vehicle body vibration model, basic equations that are bases for calculating the motion equations that express the rolling vibration of the vehicle body and the rolling vibration of the engine are represented by Expression 58 to Expression 59. Expression 58 is an equation related to the motion of the engine (and the transmission) in the rolling direction, and Expression 59 is an equation related to the motion of the vehicle body in the rolling direction.

$$I_e \ddot{\theta}_e = -(w_e/2)K_e[(w_e/2)\theta_e - \{(w_e/2)\theta_r + x_v\}] - (w_e/2)C_e[(w_e/2)\dot{\theta}_e - \{(w_e/2)\dot{\theta}_r + \dot{x}_v\}]$$

$$-(w_e/2)K_e[(w_e/2)\theta_e - \{(w_e/2)\theta_r + x_v\}] - (w_e/2)C_e[(w_e/2)\dot{\theta}_e - \{(w_e/2)\dot{\theta}_r + \dot{x}_v\}] + \Delta T_0 \quad \text{(Ex. 58)}$$

$$I_r\ddot{\theta}_r = -(w_f/2)[K_{sf}\{x_v + L_f\theta_p + (w_f/2)\theta_r - x_{vtf}\} + C_{sf}\{\dot{x}_v + L_f\dot{\theta}_p + (w_f/2)\dot{\theta}_r - \dot{x}_{vtf}\}]$$

$$+(w_f/2)[K_{sf}\{x_v + L_f\theta_p - (w_f/2)\theta_r - x_{vtf}\} + C_{sf}\{\dot{x}_v + L_f\dot{\theta}_p - (w_f/2)\dot{\theta}_r - \dot{x}_{vtf}\}]$$

$$-(w_r/2)[K_{sr}\{x_v - L_r\theta_p + (w_r/2)\theta_r - x_{vtr}\} + C_{sr}\{\dot{x}_v - L_r\dot{\theta}_p + (w_r/2)\dot{\theta}_r - \dot{x}_{vtr}\}]$$

$$+(w_r/2)[K_{sr}\{x_v - L_r\theta_p - (w_r/2)\theta_r - x_{vtr}\} + C_{sr}\{\dot{x}_v - L_r\dot{\theta}_p - (w_r/2)\dot{\theta}_r - \dot{x}_{vtr}\}]$$

$$-(w_e/2)[K_e\{(w_e/2)\theta_r + x_v - (w_e/2)\theta_e\} + C_e\{(w_e/2)\dot{\theta}_r + \dot{x}_v - (w_e/2)\dot{\theta}_e\}]$$

$$-(w_e/2)[K_e\{(w_e/2)\theta_r - x_v - (w_e/2)\theta_e\} - C_e\{(w_e/2)\dot{\theta}_r + \dot{x}_v - (w_e/2)\dot{\theta}_e\}]$$

$$-Mg(h_{cg} - h_r)\theta_r + (h_{cg} - r_t)\Delta F_{y\_L} + (h_{cg} - r_t)\Delta F_{y\_R} \quad \text{(Ex. 59)}$$

In the above Expressions:

$I_e$ is an inertia moment of the engine (and the transmission) in the rolling direction;
$\theta_e$ is a rolling angle (rolling rotation center=crank shaft rotation center) of the engine (and the transmission);
$w_e$ is a distance between right and left engine mounts;
$K_e$ is a spring rigidity for one engine mount;
$\theta_r$ is a rolling angle of the vehicle body;
$x_v$ is the amount of displacement of the vehicle body in the vertical direction;
$C_e$ is an attenuation coefficient for one engine mount;
$T_0$ is an output shaft torque of a transmission outlet;
$I_r$ is a sprung rolling inertia moment;
$w_f$ is a front wheel tread;
$K_{sf}$ is a front wheel suspension sprung rigidity;
$L_f$ is a distance between the center of gravity of a vehicle and the front wheel shaft;
$\theta_p$ is a sprung pitch angle $x_{vtf}$ is the amount of displacement of the front wheel shaft in the vertical direction;
$C_{sf}$ is a front wheel suspension damper attenuation coefficient;
$w_r$ is a rear wheel tread;
$K_{sr}$ is a rear wheel suspension sprung rigidity;
$L_r$ is a distance between the center of gravity of a vehicle and the rear wheel shaft;
$x_{vtr}$ is the amount of displacement of the rear wheel shaft in the vertical direction;
$C_{sr}$ is a rear wheel suspension damper attenuation coefficient;
g is a gravity acceleration;
$h_{cg}$ is a height of the center of gravity of the vehicle (road surface base);
$h_r$ is a height of the vehicle body rolling center (rolling shaft is in parallel with the longitudinal direction);
$r_t$ is a tire radius;
$F_{y\_L}$ is a lateral translational force exerted on the front wheel shaft; and
$F_{y\_R}$ is a lateral translational force exerted on the rear wheel shaft.

The above Expression 58 and Expression 59 can be modified into the following Expression 60 and Expression 61, respectively.

$$\ddot{\theta}_e = -(w_e^2/2)K_e/I_e\theta_e - (w_e^2/2)C_e/I_e\dot{\theta}_e + (w_e^2/2)K_e/I_e\theta_r + (w_e^2/2)C_e/I_e\dot{\theta}_r + (1/R_dI_e)\Delta T_w \quad \text{(Ex. 60)}$$

$$\ddot{\theta}_r = -(w_e^2/2)K_e/I_r\theta_e + (w_e^2/2)C_e/I_r\dot{\theta}_e$$

$$-\{(w_e^2/2)K_e + (w_f^2/2)K_{sf} + (w_r^2/2)K_{sr} - Mg(h_{cg} - h_r)\}/I_r\theta_r$$

$$-\{(w_e^2/2)C_e + (w_f^2/2)C_{sf} + (w_r^2/2)C_{sr}/I_r\dot{\theta}_r$$

$$+(h_{cg} - r_t)/I_r\Delta F_{y\_L} + (h_{cg} - r_t)/I_r\Delta F_{y\_R} \quad \text{(Ex. 61)}$$

where the state variables $x_1$ to $x_4$ and u are defined by the following Expression 62.

$$x_1=\theta_e, x_2=\dot{\theta}_e, x_3=\theta_r, x_4=\dot{\theta}_r, u=\Delta T_w \qquad \text{(Ex. 62)}$$

Then, the respective first-order differentials of the state variables $x_1$ to $x_4$ can be expressed by Expressions 63 to 66.

$$\dot{x}_1 = x_2 \qquad \text{(Ex. 63)}$$

$$\dot{x}_2 = \ddot{\theta}_e = -(w_e^2/2)K_e/I_e\theta_e - (w_e^2/2)C_e/I_e\dot{\theta}_e + (w_e^2/2)K_e/I_e\theta_r + (w_e^2/2)C_e/I_e\dot{\theta}_r + 1/(R_dI_e)\Delta T_w$$

$$e_1x_1 + e_2x_2 + e_3x_3 + e_4x_4 + z_1u_1 \qquad \text{(Ex. 64)}$$

$$\dot{x}_3 = x_4 \qquad \text{(Ex. 65)}$$

$$\dot{x}_4 = \ddot{\theta}_r = (w_e^2/2)K_e/I_r\theta_e + (w_e^2/2)C_e/I_r\dot{\theta}_e$$

$$-\{(w_e^2/2)K_e + (w_f^2/2)K_{sf} + (w_r^2/2)K_{sr} - Mg(h_{cg}-h_r)\}/I_r\theta_r$$

$$-\{(w_e^2/2)C_e + (w_f^2/2)C_{sf} + (w_r^2/2)C_{sr}\}/I_r\dot{\theta}_r$$

$$-(h_{cg}-r_t)/I_r\Delta F_{y\_L} + (h_{cg}-r_t)/I_r\Delta F_{y\_R}$$

$$=f_1x_1 + f_2x_2 + f_3x_3 + f_4x_4 + z_2u_2 + z_3u_3 \qquad \text{(Ex. 66)}$$

The above Expressions 63 to 66 are put together to obtain a state equation represented by the following Expression 67.

$$\begin{bmatrix} \frac{dx_1}{dt} \\ \frac{dx_2}{dt} \\ \frac{dx_3}{dt} \\ \frac{dx_4}{dt} \end{bmatrix} = \begin{bmatrix} 0 & 1 & 0 & 0 \\ e_1 & e_2 & e_3 & e_4 \\ 0 & 0 & 0 & 1 \\ f_1 & f_2 & f_3 & f_4 \end{bmatrix} \begin{bmatrix} x_1 \\ x_2 \\ x_3 \\ x_4 \end{bmatrix} + \begin{bmatrix} 0 & 0 & 0 \\ z_1 & 0 & 0 \\ 0 & 0 & 0 \\ 0 & z_2 & z_3 \end{bmatrix} \begin{bmatrix} u_1 \\ u_2 \\ u_3 \end{bmatrix} \qquad \text{(Ex. 67)}$$

$$e_1 = -(w_e^2/2)K_e/I_e$$
$$e_2 = -(w_e^2/2)C_e/I_e$$
$$e_3 = (w_e^2/2)K_e/I_e$$
$$e_4 = (w_e^2/2)C_e/I_e$$
$$z_1 = 1/(R_dI_e)$$
$$z_2 = (h_{cg}-r_t)/I_r$$
$$z_3 = (h_{cg}-r_t)/I_r$$
$$f_1 = (w_e^2/2)K_e/I_r$$
$$f_2 = (w_e^2/2)C_e/I_r$$
$$f_3 = -\left\{\begin{array}{l}(w_e^2/2)K_e + (w_f^2/2)K_{sf} + \\ (w_r^2/2)K_{sr} - Mg(h_{cg}-h_r)\end{array}\right\}/I_r$$
$$f_4 = -\{(w_e^2/2)C_e + (w_f^2/2)C_{sf} + (w_r^2/2)C_{sr}\}/I_r$$

A vehicle rolling velocity $y_1$ that is the first-order differential of the rolling angle $\theta_r$ of the vehicle body can be applied as the internal state quantity that expresses the rolling vibrations of the vehicle body in the vehicle body vibration model. The vehicle body rolling velocity $y_1$ is expressed by the following Expression 68 based on the state equation of Expression 67.

$$y_1 = \frac{d\theta_r}{dt} = x_4 = [0 \ 0 \ 0 \ 1]\begin{bmatrix} x_1 \\ x_2 \\ x_3 \\ x_4 \end{bmatrix} \qquad \text{(Ex. 68)}$$

Also, an engine rolling velocity $Y_2$ that is the first-order differential of the engine rolling angle $\theta_e$ can be applied as the internal state quantity that expresses the engine rolling vibrations in the vehicle body vibration model. The engine rolling velocity $y_2$ is expressed by the following Expression 69 based on the state equation of Expression 67.

$$y_2 = \frac{d\theta_e}{dt} = x_2 = [0 \ 1 \ 0 \ 0]\begin{bmatrix} x_1 \\ x_2 \\ x_3 \\ x_4 \end{bmatrix} \qquad \text{(Ex. 69)}$$

The vehicle body rolling vibration/engine rolling vibration estimate/control unit 62 in the vehicle body control system 60 of FIG. 4 includes a vehicle body rolling vibration control unit 62a for suppressing the rolling vibrations of the vehicle body, and an engine rolling vibration control unit 62b for suppressing the rolling vibrations of the engine.

Figure 21:
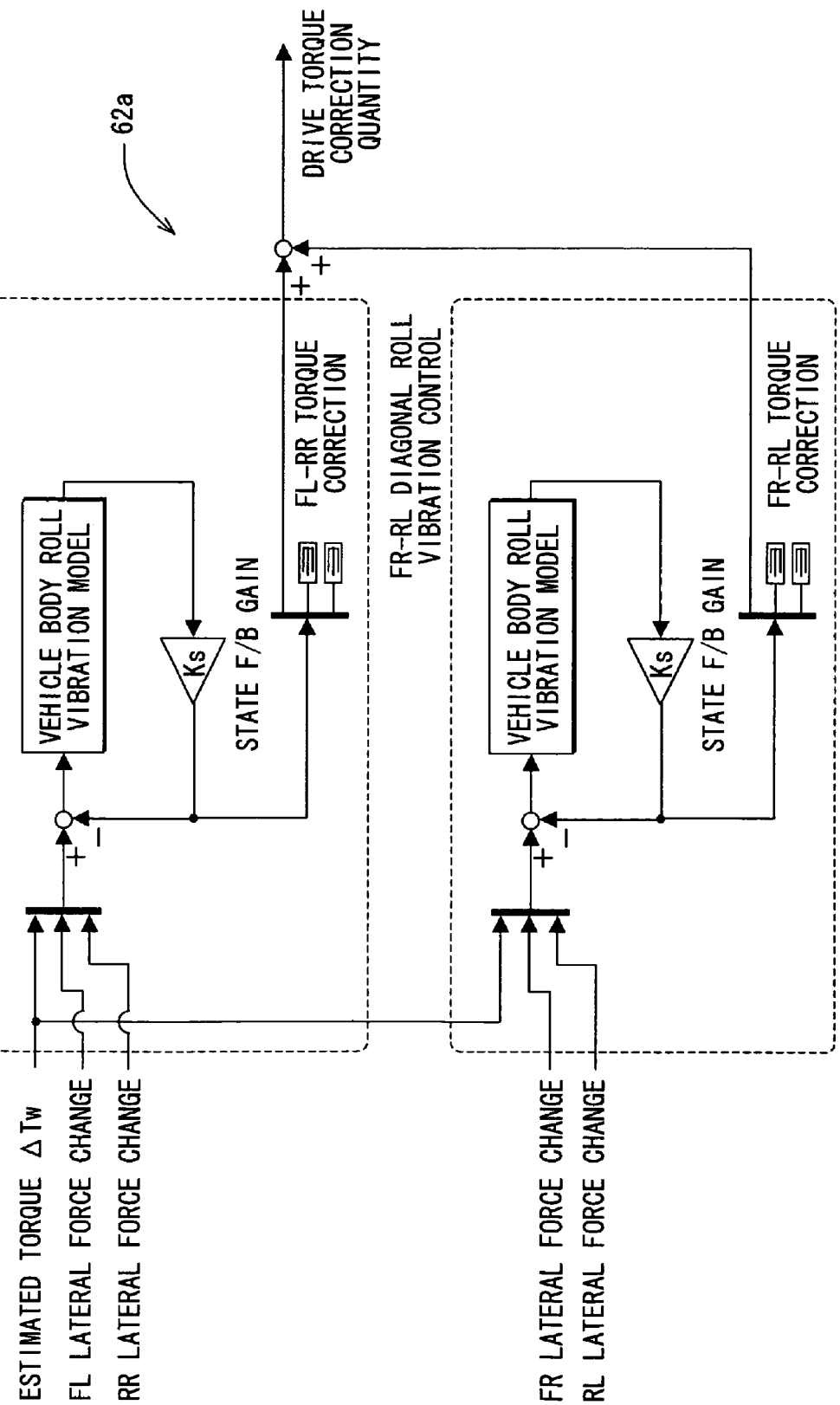
FIG. 21 is a block diagram showing a detailed functional structure of a vehicle body roll vibration control unit.

FIG. 21 is a block diagram showing the detailed functional structure of the vehicle body roll vibration control unit 62a. The vehicle body roll vibration control unit 62a is made up of the FL wheel to RR wheel diagonal vehicle body rolling vibration control unit and the FR wheel to RL wheel diagonal vehicle body rolling vibration control unit. The vehicle body rolling vibration model of the FL wheel to RR wheel diagonal element and the vehicle body rolling vibration model of the FR wheel to RL wheel diagonal element are formed in the FL wheel to RR wheel diagonal vehicle body rolling vibration control unit and the FR wheel to RL wheel diagonal vehicle body rolling vibration control unit. The respective vehicle body rolling vibration models output the vehicle body rolling angular velocity $y_1$ that is calculated according to the above Expression 68 as the internal state quantity indicative of the vehicle body rolling vibrations. The respective controllers multiply the vehicle body rolling angular velocity $y_1$ by the given state feedback gain Ks to calculate the torque correction quantity.

The drive torque correction quantities that are output by the FL wheel to RR wheel diagonal vehicle body rolling vibration control unit and the FR wheel to RL wheel diagonal vehicle body rolling vibration control unit, respectively, are added together to obtain the drive torque correction quantity for suppressing the vehicle body rolling vibrations.

Figure 22:
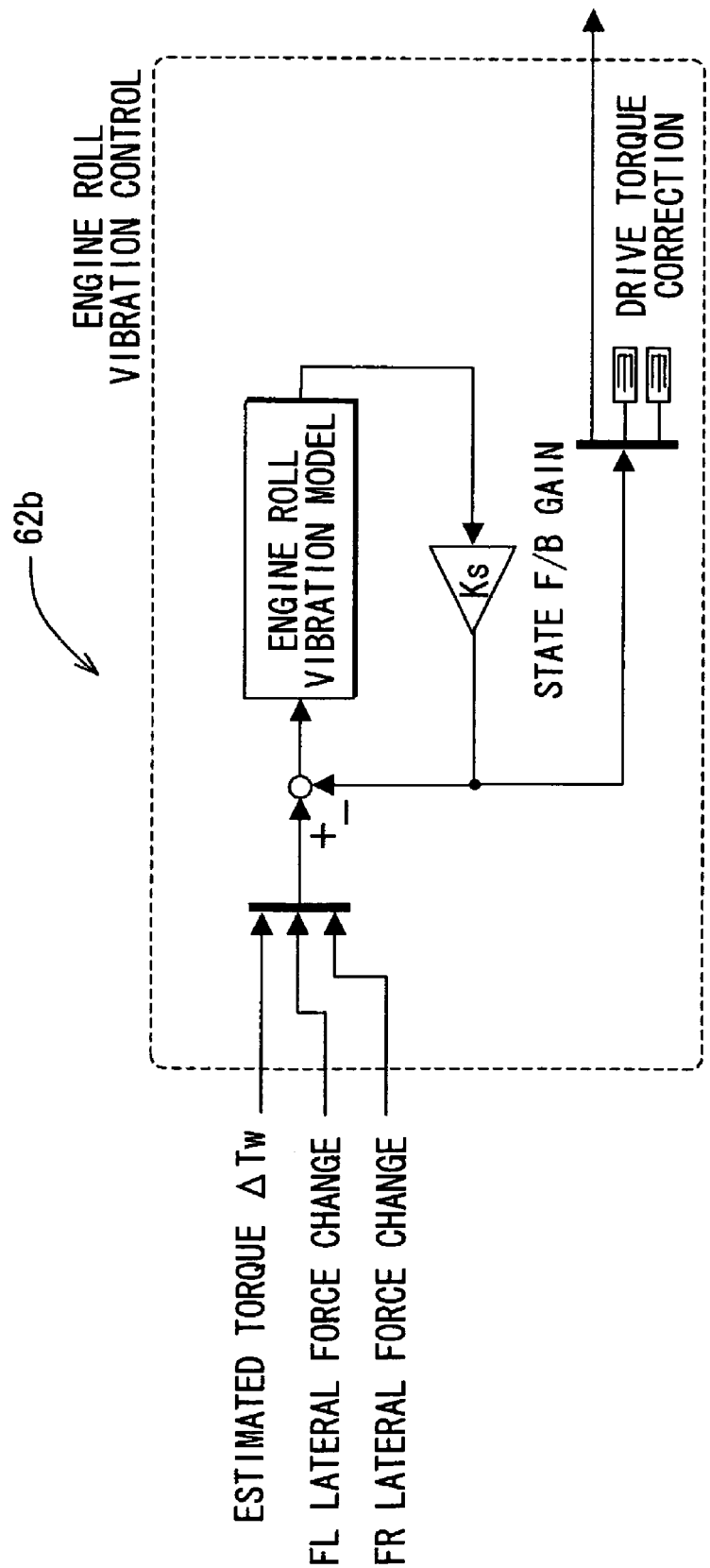
FIG. 22 is a block diagram showing a detailed functional structure of an engine roll vibration control unit.

FIG. 22 is a block diagram showing the detailed functional structure of the engine roll vibration control unit 62b. As shown in FIG. 22, the engine roll vibration control unit has an engine rolling vibration model, and the engine rolling vibration model outputs the engine rolling angular velocity $y_2$ that is calculated according to the above Expression 69 as the internal state quantity indicative of the engine rolling vibrations. The controller multiplies the given state feedback gain Ks by the engine rolling angular velocity $y_2$ to calculate the torque correction quantity.

Figure 23A:
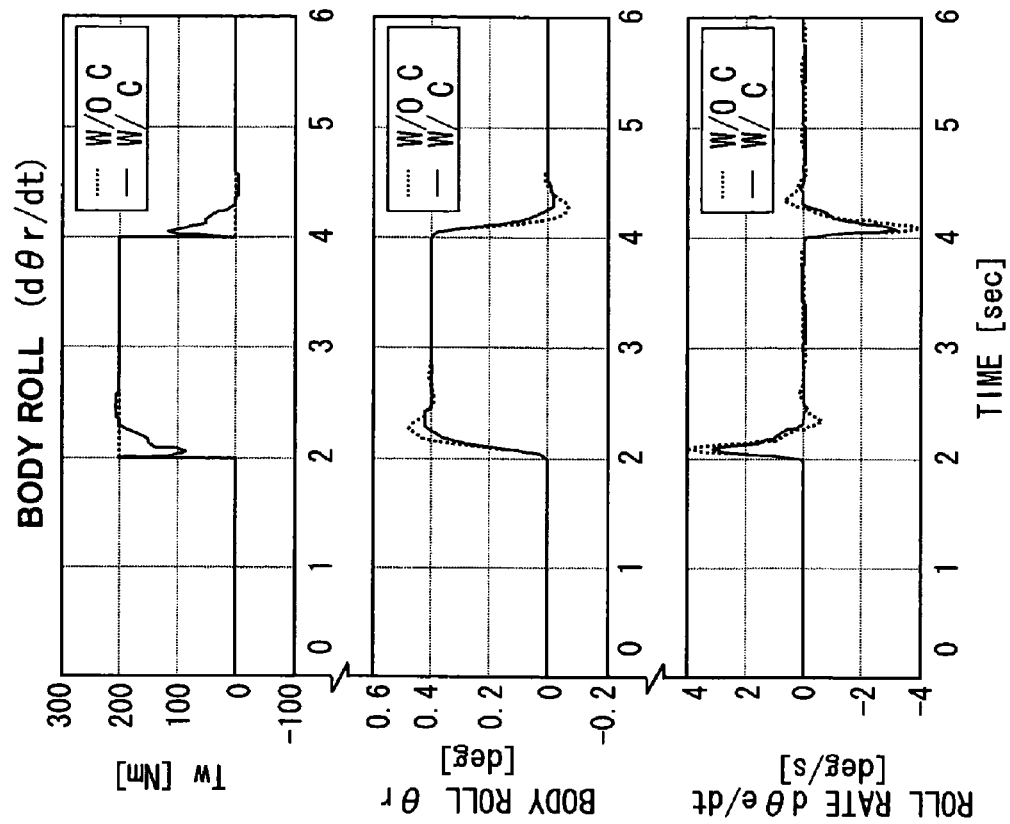
FIGS. 23A and 23B are graphs showing the simulation results indicative of a difference in the rolling vibrations which occur in the vehicle body and the engine between a case in which a control is conducted using a drive torque correction quantity that is calculated by a vehicle body rolling vibration/engine rolling vibration estimate/control unit of the vehicle control system, and a case in which the control is not conducted.
Figure 23B:
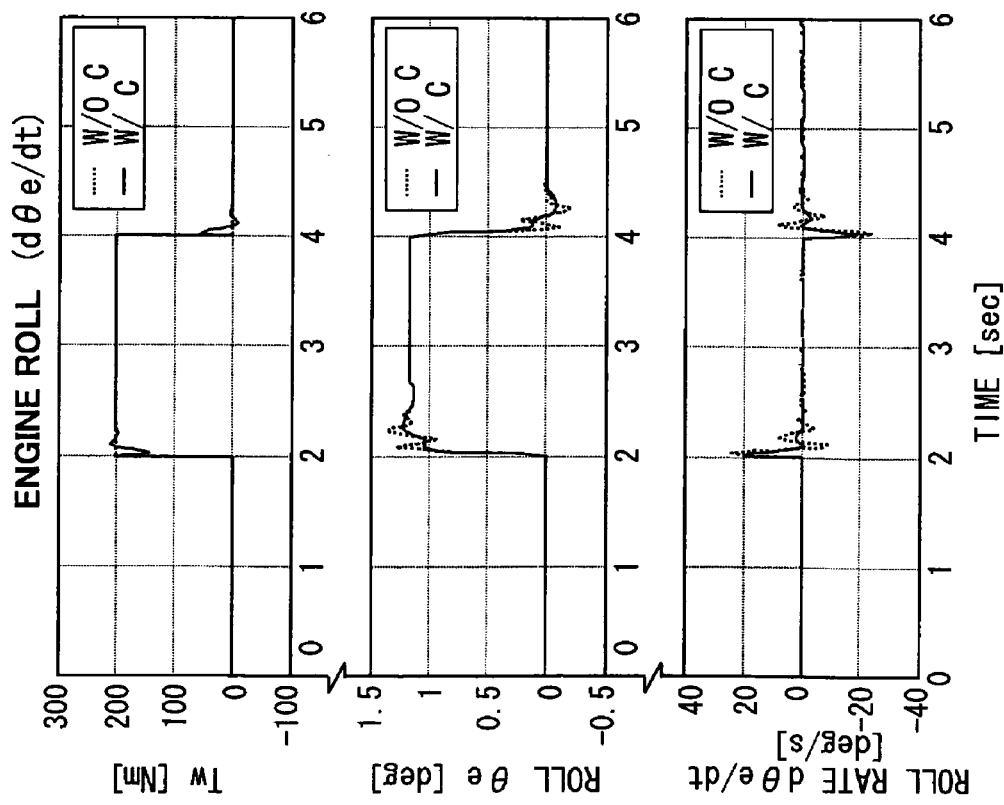

FIGS. 23A and 23B are the simulation results showing a difference in the rolling vibrations which are generated in the vehicle body and the engine between a case of conducting a control (with control shown by a solid line) by the vehicle body rolling vibrations of the above vehicle body control system 60 and the drive torque correction quantity that is calculated by the engine rolling vibration estimate/control unit 62, and a case of not conducting the control (without control shown in a dotted line), respectively.

FIG. 23A shows a change in the drive torque $T_w$, a change in the rolling angle $\theta_e$ of the engine, and a change in the engine rolling velocity $d\theta_e/dt$. FIG. 23B shows a change in the drive torque $T_w$, a change in the rolling angle of the vehicle body, and a change in the vehicle body rolling velocity $d\theta_r/dt$. As the conditions of the simulation shown in FIGS. 23A and 23B, the basic drive torque changes so as to rapidly rise up and fall down.

When the basic drive torque is not corrected by the drive torque correction quantity (in the case of no control), as shown in FIGS. 23A and 23B, it is found that the rolling angles and the rolling velocities of the engine and the vehicle body are large. On the contrary, when the basic drive torque is corrected by the drive torque correction quantity, the change in the drive torque $T_w$ is reduced by the drive torque correction quantity to reduce both of the rolling angles and the rolling velocities of the engine and the vehicle body as compared with those in the case of no control. Accordingly, it is found that the basic drive torque is corrected by the drive torque correction quantity that is calculated by the engine rolling vibration estimate/control unit 62b from the simulation results to enable the rolling vibrations of the vehicle body and the engine to be suppressed.

In this embodiment, the vehicle vibration model that is separated and hierarchized into the tire vibration model, the chassis vibration model, and the vehicle body vibration model is formed in the manner described above. For this reason, it is possible to express the respective models as the reduced-order linear models, and the capacity for storing the vehicle vibration model can be reduced, and the calculation load based on the vehicle vibration model can be reduced in the engine/drive system ECU 10.

Also, in the tire vibration model, the virtual intermediate coupling element vibration model that is imaginary is set between the front wheel tire vibration model and the rear wheel tire vibration model. As a result, the influence of the vibrating state which is exerted between the front wheel tire and the rear wheel tire can be considered while the tire vibration model and the chassis vibration model are separated from each other. As a result, it is possible to estimate the vibrations that occur in the front wheel tires and the rear wheel tires with high precision.

The preferred embodiment of the present invention is described above. However, the present invention is not limited to the above embodiment, but various changes may be made without departing from the scope of the invention.

For example, in the above embodiment, the engine/drive system ECU 10 appropriately corrects the drive torque that is given to the driving wheels of the vehicle to suppress the vibrations which are generated in the respective portions of the vehicle. However, when there is a device that can change the motion state of the vehicle, and control the operation state, the vibration suppression control for suppressing the vibrations at the respective portions of the vehicle can be conducted by an ECU that controls the device.

For example, the brake system ECU 20 that controls the brake actuator which adjusts the braking forces (brake pressures) of the respective wheels appropriately corrects the braking forces of the respective wheels of the vehicle, thereby making it possible to suppress the vibrations at the respective portions of the vehicle. Since the travel resistance changes with a change in the braking force of the wheels, it is possible to change the motion states of the wheels and other portions in the vehicle.

Also, for example, there is a vehicle having an electric motor in addition to an internal combustion engine as the drive source of the vehicle as in a hybrid vehicle that drives the common driving wheels by the internal combustion engine and the electric motor, and an electric type four-wheel drive vehicle that drives one of front wheels and rear wheels by the internal combustion engine, and drives the other wheels by an electric motor as the occasion demands. In the above vehicles, the electric motor can suppress the vibrations at the respective portions under the control.

Further, the vibration suppression control can be conducted by plural actuators. For example, the engine/drive system ECU 10 corrects the drive torque to suppress the vibrations of the vehicle body, and the brake system. ECU 20 and/or an ECU that controls the above electric motor suppresses the vibrations of the chassis or the tires under the control.

Even in the case of controlling the suppression of the vibrations of the chassis and the tires by means of the brake actuator or the electric motor; the same chassis vibration model and tire vibration model as those described in the above embodiment can be used. Then, the drive torque (correction quantity) for reducing the vibrations and the braking force correction quantity can be calculated based on the internal state quantities indicative of the respective vibration states, which are output from the chassis vibration model and the tire vibration model.

Also, in the above embodiments, the vehicle control system is applied to the FR vehicle that steers the front wheels and drives the rear wheels. However, the vehicle to be applied can be an FF vehicle or a 4WD vehicle.

What is claimed is:

1. A vehicle control system comprising:
a control unit that stores a vehicle model that is separated into a vehicle body model, a chassis model, and a tire model to estimate vibration states at respective portions of a vehicle; and
an operation device controllable by the control unit and operative to change a motion state of the vehicle,
wherein the control unit receives an input parameter to be input to the vehicle model from time to time, calculates estimate vibration states of the respective portions of the vehicle by using the vehicle model, and calculates control quantities according to the vibration states to control the operation device,
wherein the tire model in the vehicle model includes front wheel tires, rear wheel tires and virtual coupling elements that virtually couple the front wheel tires and the rear wheel tires with each other,
wherein the control unit calculates estimate vibration states of the front wheel tires and the rear wheel tires in a longitudinal direction of the vehicle,
wherein the control unit calculates the estimate vibration states of the front wheel tires, the rear wheel tires and the virtual coupling elements, respectively, and calculates the control quantity of each vibration of the front wheel tires, the rear wheel tires and the virtual coupling elements to reduce the vibration toward zero or to increase the vibration, and
the control unit calculates a total control quantity based on respective calculated control quantities and controls the operation device based on the total control quantity.

2. The vehicle control system according to claim 1, wherein:
the control unit calculates, in calculating the control quantity of at least one of the vibrations of the front wheel tires, the rear wheel tires and the virtual coupling elements to increase the vibrations, the control quantity to first reduce the vibration toward zero and then increase the vibration by inverting signs of the control quantity.

3. The vehicle control system according to claim 2, wherein:
the virtual coupling element includes a spring element and a damper element, which are arranged in parallel.

4. The vehicle control system according to claim 2, wherein:
the operation device includes at least one of a braking force generating device that generates braking forces at the respective wheels, an adjusting device that adjusts an operating state of an internal combustion engine of the vehicle, and an electric motor that operates as a drive source for rotationally driving the wheels.

5. The vehicle control system according to claim 1, wherein:
the virtual coupling element includes a spring element and a damper element, which are arranged in parallel.

6. The vehicle control system according to claim 1, wherein:
the operation device includes at least one of a braking force generating device that generates braking forces at the respective wheels, an adjusting device that adjusts an operating state of an internal combustion engine of the vehicle, and an electric motor that operates as a drive source for rotationally driving the wheels.

7. The vehicle control system according to claim 6, wherein:
the control device is the adjusting device; and
the control unit calculates a basic control quantity based on an accelerator pedal operation by a driver, calculates, as a correction control quantity, the control quantity for suppressing the vibration that occurs in the vehicle vibration model, and controls the operation device based on the basic control quantity and the correction control quantity.

8. The vehicle control system according to claim 6, wherein:
the control device is the braking force generating device; and
the control unit calculates a basic control quantity based on accelerator pedal operation by a driver, calculates, as a correction control quantity, the control quantity for suppressing the vibration that occurs in the vehicle vibration model and controls the braking force generating device based on the basic control quantity and the correction control quantity.

9. A vehicle control system comprising:
a control unit that stores a vehicle model that is separated into a vehicle body model, a chassis model, and a tire model to estimate vibration states at respective portions of a vehicle; and,
an operation device controllable by the control unit and operative to change a motion state of the vehicle,
wherein the control unit receives an input parameter to be input to the vehicle model from time to time, calculates estimate vibration states of the respective portions of the vehicle by using the vehicle model, and calculates control quantities according to the vibration states to control the operation device,
wherein the tire model in the vehicle model includes front wheel tires, rear wheel tires and virtual coupling elements that virtually couple the front wheel tires and the rear wheel tires with each other, and
the tire model is configured such that a first virtual coupling element couples a front left wheel tire and a rear right wheel tire, which are diagonally positioned in the vehicle, and a second virtual coupling element couples a front right wheel tire and a rear left wheel tire, which are diagonally positioned in the vehicle.

10. The vehicle control system according to claim 9, wherein:
the virtual coupling element includes a spring element and a damper element, which are arranged in parallel.

11. The vehicle control system according to claim 10, wherein:
the operation device includes at least one of a braking force generating device that generates braking forces at the respective wheels, an adjusting device that adjusts an operating state of an internal combustion engine of the vehicle, and an electric motor that operates as a drive source for rotationally driving the wheels.

12. The vehicle control system according to claim 9, wherein:
the operation device includes at least one of a braking force generating device that generates braking forces at the respective wheels, an adjusting device that adjusts an operating state of an internal combustion engine of the vehicle, and an electric motor that operates as a drive source for rotationally driving the wheels.

13. The vehicle control system according to claim 12, wherein:
the control device is the adjusting device; and
the control unit calculates a basic control quantity based on an accelerator pedal operation by a driver, calculates, as a correction control quantity, the control quantity for suppressing the vibration that occurs in the vehicle vibration model, and controls the operation device based on the basic control quantity and the correction control quantity.

14. The vehicle control system according to claim 12, wherein:
the control device is the braking force generating device; and
the control unit calculates a basic control quantity based on accelerator pedal operation by a driver, calculates, as a correction control quantity, the control quantity for suppressing the vibration that occurs in the vehicle vibration model and controls the braking force generating device based on the basic control quantity and the correction control quantity.

* * * * *